United States Patent
Glaser et al.

(10) Patent No.: US 10,339,595 B2
(45) Date of Patent: Jul. 2, 2019

(54) SYSTEM AND METHOD FOR COMPUTER VISION DRIVEN APPLICATIONS WITHIN AN ENVIRONMENT

(71) Applicant: Grabango Co., Berkeley, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 74 days.

(21) Appl. No.: 15/590,467

(22) Filed: May 9, 2017

(65) Prior Publication Data

US 2017/0323376 A1 Nov. 9, 2017

Related U.S. Application Data

(60) Provisional application No. 62/333,668, filed on May 9, 2016.

(51) Int. Cl.
| | | |
|---|---|---|
| *G06Q 30/06* | (2012.01) | |
| *G06Q 20/20* | (2012.01) | |
| *H04N 7/18* | (2006.01) | |

(52) U.S. Cl.
CPC ....... *G06Q 30/0643* (2013.01); *G06Q 20/203* (2013.01); *G06Q 30/0635* (2013.01); *H04N 7/181* (2013.01)

(58) Field of Classification Search
CPC . G08B 13/19613; G06Q 30/06; G06Q 20/203
See application file for complete search history.

(56) References Cited

U.S. PATENT DOCUMENTS

| | | |
|---|---|---|
| 5,254,853 A | 10/1993 | Reich |
| 5,418,567 A | 5/1995 | Boers et al. |
| 6,970,183 B1 | 11/2005 | Monroe |
| 9,120,621 B1 | 9/2015 | Curlander et al. |
| 9,141,931 B2 | 9/2015 | Ackerman |
| 9,412,099 B1 * | 8/2016 | Tyree ................. A47F 9/04 |
| 9,426,720 B2 | 8/2016 | Cohn et al. |
| 9,892,438 B1 * | 2/2018 | Kundu ............ G06Q 30/0609 |
| 9,948,902 B1 | 4/2018 | Trundle |
| 2003/0210340 A1 | 11/2003 | Romanowich |
| 2003/0216969 A1 | 11/2003 | Bauer et al. |
| 2005/0189411 A1 | 9/2005 | Ostrowski et al. |
| 2006/0147087 A1 | 7/2006 | Goncalves et al. |
| 2007/0091177 A1 | 4/2007 | West et al. |

(Continued)

*Primary Examiner* — Phi Hoang
(74) *Attorney, Agent, or Firm* — Alpine Patents LLC; Brian Van Osdol

(57) ABSTRACT

A system and method for computer vision driven applications in an environment that can include collecting image data across an environment; maintaining an environmental object graph from the image data whereby maintaining the environmental object graph is an iterative process that includes: classifying objects, tracking object locations, detecting interaction events, instantiating object associations in the environmental object graph, and updating the environmental object graph by propagating change in at least one object instance across object associations; and inspecting object state for at least one object instance in the environmental object graph and executing an action associated with the object state. The system and method can be applied to automatic checkout, inventory management, and/or other system integrations.

44 Claims, 36 Drawing Sheets

(56) References Cited

U.S. PATENT DOCUMENTS

| | | |
|---|---|---|
| 2007/0146873 A1 | 6/2007 | Ortyn et al. |
| 2008/0226129 A1 | 9/2008 | Kundu et al. |
| 2008/0228585 A1 | 9/2008 | Duri et al. |
| 2010/0020173 A1 | 1/2010 | Marquart et al. |
| 2010/0255902 A1 | 10/2010 | Goldstein et al. |
| 2010/0295946 A1 | 11/2010 | Reed et al. |
| 2011/0215147 A1 | 9/2011 | Goncalves |
| 2012/0019168 A1 | 1/2012 | Noda et al. |
| 2012/0027297 A1* | 2/2012 | Feris ............... G06K 9/34 382/173 |
| 2012/0173351 A1 | 7/2012 | Hanson et al. |
| 2013/0103537 A1 | 4/2013 | Hewett |
| 2013/0147963 A1 | 6/2013 | Henninger et al. |
| 2013/0177201 A1 | 7/2013 | Fisher |
| 2013/0290557 A1 | 10/2013 | Baratz |
| 2013/0317300 A1 | 11/2013 | Berci et al. |
| 2013/0342688 A1 | 12/2013 | Siu |
| 2014/0129688 A1 | 5/2014 | Asenjo et al. |
| 2014/0245160 A1 | 8/2014 | Bauer et al. |
| 2014/0265880 A1 | 9/2014 | Taipale et al. |
| 2014/0279191 A1 | 9/2014 | Agarwal et al. |
| 2014/0285660 A1 | 9/2014 | Jamtgaard et al. |
| 2014/0372957 A1 | 12/2014 | Keane et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0077787 A1 | 3/2015 | Nishimura et al. |
| 2015/0077797 A1 | 3/2015 | Kurokawa |
| 2015/0088694 A1 | 3/2015 | Ackerman |
| 2015/0097961 A1 | 4/2015 | Ure et al. |
| 2015/0133190 A1 | 5/2015 | Fisher et al. |
| 2015/0154973 A1 | 6/2015 | McKenna et al. |
| 2015/0156332 A1 | 6/2015 | Kandregula |
| 2015/0163412 A1 | 6/2015 | Holley et al. |
| 2015/0244992 A1 | 8/2015 | Buehler |
| 2016/0027262 A1 | 1/2016 | Skotty et al. |
| 2016/0037135 A1 | 2/2016 | McSheffrey et al. |
| 2016/0100086 A1 | 4/2016 | Chien |
| 2016/0217388 A1* | 7/2016 | Okanohara ............ G06N 99/005 |
| 2016/0224856 A1* | 8/2016 | Park ............ G06K 9/00624 |
| 2016/0242252 A1 | 8/2016 | Lim et al. |
| 2016/0254864 A1 | 9/2016 | Mueller et al. |
| 2016/0270191 A1 | 9/2016 | Ludwig et al. |
| 2016/0345414 A1 | 11/2016 | Nolan et al. |
| 2017/0053171 A1 | 2/2017 | Buehler |
| 2017/0108236 A1 | 4/2017 | Guan et al. |
| 2017/0123030 A1 | 5/2017 | Hengerer et al. |
| 2017/0169440 A1* | 6/2017 | Dey ............ G06Q 30/0201 |
| 2017/0316656 A1* | 11/2017 | Chaubard ............ G07G 1/0045 |

* cited by examiner

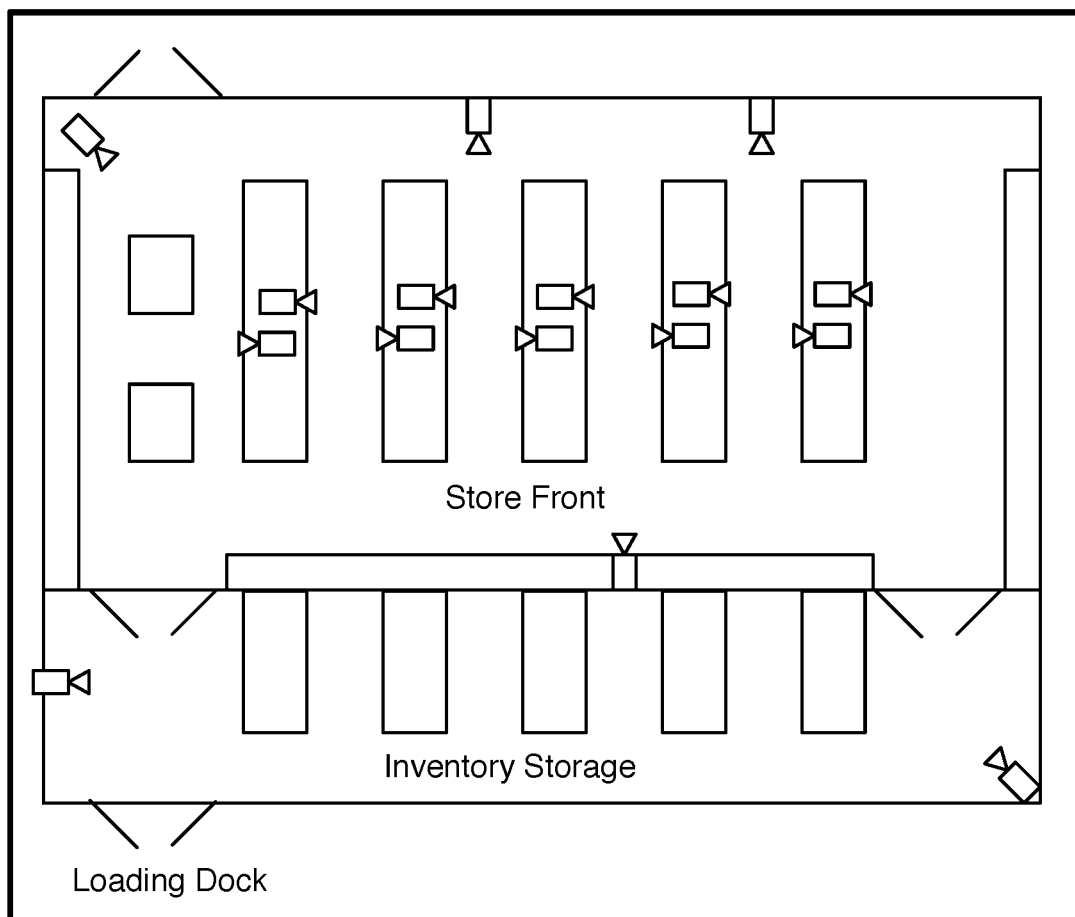
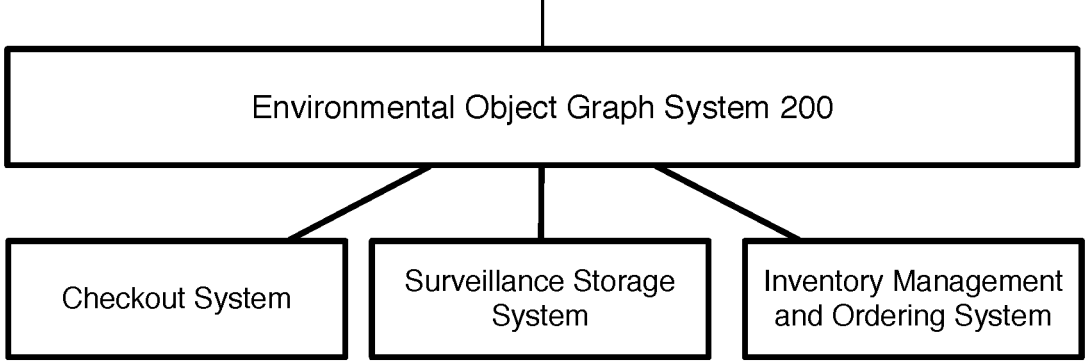
FIGURE 2

1. Select Product_1
2. Select Product_2
3. Customer automatic checkout for Product_1 and Product_2 at Shop B
4. Select Product_3
5. Select Product_4
6. Select Product_5
7. Customer automatic checkout for Product_3, Product_4, and Product_5 at Shop C
8. Customer leaves mall with Product_1, Product_2, Product_3, Product_4, and Product_5 interaction event region

Object Revealing
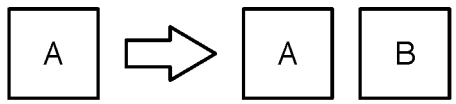
Object Concealing
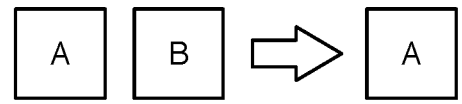
Object Splitting
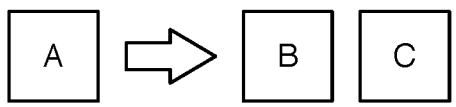
Object Merging
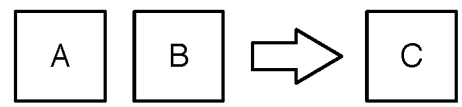
Object Appearance
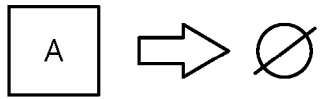
Object Disappearance
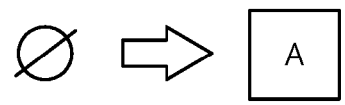
Object Reclassification
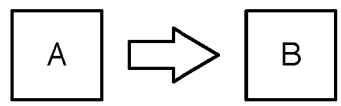
FIGURE 10

Object path from t=0 to t=25
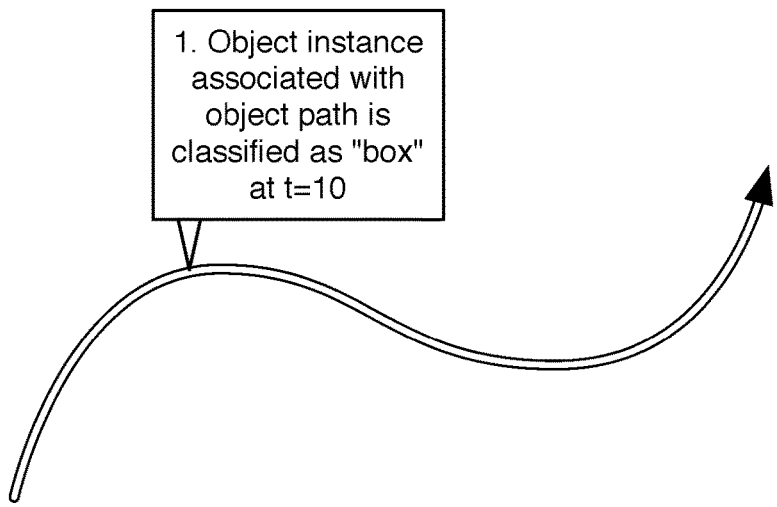
1. Object instance associated with object path is classified as "box" at t=10
Object path from t=0 to t=30
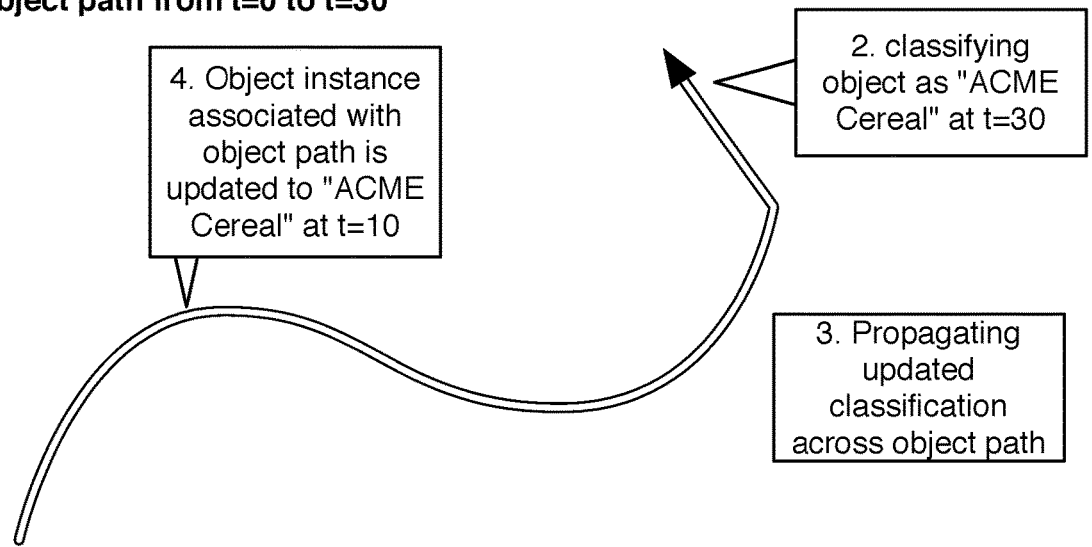
4. Object instance associated with object path is updated to "ACME Cereal" at t=10
2. classifying object as "ACME Cereal" at t=30
3. Propagating updated classification across object path
FIGURE 16

```
Shopper Object : {[
                  (Half and Half, 97%, $3.50),
                  (Butter, 99%, $3.00),
                  (Razor Blade, 70%, $24.75),
                  (Gum, 30%, $0.75)
                  (Bag: {[
                        (Lip balm, 96%, $1.75),
                        (umbrella object, 97%, <not a product> )
                       ]}, 98%, <not a product> )
                  ]}
```

Resolving shopper object associations

```
Checkout list : [(Half and Half, $3.50),
                 (Butter, $3.00),
                 (Razor Blade, $24.75),
                 (Lip balm, $1.75)]
```

FIGURE 25

Content Representation

| Modeling Content | Media Content |
|---|---|
| EOG confidence: 99% | High Quality Media |
| EOG confidence: 99% | No Media |
| EOG confidence: 95% | Low quality Media |
| EOG confidence: 70% | High quality Media |
| EOG confidence: 93% | Low quality Media |
| EOG confidence: 99% | High Quality Media |
| EOG confidence: 99% | No Media | time ↓

FIGURE 27

Region 1

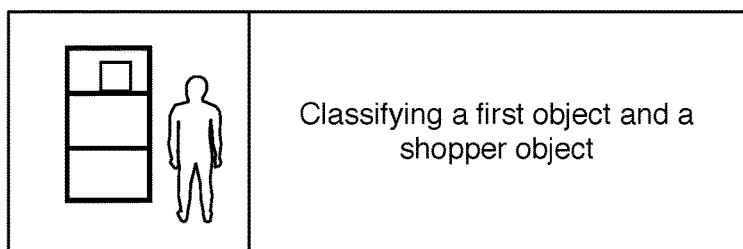

Classifying a first object and a shopper object

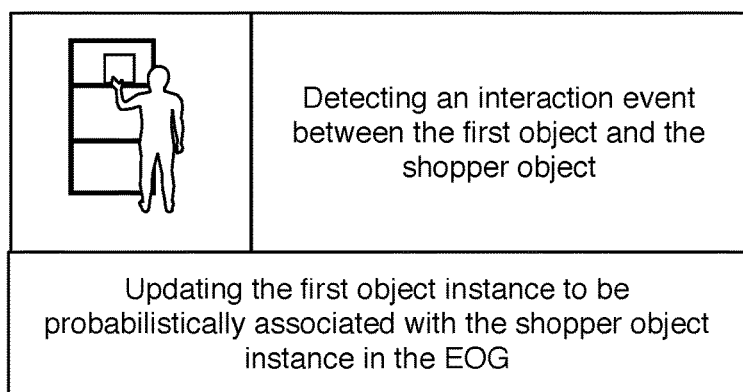

Detecting an interaction event between the first object and the shopper object

Updating the first object instance to be probabilistically associated with the shopper object instance in the EOG

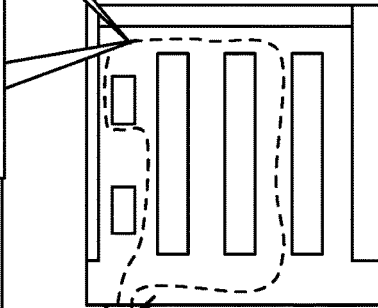

Store Map

Region 2

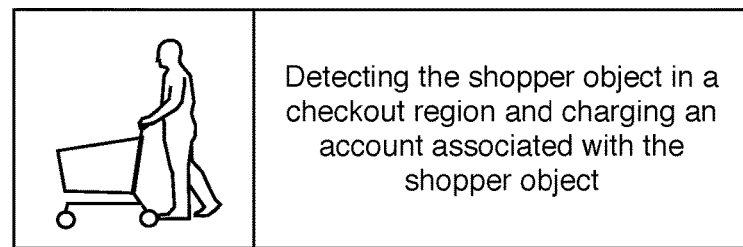

Detecting the shopper object in a checkout region and charging an account associated with the shopper object

FIGURE 29

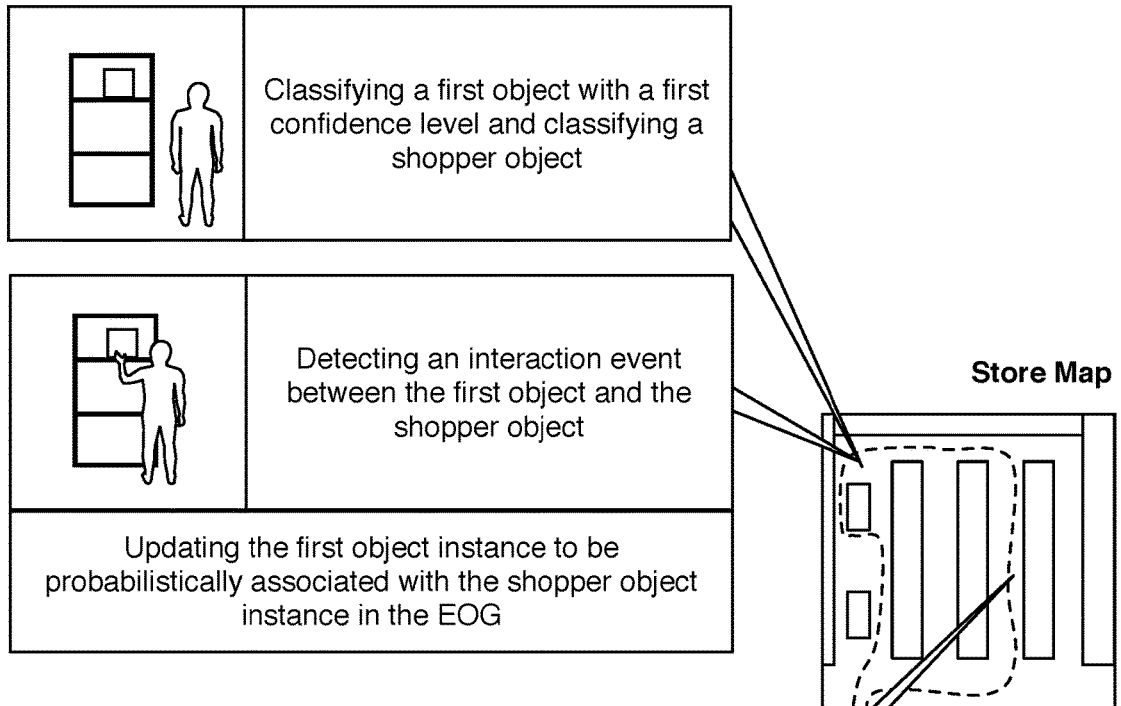
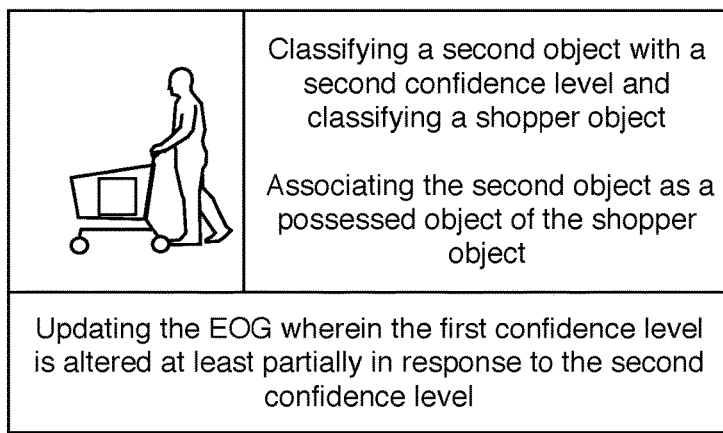
FIGURE 30

Region 1 at t=0

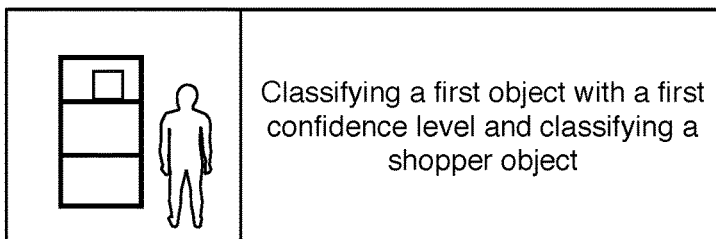

Classifying a first object with a first confidence level and classifying a shopper object

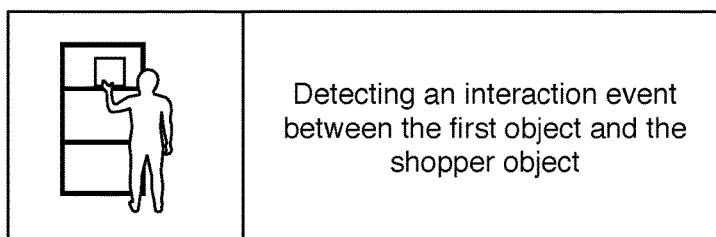

Detecting an interaction event between the first object and the shopper object

Updating the first object instance to be probabilistically associated with the shopper object instance in the EOG

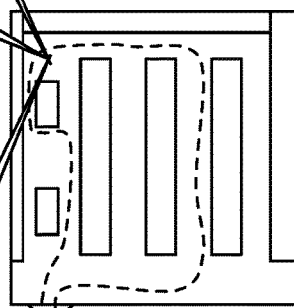

Store Map

Region 1 at t=30

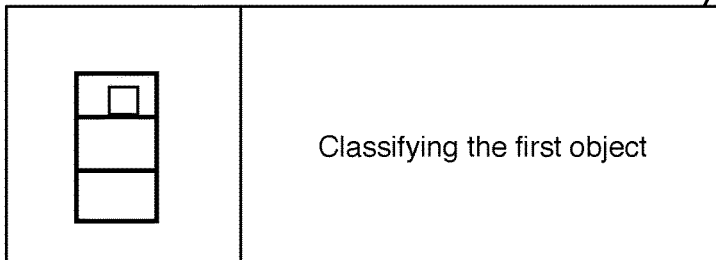

Classifying the first object

Removing the association of the first object with the shopper object at time t=0

FIGURE 31

Region 1

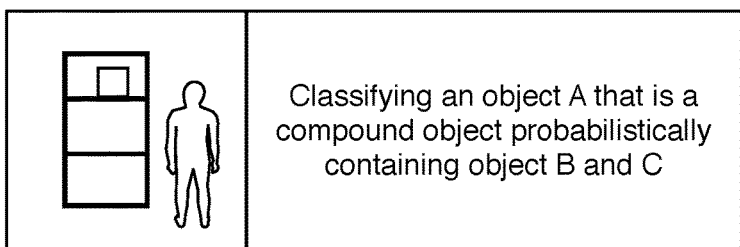

Classifying an object A that is a compound object probabilistically containing object B and C

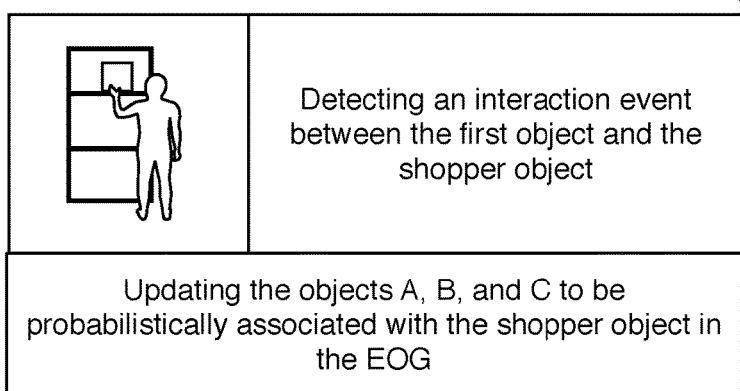

Detecting an interaction event between the first object and the shopper object

Updating the objects A, B, and C to be probabilistically associated with the shopper object in the EOG

Region 2

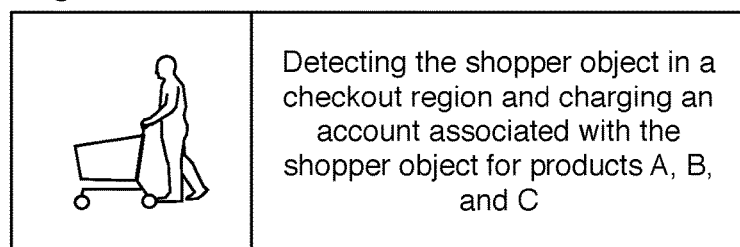

Detecting the shopper object in a checkout region and charging an account associated with the shopper object for products A, B, and C

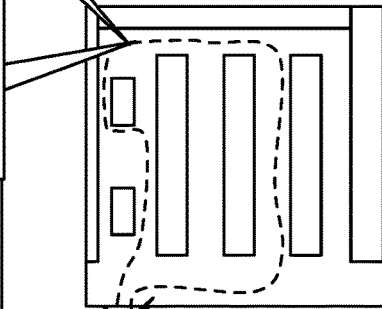

Store Map

FIGURE 32

SYSTEM AND METHOD FOR COMPUTER VISION DRIVEN APPLICATIONS WITHIN AN ENVIRONMENT

CROSS-REFERENCE TO RELATED APPLICATIONS

This application claims the benefit of U.S. Provisional Application No. 62/333,668, filed on 9 May 2016, which is incorporated in its entirety by this reference.

TECHNICAL FIELD

This invention relates generally to the field of commerce and inventory management, and more specifically to a new and useful system and method for computer vision driven applications within an environment.

BACKGROUND

Stores and warehouses are generally confronted with the challenge of managing inventory. From an operational perspective, many sophisticated business operations devote considerable time and resources to manual counting of inventory. Such a process is prone to errors and only provides periodic views into the state of inventory.

In connection with inventory management with respect to customer facing aspects, stores are very dependent on traditional tools and systems for charging customers for their products and/or services. Traditional point of sale systems and even self-checkout options commonly result in long lines, which can leave customers dissatisfied with their shopping experience. This can be particularly damaging when physical shopping is threatened by online shopping options.

Thus, there is a need in the commerce and inventory management field to create a new and useful system and method for computer vision driven applications within an environment. This invention provides such a new and useful system and method.

BRIEF DESCRIPTION OF THE FIGURES

FIG. 2 is a schematic representation of an exemplary system installation of a preferred embodiment;

FIG. 10 is a schematic representation of object transformations;

FIG. 16 is a schematic representation of propagating updated object state across a motion path to alter previous object classifications;

FIG. 25 is a schematic representation of resolving shopper associated objects to a checkout list;

FIG. 27 is a schematic representation of storing media according to the EOG in a meta-media storage format;

FIGS. 29-35 are schematic representations of exemplary process instances when maintaining the EOG.

DESCRIPTION OF THE EMBODIMENTS

The following description of the embodiments of the invention is not intended to limit the invention to these embodiments but rather to enable a person skilled in the art to make and use this invention.

1. Overview

Figure 1:
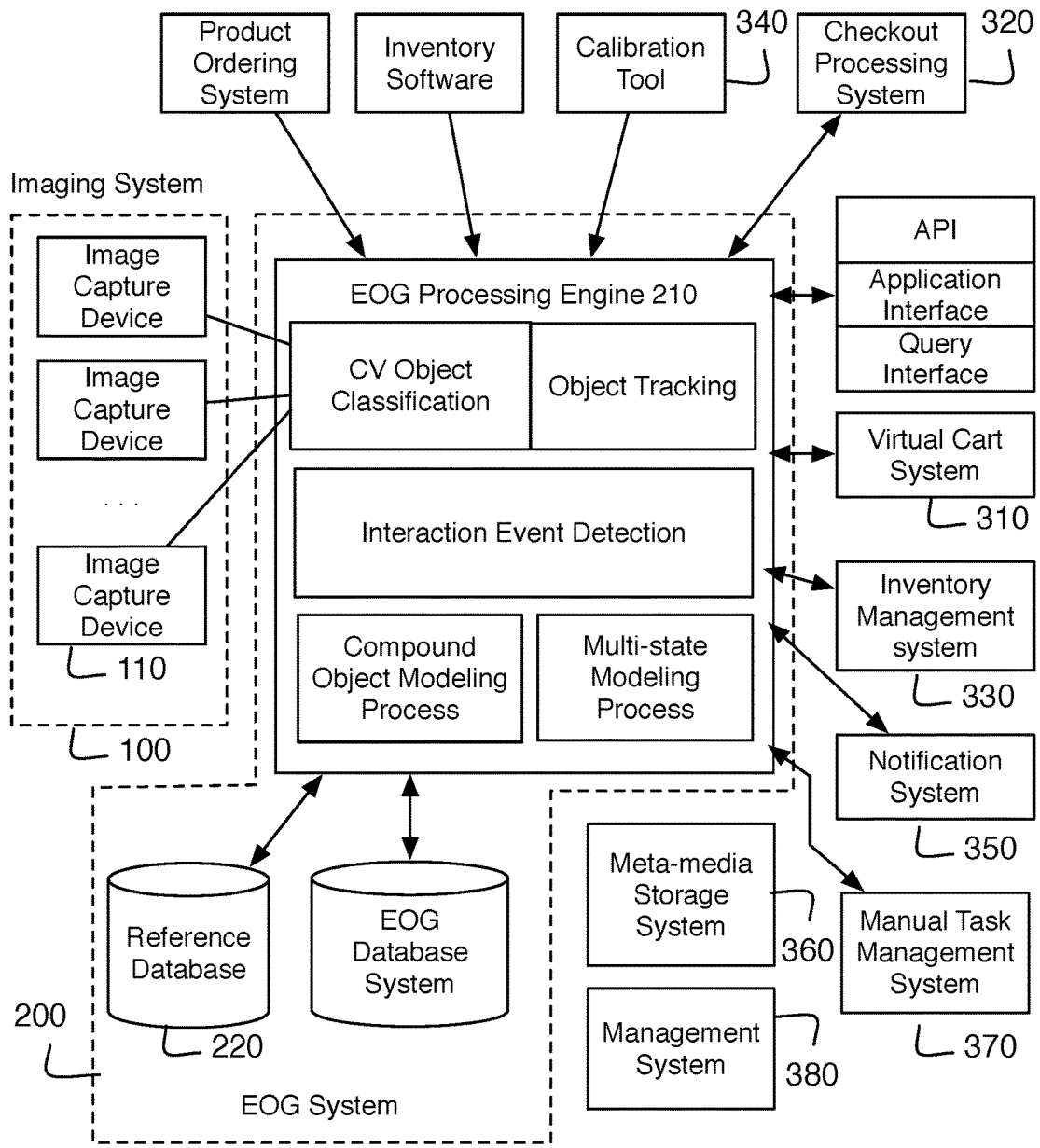
FIG. 1 is a schematic representation of a system of a preferred embodiment.

A system and method for computer vision (CV) driven applications within an environment of a preferred embodiment function to seamlessly monitor, track, and account for objects within an observed space. The system and method preferably utilize an imaging system and processing engine that accounts for object state through a statistically based approach. The system and method described herein can transform the operational capabilities of surveillance systems and enable new integrations and applications with other systems as shown in FIG. 1.

The system and method are preferably resilient to imperfect input sources and unknown states and can preferably apply longitudinal modeling to self-correct with new image data across time and space. The system and method can be particularly applied to CV-driven applications that depend on tracking of multiple objects (e.g., products) alongside people or device objects (e.g., shoppers, workers, carts, bags) where interactions and movement of objects is of interest. The system and method can operate under imperfect input sources and update understanding with new information.

Preferably, the system and method function to monitor object-to-object associations. Object-to-object associations can relate to one object possessing or containing another object or possibly being composed of that object. Through object-to-object associations, the state of an object can be tracked across time and space without direct confirmable observable visual data at a different instance of time and space. For example, a person could pick up an item in a store, place that item in his pocket, and the system and method can account for that item possessed by the person when the person leaves the store.

The system and method can use computer vision detection at various points and at different times to update an understanding of object contents, associations, and/or presence within an environment. In addition to accounting for visually identifiable products, unclear visual observations and visually obscured objects may be accounted for through periodic updates and propagation of modeling through object and temporal relationships such as the object-to object associations mentioned above. This sort of virtual representation of objects in the physical world can include modeling objects such as inventory items, workers, shoppers, containers, storage elements (e.g., shelves), foreign objects, and/or any suitable type of object.

The modeling applied by the system and method can be characterized through a modeling system referred herein as an environmental object graph (EOG) that reflects modeled object state and associations throughout time.

The system and method can have applications in a wide variety of environments. In one variation, the system and method can be used within an open environment such as a shopping area or sales floor where inventory interactions are unstructured. Shoppers may interact with inventory in a variety of manners, which may involve product inspection, product displacement, adding items to carts or bags, and/or other interactions. For example, the system and method can be used within a store such as a grocery store, big box store, bookstore, convenience store, drugstore, shoe store, and/or any suitable type of shopping environment. When used within a shopping environment, the system and method may facilitate an alternative checkout process, which may be faster and in some cases automatic.

The system and method may alternatively be used within a structured industrial environment, where interactions with products are more constrained and largely limited to prescribed worker interactions. Some industrial environments may be primarily characterized by structured entity-inventory interactions. An entity can be a person or an automated system such as robotic item-mover. People and robots may both be used in adding or removing items to the environment or moving the items. For example, the system and/or method can be used in a warehouse, storage facility, store backroom, cabinets, manufacturing environment, and/or any suitable industrial environment.

The system and method may alternatively be used within other types of environments or application such as within a private home to track personal possessions.

The system and method are preferably used in combination with an imaging system that includes a distributed network of imaging devices as shown in FIG. 2. That imaging system can be installed in a store or isolated environment. For example, the system and method could be deployed within a store environment to monitor inventory and shoppers in a storefront and to monitor inventory stored in a storage and loading area. Different instantiations of the system and method can be used in connection with a network accessible computing platform such that multiple stores or locations at different sites can operate cooperatively, provide higher-level insights to chain managers, and/or leverage data insights across different locations.

Figure 3:
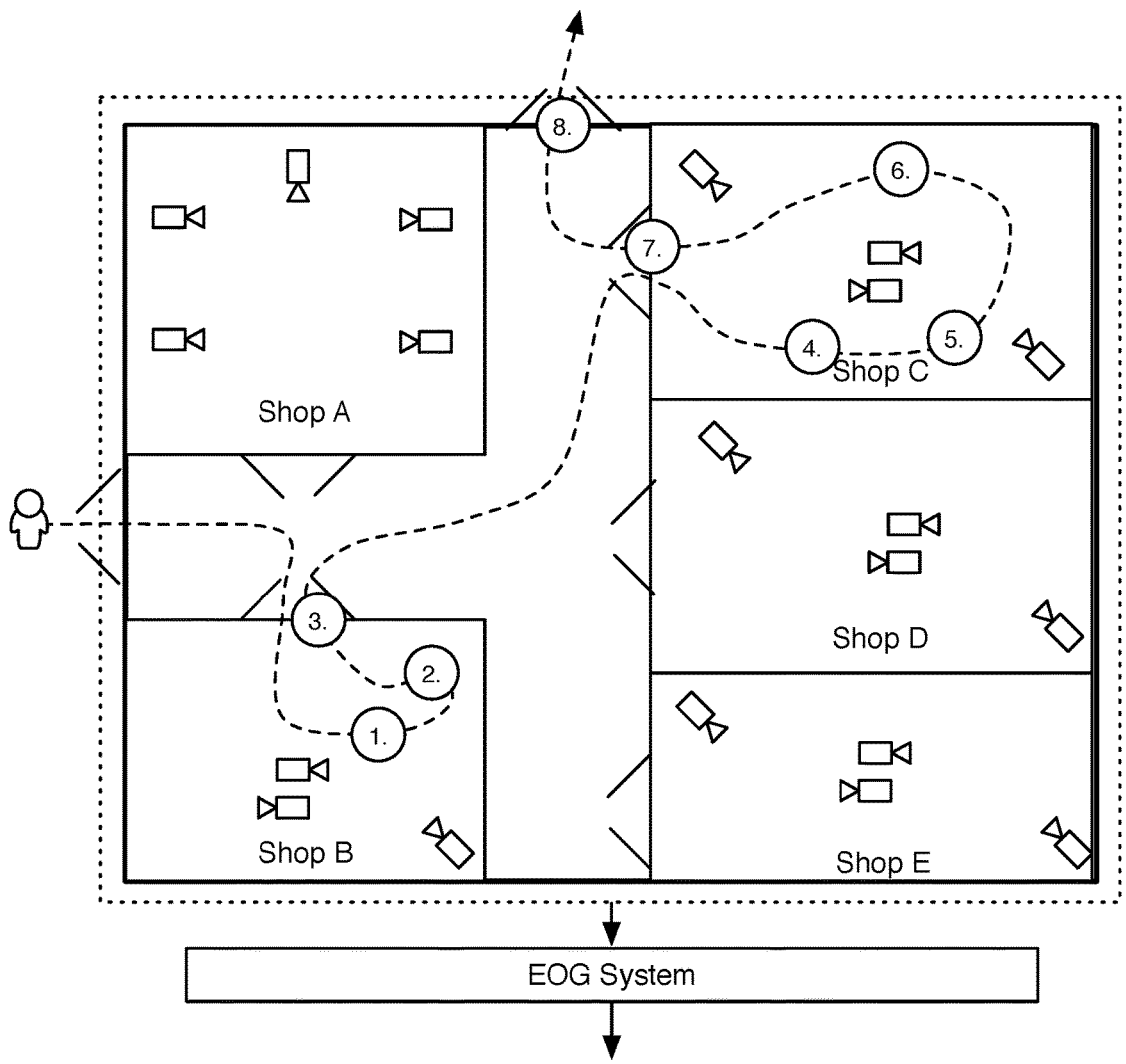
FIG. 3 is a schematic representation of an exemplary scenario where the EOG is applied for applications in different regions of the environment.

The system and method could additionally be implemented in a wider distributed system, wherein operational logic of the system and method can be executed across one environment with a network of imaging devices. Different CV-based applications can be executed within different continuous or discontinuous regions. This can enable regionally specific CV-driven applications that can open up internal-region CV-based applications and cross-region CV-based applications. This could be used in a mall-like environment where multiple stores use the system and method. The system and method at the mall may enable store-specific CV-driven applications like automatic checkout within each store region, but could also enable inter-store or mall level interactions as shown in FIG. 3.

Figure 4:
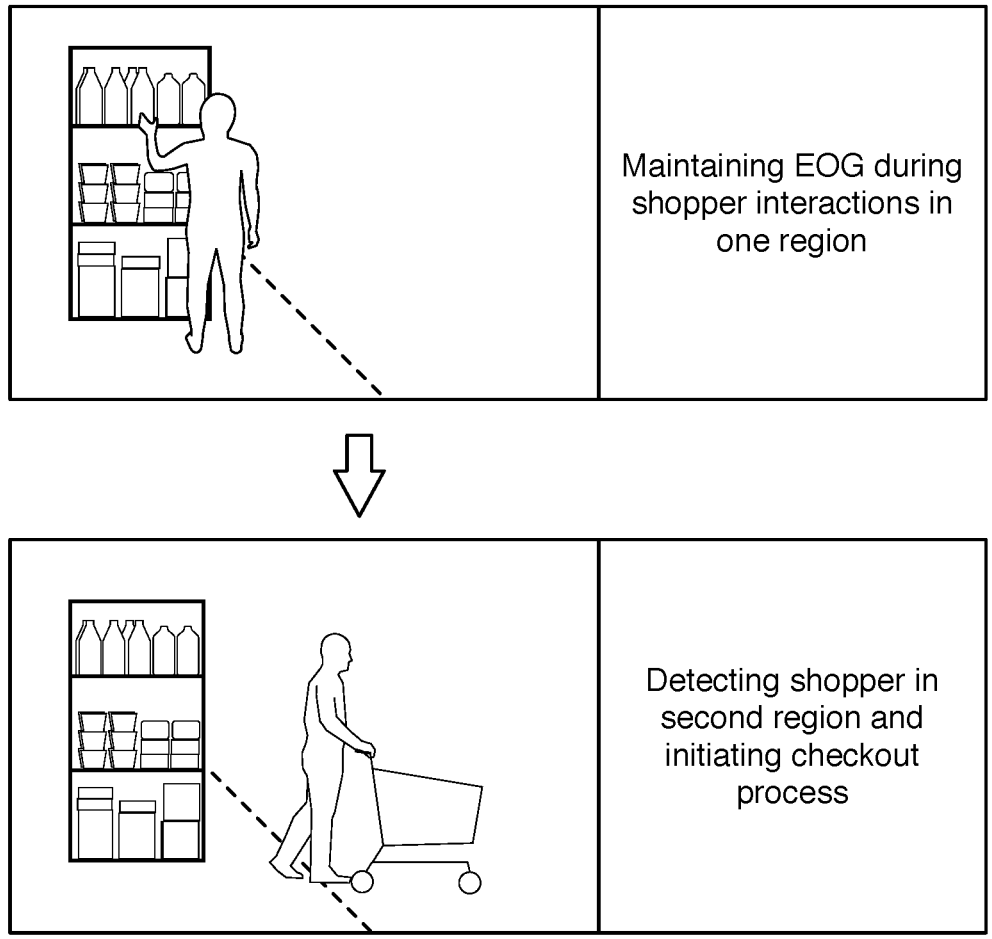
FIG. 4 is a schematic representation of a single image capture device used in implementing the system and method.

The system and method could similarly be applied at a smaller scale, wherein the system and method could work with a single camera that applies EOG modeling across different regions within the field-of-view of the camera. In one implementation, object interactions by a customer at one location can be applied to system operation when the customer enters another region. For example, a small shelf of items could be monitored such that item selection by a shopper can be tracked and then an automatic checkout process can execute when the shopper leaves the field of view or proceeds through an exit as shown in FIG. 4.

The system and method can have a wide variety of applications and be used in combination with other components. As one primary application, the system and method can be applied for automatic self-checkout. Automatic self-checkout is primarily characterized by a system or method that generates or maintains a virtual cart (i.e., a checkout list) during the shopping process with the objective of knowing the possessed items when a customer leaves a store. The system and method can be used to automatically charge an account of a customer for the total of a virtual cart or to generate an itemized summary that can be communicated to a checkout processing system (e.g., a point of sale (POS) device or a customer application on a personal computing device) for direct payment (e.g., paying via cash, credit/debit card, etc.). In some cases, the system and method may be used in assisted checkout wherein a virtual cart or monitored information of a shopper can be used in augmenting a checkout processing system.

The system and method may alternatively be used to account for the removal of an item by a customer such as in a library, a rental store, a warehouse, or any suitable item storage facility. The system and method may alternatively be used to permit or restrict access to locations or to charge for such access such as at an airport, an amusement park, or a gym. The system can be made to work for a wide variety of shopping environments such as grocery stores, convenience stores, micro-commerce & unstaffed stores, bulk-item stores, pharmacies, bookstores, warehouses, malls, markets, cafeterias, and/or any suitable environment that promotes commerce or exchange of goods or services. Herein, automatic self-checkout for an accumulated set of items is used as a main exemplary application of the system and method, but any suitable application may be used.

As an exemplary scenario of the system and method in practice, the system and method may detect a shopper adding boxes from the cereal aisle into the shopping cart. The number of boxes within the cart may not be observable because of the current view of the camera. The system and method, however, can update the internal representation of inventory in the EOG based on some interaction which has some probabilistic outcome based on various factors (e.g., location of the shopper in the store). The system and method may for example update its understanding to predict with 90% probability that a shelf holds 9 boxes, an 8% probability the shelf has 8 boxes, and a 2% probability of holding 7 or fewer. A shopper's cart similarly can be assigned a probabilistic distribution of having some set of contents. At some future point, the shopper's cart may be observed to contain three visible cereal boxes. Such information is used to update the inventory representation in the EOG such that the shopping cart contents is predicted with a 80% probability to have three boxes and a 20% probability to have four or more boxes. The shelf inventory count is similarly adjusted. Other future observations can similarly be used to update the inventory representation further. Other object inputs such as POS checkouts or a manual inventory counts can also be used to update the probability. The system and method preferably use dynamic, machine intelligence that actively improves the quality of the system's internal representation of the physical world based on feedback from various inputs.

The system and method can additionally or alternatively be applicable to inventory management. Traditionally, inventory management uses incoming shipments, checkout processing systems, itemized receipts, and periodic manual inventory accounting to maintain a count-based understanding of inventory. However, such a traditional approach can be rigidly restricted in its understanding of the inventory. For example, such traditional systems cannot account for product "shrinkage" (e.g., discrepancies between expected item count and actual count often resulting from theft, product misplacement, or incorrect inventory accounting). In general, the traditional inventory management systems also may not provide reliable information of items while in the store, and instead depend on time consuming and manual inventory processes which often involve employees counting all the items in the store. The system and method can preferably provide a real-time understanding of inventory status that includes not only count expectations, but may additionally provide item location, item interaction history, item shelf-life monitoring, media, metadata, and/or other information.

The system and method may additionally or alternatively be applicable to surveillance used in security, auditing, analytics and/or other uses of visual monitoring. Interactions with the media, storage of the media and media information, and/or responding to content of media may be addressed through implementations of the system and method.

The system and method could additionally or alternatively be applicable to triggering alerts and/or directing workers or systems within the environment. In some variations, customized object rules may be configured to trigger performance of various tasks. For example, a worker alert could be triggered when a refrigerated object is removed and left on a shelf outside of refrigeration.

As a related extension, the system and method may be implemented for customized operational logic for particular/custom applications and/or be integrated with an outside system. For example, programmatic interfaces could be enabled so that other systems can leverage the object modeling capabilities of the system and method. The system and method could similarly be used for alternative applications.

The system and method can bring about a variety of potential benefits. As one potential benefit, the system and method may provide monitoring capabilities robust to messy environments. The system and method can account for unstructured and unexpected object interactions. The system and method preferably utilizes various approaches to be self-correcting and account for scenarios of imperfect detection. In association with this potential benefit, the system and method can avoid dependence on visual detection of complex object interactions, which can be fallible and may not be robust in regular usage. While, the system and method may use interaction detection approaches in some implementations when possible, the system and method can preferably correct when such detection fails or is not directly observable. As a system and method that can be generalized to various CV algorithmic approaches, the architecture of the system and method can be implemented without being restricted to a particular CV-algorithm, and can seamlessly improve with the advances of the industry.

As another related potential benefit, the system and method can address observational holes. Obstructions, unclear views, and hiding of objects within other objects are all factors that have prevented existing approaches from providing robust object tracking. The system and method can operate under such situations by employing various approaches such as indirect detection, propagation of object modeling, and/or counterfactual predictions.

As another potential benefit, the system and method can accommodate a variety of surveillance system infrastructures. The system and method can be used with a wide variety of surveillance systems that may have any number of imaging devices and quality of the imaging devices. In some cases, a limited number of budget imaging devices may be used as a low cost solution, including an implementation with a single camera. In other cases, the environment may have a network of various imaging devices providing image data from various angles. In some cases, existing surveillance systems may be utilized in implementing the system. In still others, a combination of visual, infrared, lidar, laser, radar, sonar, acoustical sensors, electromagnetic signal mapping systems, and other sensors may be used. Related to this, the system and method can preferably operate without depending on precise and time consuming calibration of the imaging devices.

As another potential benefit that can be used in automatic self-checkout and other applications, the system and method can enable detection and monitoring of shopper interactions with products throughout a shopper visit. The shopping path, the order that items were added to a cart, the time for selecting an item from a shelf (e.g., shelf inspection time), the final contents of a cart when leaving, and/or other factors can be detectable through the system and method. In one variation, the system can be used in automating parts of the checkout process. For example, a customer or worker checkout kiosk or other checkout processing system can use the system and method for enhanced functionality. In another variation, the system can be used in verifying products are not removed from the store without payment.

As one potential benefit the system and method can address inventory accounting. Stores and managers can more efficiently know the inventory ranges of products. Product ordering, monitoring of inventory longevity or "health" (e.g., duration of storage, monitoring expiration dates of individual items), and/or processing of inventory can also be facilitated through the system and method.

As a related potential benefit, the system and method can be used in tracking items within a store such that the location of an item can be queried. Additionally, the system and method may be used in monitoring object relationships. Object relationships can include associations and interactions such as what object was used to store another object, the contact/proximity of particular objects, and/or other object relationships. Policy may be set to trigger alerts or other actions for particular conditions. For example, if an ice cream carton is removed from the freezer and then left on the shelf, an alert could be generated because the ice cream carton was detected to be outside of the freezer and stationary for a set amount of time.

As another potential benefit, the system and method can provide a data-driven surveillance approach, which may be used in place of, or to assist, a visual surveillance system. A data-driven surveillance approach may have benefits that enable a greater time frame of stored surveillance and/or selectively prioritizing media quality in particular situations.

The system and method can similarly expose benefits in other applications by elevating detailed object monitoring within an environment, which can be leveraged for a variety of applications.

Environmental Object Graph Modeling Overview

The system and method preferably applies an environmental object graph (EOG) modeling system, which can be used to probabilistically detect, track, and model objects in space and time across an environment.

An EOG generally describes an approach that represents physical items in an environment as objects and maintains that virtual representation as items are moved, added, removed, and changed. The EOG is preferably a data representation structure of classified objects, wherein instances of objects in the EOG can have various probabilistic object associations. The object representations in the EOG are continuously or periodically updated according to a flow of new information. New information can originate through newly classified objects, interactions between objects, tracking of objects, and/or other inputs such as a supplemental data inputs like transaction data from a checkout processing system.

The EOG can be particularly applicable in combination with an environment that has ubiquitous imaging system. The EOG system can use multiple image-based observations from various vantage points and/or at different instances to build a representation of objects and the objects' relationships in the environment.

Probabilistic object modeling can be applied within an EOG for compound object modeling, probabilistic modeling of multiple states, and/or propagating of modeling through the EOG.

In compound object modeling, the EOG system preferably enables predicting or modeling probabilities of contained objects. When combined with interaction event detection this can be used in accounting for a perceived appearance of an object, disappearance of an object, splitting of an object, or merging of objects.

Probabilistic modeling of multiple states facilitates maintaining multiple object states of potential realities. For example, an object may be modeled as having been selected by a shopper with some likelihood and having been pushed deeper into a shelf so as not to be observed. The probabilistic modeling can be updated through updated information to more confidently identify most likely state, and/or resolve the modeling into a predicted state when requested for application operations.

In propagation of modeling, new information such as updated object classification information at a different point in time and/or from a different camera can be propagated across associated objects. Model propagation can be used to update object classifications, object tracking, object associations, compound object modeling, and/or multiple state modeling.

In one implementation, an object's representation within an EOG can include a classification and possibly a set of contained or associated objects. The classification may be as a SKU (stock keeping unit or globally unique identifier), a general object (e.g., apple box, shopper, shelf, stack of goods), or an as-yet unknown object. The classification will generally be accompanied by a confidence level and possibly a set of other classification options. In one variation, a modeled set of contained objects may include any number of objects including zero. The contained objects are represented as being part of the contents with some probability. A contained object may, in turn, have further objects contained within it, and so on, recursively.

An object may additionally include or be associated other properties. For example, an object with a SKU classification may be associated with an inventory item having a price, name, weight, size dimensions, and/or other properties. In a commerce application, the object may include business operational properties such as product popularity, related products, margin/profit, manufacturer/distributor, sales priority, and/or other operational related properties. When used within an environment wherein inventory is tracked, the EOG can be used to predict inventory status. The inventory status can include count, location, object associations (e.g., an item is inside a particular box), inventory history, and/or other properties. The EOG can additionally be used to predict items picked up by shoppers or workers, storage techniques of objects, and/or other information.

As mentioned, an object can be classified as a SKU object, which might correspond with an inventory item. A SKU object is preferably characterized as relating to a single item with a specific identity. That identity is preferably associated with a product (e.g., a product object), which may include properties such as price, dimensions, weight, product media (e.g., history of product photos used in classification), and other properties. Herein, an item may generally refer to the physical product, artifact, or manifestation that corresponds to an object of the EOG unless otherwise specified. A SKU object can be substantially indivisible. Herein, indivisibility is generally within the context of the environment. For example, a particular cereal box may be considered indivisible within the context of a store even though in the real world it is generally composed of a box and individual cereal pieces; still, it is stored and sold as one box. In some scenarios, a SKU object may be divisible within the EOG (e.g., a six pack of drinks), sometimes yielding differently characterized objects.

The EOG may additionally include other types of object classifications, which can be associated with specialized properties. Other types of object within an environment might include shoppers, workers, shopping carts, storage devices (e.g., shelves), product moving devices (e.g., forklifts), and/or other suitable objects.

2. System

As shown in FIG. 1, a system of a preferred embodiment can include an imaging system 100 and an EOG system 200. The system primarily functions to track and account for physical items within an environment. The EOG system functions to use image-based object detection in building a computer-based representation of the contents of an environment. The EOG system can use a variety of approaches in building its representation of objects. The system may additionally include or be used in combination with a virtual cart management system, a checkout processing system, an inventory management system, and/or other supplementary system components. While, the system is preferably used in combination with an imaging system 100, the system can similarly be the EOG system 200 driven by image data from an outside imaging system.

Imaging System

The imaging system 100 functions to collect media within the environment as shown in FIG. 2. The imaging system 100 preferably includes a set of image capture devices 110 (e.g., digital cameras). An image capture device 100 might collect some combination of visual, infrared, depth-based, lidar, radar, sonar, and/or other types of imagery. In variation, the imaging system 100 is a multitude of image capture devices 110 distributed in the environment with the image capture devices 110 positioned at a range of distinct vantage points. Preferably, the imaging system 100 is a high density imaging system. A high density imaging system is preferably characterized by a large portion of the relevant portions of environment normally observed by an image capture device. A large portion, in one example, can be characterized as greater than 95% of surface area of interest. High density may additionally be characterized as having redundant coverage. In one example, high density imaging system may be characterized by one camera for every one hundred square feet of surface area of interest (e.g., the ground, product storage faces, etc.). In an environment like a small grocery store this can be twenty cameras distributed for coverage of two thousand square feet of surface area of interest. The imaging device 120 to environment space ratio could be any suitable ratio. In an alternative variation, the imaging system 100 may include only a single image capture device.

The image data is preferably video but can alternatively be a set of periodic static images. In one implementation, the imaging system 100 may collect image data from existing surveillance or video systems. The image capture devices 110 may be permanently situated in fixed locations. Alternatively, the image capture device 110 or a subset of the image capture devices may be moved, panned, zoomed, or carried throughout the facility in order to acquire more varied perspective views.

The system can accommodate a wide variety of imaging system 100 setups, and the system can be robust while using inexpensive commodity image capture devices 110. An image capture device 110 can be set to an imaging capture configuration. In one implementation, the imaging system 100 may include a set of image capture device 110 in different imaging capture configurations. The various imaging capture configurations function to allow different systems to focus on providing a view into particular types of object information. For example, the set of imaging capture configurations may include an inventory storage capture configuration, an interaction capture configuration, an object identification capture configuration, and/or a movable capture configuration. The various configurations may involve use of a particular type of image capture device 110 and/or a type of mounting of the image capture device.

Figure 5:
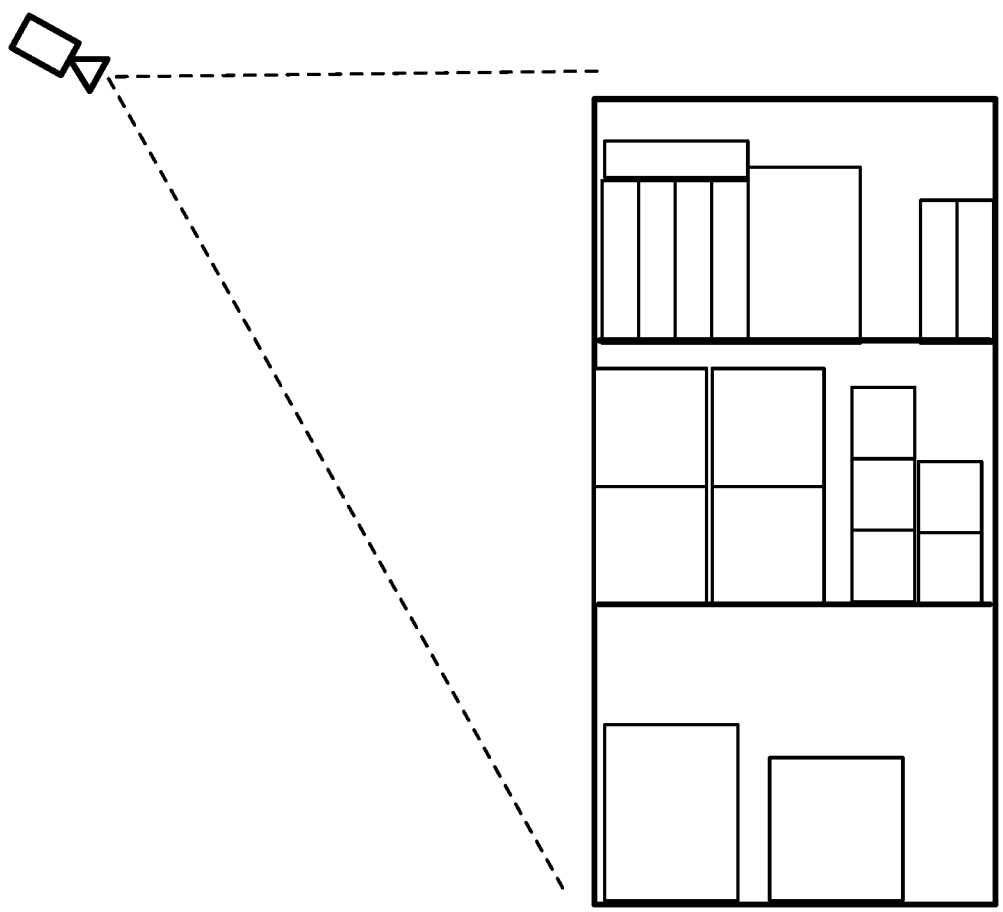
FIGS. 5-8 are schematic representations of exemplary image capture device configurations of the system.

An inventory storage capture configuration functions to view inventory in their expected storage locations. An inventory storage capture configuration can include a camera directed at a shelf or storage solution that holds inventory items as shown in FIG. 5. Generally, image data from an image capture device in an inventory storage capture configuration will have a substantial portion of the field of view directed at stored inventory. The inventory storage capture configuration can be used in detecting changes to objects on the shelf before, during, and after an interaction. A variety of inventory storage capture configurations may be used. For example, overhead inventory storage capture configuration may have an image capture device directed diagonally down towards a shelf. In another example, a direct inventory storage capture configuration can be an image capture device directed substantially at a product storage area, such as being mounted across an aisle. In another variation, an inventory storage capture configuration can include an internal inventory storage capture configuration wherein an image capture device is positioned so as to have an internal view of a storage element. For example, image capture device can be positioned on the inside of shelves to view products from the back of shelves.

Figure 6:
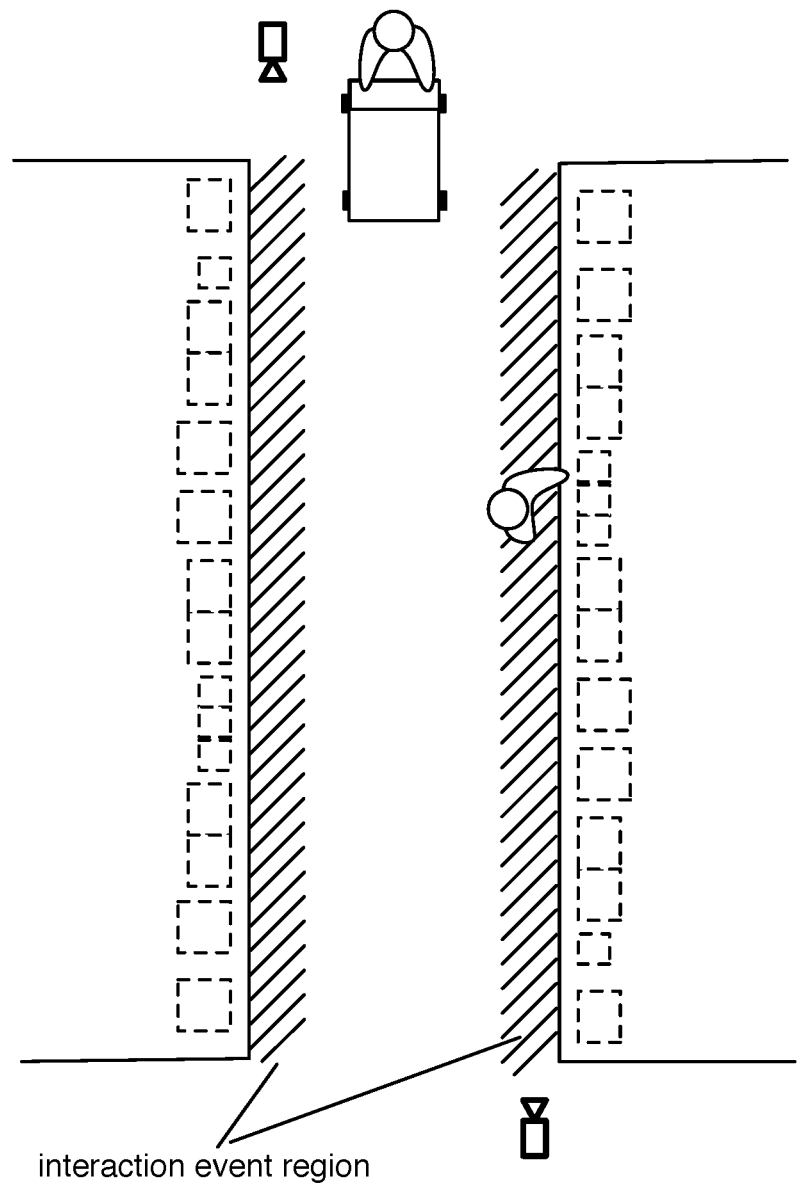

An interaction capture configuration may function by detecting and characterizing interactions between objects. In particular, the interaction configuration may be configured for detecting and characterizing interactions between a person and a shelf of objects as shown in FIG. 6. An interaction configuration can detect the nature of interaction between a person and a shelf. In a basic implementation, the interaction capture configuration detects if a person breaks a defined plane around products such as the front plane of a shelf to interact with objects on the shelf. The interaction capture configuration may include a visual video camera that is directed in a direction substantially coplanar with the face of a shelf so as to show how a person interacts with an inventory storage compound. For example, in a store, a camera in an interaction capture configuration may be directed down an aisle. A series of imaging devices can be positioned periodically down an aisle, wherein each image capture device is intended for detecting interaction events with subsections of the aisle.

Figure 7:
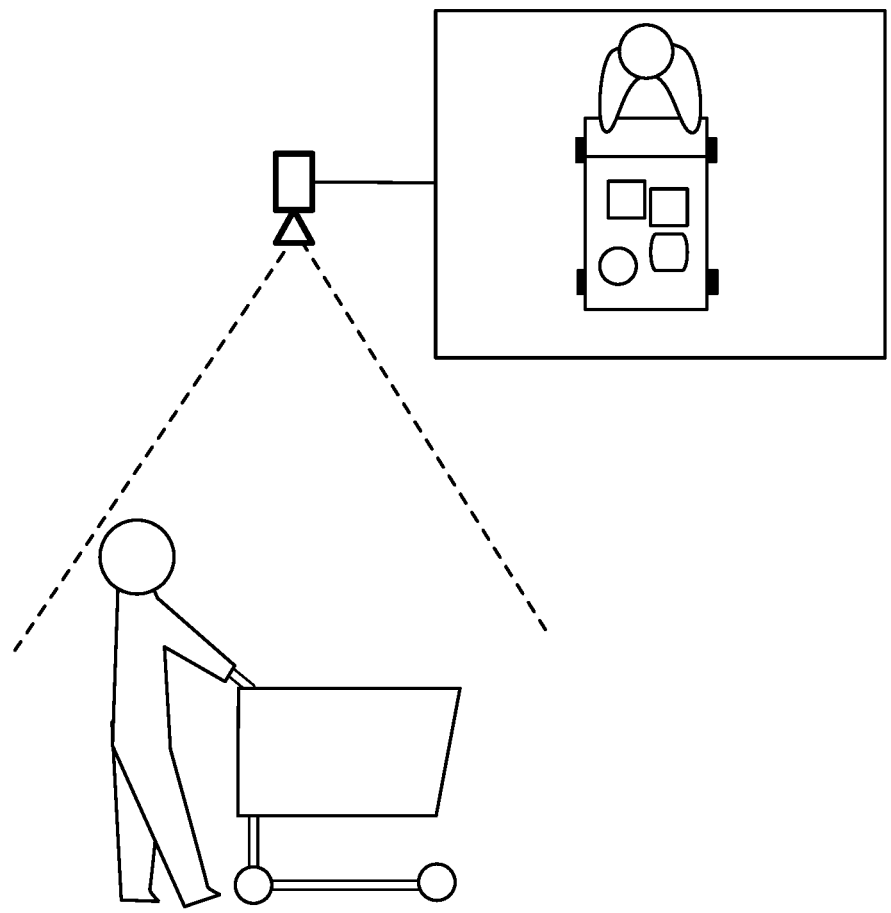

An object identification capture configuration may be used in uniquely identifying an object as a particular item. Such object identification capture configurations can be customized for various scenarios. A person-focused variation may be used for inspecting person-based objects. In a store, the person-focused capture configuration may involve an image capture device directed down from above so as to detect items in the shopping cart of a shopper as shown in FIG. 7. In another variation, a person-focused configuration may be mounted at head-height (e.g., greater than three feet and less than nine feet) and used in identifying people based on their facial features. A checkout-focused variation can function to identify objects during a checkout process. The checkout process may involve more clear presentation of items such as a shopper or worker physically presenting the product in an inspection region. For example, a user may be required to place items on a conveyer belt. The checkout variation may include one or more imaging devices for detecting objects and updating the EOG based on checkout interactions. Another type of configuration may involve using a high definition camera and an actuating mount so that the imaging device can target particular objects or locations to collect data.

Figure 8:
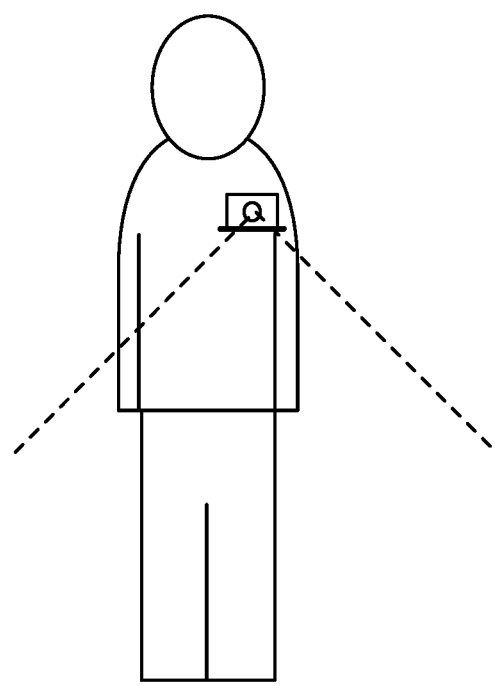

A movable capture configuration may be used to provide image data from dynamic location and/or orientations. A movable capture configuration can be used to adapt to dynamic situations. For example, one or more imaging systems 100 may be mounted to a robot or person as shown in FIG. 8, and collect image data as the imaging device is moved through the environment. The movable configuration may be used in collecting higher resolution or alternative, or otherwise obstructed vantage points. A movable capture configuration can additionally be used as a calibration tool in collecting image data used in resolving modeling issues.

In common use, most capture configurations shall be blended use, supplying information on more than one of the described situations.

Image data from an image capture device 110 is preferably streamed or otherwise communicated to a processing component of the EOG system 200.

EOG System

The EOG system 200 functions to generate, execute and/or otherwise maintain an EOG model representation. The EOG system 200 is preferably a combination of operational processes used in maintaining the EOG and data systems in storing and interacting with the model. Various data database and modeling implementations may be used in implementing the EOG system 200. The EOG system 200 preferably uses an EOG processing engine 210 to manage an EOG data system. The EOG preferably has an imaging system interface for receiving data from the imaging system 100 and/or external image data sources (e.g., an existing surveillance system). The EOG system 200 could additionally include one or more supplemental data interfaces, which can be used in collecting data from or updating data services. Exemplary supplementary data inputs can include purchase pattern data, customer purchase history, product pricing data, inventory data (e.g., shipment orders, inventory maps/planograms, etc.), purchase transaction data, and/or other data inputs. Additionally, the EOG system 200 can include an inspection or query interface that facilitates interacting with the EOG. The inspection interface can be used for integrating other systems such as a checkout processing system or an inventory management system. The inspection interface can be used in making simple or complex queries or analysis of the EOG, which can enable acting in response to object state in the EOG.

The EOG system 200 is preferably operable within a computing system. In one variation, the computing system is an on-premise computing solution such as an application running on a computer connected to the vision system. In another variation, the computing system is a remote computing solution, wherein part or all of the processing is performed at a remote location. For example, a cloud or distributed computing system may be used. Alternately, an on-premise system may do a portion of the computational work, such as collecting media streams from the vision system, while the remaining computational work is performed at a remote location. More preferably, the EOG system 200 is integrated with the image capture devices 110 of the imaging system 100 wherein the process of maintaining the EOG is distributed across imaging devices, which can function to alleviate data communication and/or storage limitations or challenges.

The EOG processing engine 210 uses input from a computer vision system as well as other data inputs such as inbound/outbound product orders, itemized POS checkout reports, manual inventory inputs, and/or other object inputs. Supplemental data inputs, which can relate to operational aspects of the environment, can be used in altering classification and modeling in the EOG and/or in inspecting or interpreting an EOG.

The various inputs are processed by the EOG processing engine 210 and used in storing information or updating EOG representations stored in the EOG data system. The EOG system 200 can characterize compound objects in a hierarchical order. Objects can have parent and child relationships. The parent of an object is generally the object that contains it. The child of an object is an object that it contains. For example, a box containing apples will have the box as the parent object and the apples as the child objects. The EOG can additionally represent historical data associated with an object relationship. For example, multiple shoppers may each remove items from a box. The items possessed by the shoppers may be unknown at the time. The subsequent identification of an apple with one shopper may be used to update the representation of the box from which the apple was contained, which can then be used to update the understanding of those items from the same box as apples possessed by the other shoppers. In this example, propagation of information through object relationships can similarly be used to update the representation of the crate from which the box originated and other aspects within the EOG system 200.

In the process of maintaining an EOG, the EOG system 200 can use a variety of approaches to draw conclusions about the state of items (e.g., inventory) in an environment. In one implementation, the EOG system 200 can draw information updates through processes such a static process, an interaction process, and/or an associative propagation process.

The EOG processing engine 210 preferably implements a static process wherein data from a given instance is used in part to update the EOG's representation of the objects in that instance. Static processes can relate to object segmentation, classification, object tracking, and/or other algorithmically driven conclusions of the image data. The static process can be a real-time computer vision analysis of the data inputs, which uses the available information without necessarily accounting for historical based object associations of the EOG. A static process preferably uses the current image data from the computer vision system or imaging system. In one variation of a static process, computer vision and other approaches may be used in identifying objects. The classification of an object may include SKU object identification, unique shopper identification, general object classification, or unidentified object classification.

Classification can leverage use of image feature extraction and classification, statistical machine learning, neural networks, heuristical processes and other suitable approaches. In one variation, image feature extraction and classification can be used in classifying multiple objects present in image data, which may use processes like visual words, constellation of feature classification, and bag-of-words classification processes. These and other classification techniques can include use of scale-invariant feature transform (SIFT), speeded up robust features (SURF), various feature extraction techniques cascade classifiers, Naive-Bayes, support vector machines, and/or other suitable techniques. In another variation, Neural networks or CNNS such as Fast regional-CNN (r-CNN), Faster R-CNN, Mask R-CNN, and/or other neural network variations and implementations can be executed as computer vision driven object classification processes.

Tracking of an object can similarly be a process operating on raw image data. Object tracking can use various techniques such as optical flow, algorithmic target locking and target re-acquisition, data-driven inferences, heuristical processes, and/or other suitable object tracking approaches. As discussed herein, the EOG can additionally be used to supplement or facilitate classification and tracking of an object.

Static processes can additionally be used in collecting or generating contextual information. Contextual information relating to the object classification may be used in building a representation of that object. Contextual information can include the location of the object or imaging device that captured the image, the time of day, seeded or existing inventory information or rules, and/or other types of contextual information. For example, a box identified as an apple crate that is detected in the warehousing section of a grocery store around the time of expected shipment delivery may initially be presumed with moderately high likelihood to contain a full box of apples (e.g., 40 apples), and represented as such.

Figure 9:
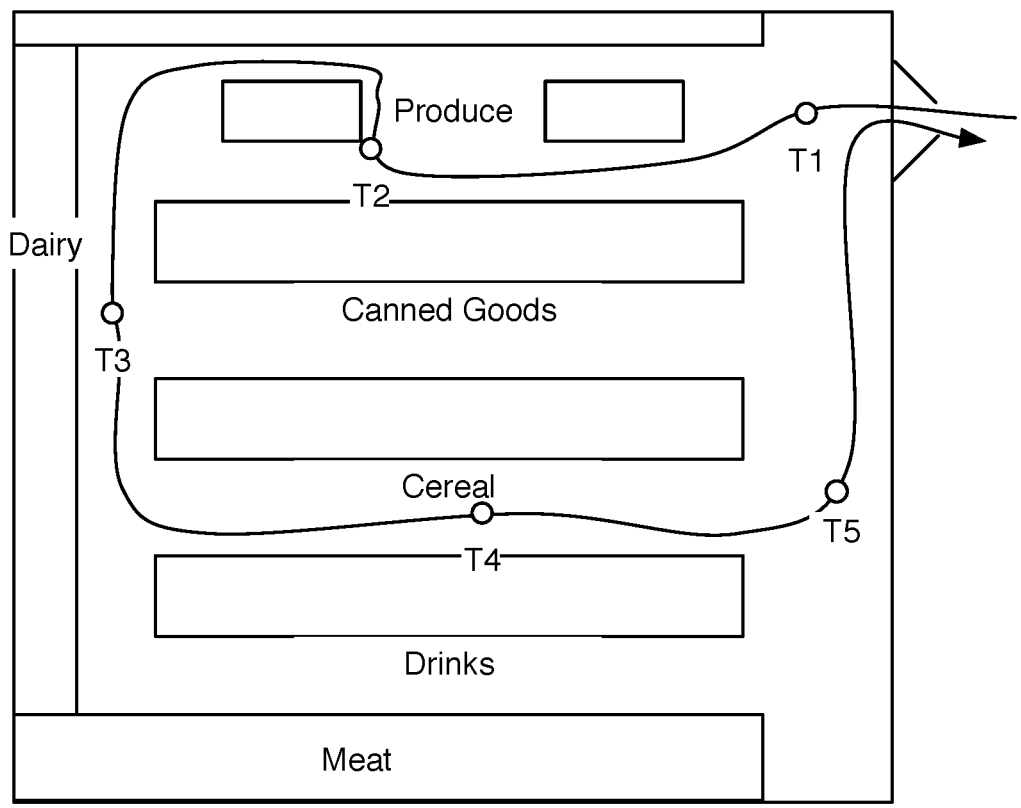
FIG. 9 is a schematic representation of interaction modeling for an exemplary path of a shopper.

The EOG processing engine 210 can additionally include an interaction process, which functions to draw conclusions on the state of items in an environment based on object interactions. An interaction process can involve two or more objects, which generally is associated with proximity, contact, and/or changes in objects in some region between objects. For example, the representation of two objects can be updated when the objects make contact or are moved to be within a particular proximity. As shown in FIG. 9, the path of a shopper through the store can alter the EOG of the shopper object based on proximity to particular objects in the store. The interaction process may include a variety of object transformations. Object transformations generally show the transition of a first set of objects into a second set of objects. An interaction process can additionally involve a change in classification, identity, or probabilistic representation of one or both objects. As shown in FIG. 10, examples of basic object transformations related to interaction events may include revealing contents of an object, concealing an object by another object, splitting an object into more than one object, merging a set of objects together, appearance of an object, and disappearance of an object.

The EOG processing engine 210 may additionally have an associative propagation process, which functions to draw conclusions on the state of items in the environment based on observations over a history of observations. The propagation process generally relies on input collected over a longer period of time in updating the EOG than the interaction or static processes. In a propagation process, updates to one part of the EOG can propagate through historical object associations and relationships to update a second part of the EOG at one or more other instances in time or space. The propagation process is preferably used in combination with the static process and the interaction process.

As a general example of a propagation process, a box may initially be characterized (incorrectly) with low probability as an apple box and is therefore presumed to contain apples. A first shopper is seen removing an item but that item is not clearly identified; so, that first shopper is initially updated (incorrectly) as having removed an apple and added it to a shopping cart. A second shopper is subsequently seen removing some object from the same box, but that object is classified with much higher probability as a grapefruit. The box in the EOG may be updated to be more likely to contain grapefruit. Additionally, the first shopper in the EOG may be updated to also possess (e.g., modeled as "containing") a grapefruit through the propagation process of the EOG system 200. Mistakes can be made in the initial static process, but they are preferably well tolerated by the systems because that can be corrected later. In this way the represented quality of the entire EOG actively can evolve to be more accurate over time. Since there are many more opportunities to correct a mistake than to get it right the first time, the overall EOG system 200 functions with a very high certainty.

The system can additionally includes a reference object database that functions to provide object property information. Object property information may in some variations be used in modeling objects through the EOG system 200. Object property information may alternatively or additionally be used in applying the modeled objects in some application.

A reference object database preferably includes at least an inventory reference database. The inventory database preferably includes product or SKU information and properties such as item physical properties, item business properties such as price, purchase popularity, related items, and/or other information. A set of image training samples of products can additionally be part of the reference object database.

A reference object database can additionally include a person reference database, which functions to store and model information relating to person properties. This can include references to bio-identification models. The person reference database can additionally include personal shopping patterns, wishlists, payment information, account settings, and/or any suitable information. Personal shopping patterns can include history of past purchases. It can also include personal information such as allergies, nutritional restrictions or goals, and/or other personal information that can inform the EOG system.

Other object reference database components can enable access to other information. For example, an environmental object database can store information related to other present objects such as shelves, bins, carts, baskets, refrigerators, forklifts, and/or other commonly observable objects within the environment.

System Integration Options

The system is preferably used in combination with one or more additional systems that operates in part based on the EOG. The additional systems preferably function to inspect object state through the EOG and then to trigger some actions based on that object state. Those actions can be used in altering the state of the system in monitoring the surveillance of the environment and/or to perform some outside action. Potential supplemental system components can include a virtual cart management system 310, a checkout processing system 320, inventory management system 330, a calibration tool 340, a notification system 350, a metamedia storage system 360, a manual task management system 370, a management system 380, and/or other integrated system components.

Virtual Cart Management System

In some variations, the system can include a virtual cart management system 310, which functions to facilitate managing commerce model of collected items that may be involved in an eventual transaction. The virtual cart management system preferably operates on the EOG model in determining an itemized list of SKU objects that can be assigned to a "virtual cart" or checkout list. A virtual cart refers to the set of items selected for a transaction (e.g., a purchase transaction, a rental transaction, usage transaction and the like). Here, selection of items is interpreted as being associated with a classified shopper object, which can be one or more of a human shopper, a cart, a basket, a bag, a box, and/or more generally a collection of objects in a checkout region. For example, a virtual cart can consist of the objects possessed by a shopper but could alternatively be items contained in a cart, basket, and/or any suitable entity or combination of entities. A virtual cart is preferably generated in part from the EOG system 200 by detecting the objects modeled as "possessed" or "contained" by an shopper object. The virtual cart management system 310 can manage multiple virtual carts simultaneously.

The virtual cart management system 310 can include a cart resolution process that inspects the EOG for relevant object state information and transforms objects from an EOG model to a list of predicted SKU objects. For example, the virtual cart management system 310 can include configuration to identify the set of predicted objects possessed by a shopper and/or contained in a cart when the shopper is in a checkout region of a store, and then to convert the set of predicted objects into a checkout list. That conversion can take into account the confidence of object modeling (e.g., classification) and the operational cost of including or not including a product (e.g., impact on customer satisfaction, financial cost of missing a potential sale, etc.). Additionally supplemental data input can be used in converting from a CV-driven model to a checkout list that reflects operational trends. Heuristical methods, deep learning, and/or other techniques can be applied during the translation process. In one example, SKU objects are added to a checkout list based on the classification confidence levels, and confidence level thresholds can be varied based on SKU object price, popularity, and/or other operational data inputs. In some cases, the resolution process may be biased to avoid overcharging a customer or not charging a customer for a product when confidence in the EOG modeling of that object does not satisfy a particular condition. This can function to layer business operational objectives on top of computational detection processes.

The compound object modeling aspect of the EOG can be used so that observations in one region can translate into modeling a hidden object being present in a second region. As discussed above and further described herein, the EOG does not depend on direct observation of objects at a particular location in maintaining the presence of that object. In this way, all the items in a full shopping cart that are obscured from view when in a checkout region can be associated with a virtual cart during checkout process.

Checkout Processing System

In some variations, the system can additionally include a checkout processing system 320, which functions to integrate a checkout processing system with the operation of the EOG system 200. The checkout processing system 320 can be used in combination or independently of the virtual cart management system 310. A checkout processing system 320 can be a physical system like a point of sale (POS) kiosk that facilitates the checkout process. The checkout processing system 320 can be an integration used within the system to access data (e.g., barcode reader data, transaction data, etc.) from the checkout processing system directly or indirectly and/or by update state of a checkout processing system such as by prepopulating a POS device with the checkout list or product prediction data input. Alternatively, the checkout processing system 320 can be a checkout processing system 320 that includes a payment input, user interface components (e.g., screen, input device, etc.), and/or other basic components. In one variation, the checkout processing system 320 can include an image capture device 110 that is in a POS capture configuration. A POS capture configuration can be a camera directed at an item scanning region of the checkout processing system 320 such as a conveyor belt, barcode scanning region, an item scale, and/or any suitable region of a physical checkout processing system. In another variation, the checkout processing system 320 may be an application operable on a computing device such as a smart phone, a tablet, a wearable computer, or any suitable computing device. An application variation of the checkout processing system 320 can include camera integration with the computing device and may include a payment input device such as a payment card reader or other suitable payment input devices. In another variation, a customer-facing application can communicated a checkout list, which can be reviewed and optionally confirmed by a customer when completing a checkout process.

The checkout processing system 320 preferably can be used as: a training component of the EOG system 200 and/or a controlled output of the EOG system 200.

In a training operating mode, the checkout processing system 320 preferably functions to provide additional training data of product images. For example, an image capture device 110 in a POS capture configuration can collect product images while a barcode scanner and/or other POS inputs is used to collect product identification information. A corpus of training data can be collected and maintained through normal product checkout processing. The training operating mode of the checkout processing system 320 can be used in onboarding a new store with a unique set of products by generating a set of labeled image data for products. Similarly, new products or changes in packaging can be automatically enrolled because of the training operating mode of the checkout processing system 320.

Additionally or alternatively, the training operating mode may be used in combination with active use of the EOG system 200 and the virtual cart management system 310. A modeled virtual cart can be generated for a shopper object. If that shopper object then uses a traditional checkout process then the results of the traditional checkout process can be compared to the virtual cart. Discrepancies can be used in updating and training the system. In addition to or alternatively, updated information confirmed during a traditional checkout process can be propagated through the EOG model so as to augment modeling.

An input operating mode of the checkout processing system 320 preferably functions to enable the EOG system 200 to augment and/or control a checkout processing system 320. In one variation, a checkout processing system 320 used by a worker or a customer to pay could have items automatically added to expedite the checkout process. For example, a customer could approach the checkout processing system 320, and without actively scanning an item, the checkout processing system 320 could be updated when the shopper is detected in the vicinity of the checkout processing system 320 to include the products in the virtual cart as indicated by the virtual cart management system 310. The items automatically loaded for checkout can be a full list of items or a partial list. For example, products with a prediction confidence level above a threshold can be automatically added, and products with a prediction confidence level below a threshold may need confirmation and/or depend on manual entry. In another variation, the input operating mode may bias the checkout processing system 320 so that input of an item can be enhanced. For example, the EOG may be able to detect that some quantity of a variety of apples are probably selected by the shopper; a display on a checkout kiosk could display the apple option on a top-level menu so that the worker or customer can quickly select that product instead of navigating a menu of options to select the product.

Inventory Management System

In some variations, the system can include an inventory management system 330, which functions as an EOG interface for inspecting and observing inventory state. The inventory management system 330 preferably includes a user accessible user interface for accessing inventory information. The inventory management system can include configuration to prepare reports related to inventory totals, inventory ordering information, inventory locations, inventory shelf-life, inventory shopper interactions, and/or any suitable information. The inventory management system 330 can additionally include an inventory ordering system such that the system can be used to at least partially automate inventory ordering.

The inventory management system 330 can additionally include an interface for augmenting inventory state information, which can be used to apply user input in updating the EOG model. For example, the EOG model may detect that a crate was received and that the crate is predicted to contain some number of items with some confidence level. An administrator could confirm the contents of the crate, alter the identity of contained items, alter the count of contained items, or make may any adjustments.

Calibration Tool

A calibration tool 340 functions to enable calibration of object modeling and/or resolve model issues. The calibration tool 340 preferably communicates to the EOG system 200 to provide updated calibration data input concerning objects in the environment. The calibration tool 340 preferably provides input used in SKU object identification, counting of objects, confirming the absence of an object, and/or otherwise updating the state of the EOG mode with high confidence input. The calibration tool 340 is preferably a mobile device used by a worker or administrator of the system. In typical usage, a worker can go to various locations in the environment and collect input. Alternatively a calibration tool could be integrated into a consumer-facing application as a background service such that through normal usage, the application can be used in calibrating the EOG system 200.

In one variation, the collection of input can be directed such that areas with low confidence modeling can be resolved. For example, if a shopper shuffling through items has resulted in low confidence modeling in the EOG, then a worker can be notified and directed to use the calibration tool 340 in that area to determine the identity and number of items in that region. This can return that region to high confidence modeling. In combination with model propagation, changes in modeling in one region can translate to propagating the update to alter the object state of an object in another region. The calibration tool can additionally be used in indirectly enhancing modeling of a shopper when updated information from the calibration tool 340 is propagated by the EOG system such that objects possessed by the shopper are more confidently modeled.

An image capture device serving as a mobile configuration can be included in the calibration tool 3400. Alternatively, a barcode scanner, an RFID tag reader, or any suitable product identification input devices can be used. Alternatively, a user interface input can enable a worker to manually enter information.

The calibration tool 340 can be an application operable on a computing device such as a smart phone, a tablet, or a wearable computer device. The calibration tool 340 could alternatively be a custom device. For example, the calibration tool 340 could be a computing device with a display and user input that also includes a barcode scanner and optionally an integrated image capture device 110. The custom calibration tool 340 could communicate with the EOG system 200 through a network or by directly communicating with a communication channel of the system.

The calibration tool 340 can additionally include a positioning element such that the location within the environment can be confirmed. The positioning element can facilitate detection of environment location through the image data collected by the imaging system 100. For example, a visual beacon or marker could be displayed by the calibration tool 340. Alternative positioning technology such as RF beacon triangulation technology or other positioning systems may be used.

Notification System

A notification system functions to enable generation of alerts and feedback. The notification system 350 can include interfaces configured for transmission of notifications over various communication channels. This can be used in alerting workers. For example, workers may be notified of a calibration request so that a worker can use the calibration tool 340 to resolve some issue. In another example, a worker may be notified to assist a customer that is associated with a low confidence modeling state. This low confidence modeling state could be a result of normal customer behavior but could also be through user behavioral targeted to confuse the system. The notification system 350 could additionally include programmatic interfaces such that the various other systems and services can be updated or integrated in response to various conditions in the EOG.

The system could additionally include a rules engine that inspects the EOG model for particular conditions and uses that data in triggering different actions or events. These actions can be internal actions but could also be actions with outside systems. For example, a programmatic interface of the notification system 350 could be used in triggering some action at an outside service or communicating updated data to an outside service.

Meta-Media Storage System

A meta-media storage system 360 functions to store media in a dynamic format that mixes media data and metadata observations of the environment. The meta-media storage system 360 is preferably configured to store a dynamic media content representation in coordination with the environmental object graph. As opposed to traditional surveillance systems that store captured media in the original or a compressed version of the media, the system and method can use EOG modeling to alleviate dependence on maintaining a media file on record for each moment. Preferably, media is stored for image observations of objects modeled with low confidence. Additionally, the media quality may additionally be dynamically adjusted. For example, very low confidence observations may result in high quality media storage, moderate level confidence may result in medium quality media storage, and high confidence in EOG modeling may result in metadata only storage. In addition to media quality, the media representation could be dynamically isolated to subregions of image data, where only media related to visual observations of low confidence modeling may be stored.

The meta-data storage system 360 could additionally include a meta-media player system that is configured to synthesize the meta-media data into a representation of the visual observations. Meta-data modeling can be used to procedurally simulate, generate media, or enhance existing media data.

Manual Task Management System

A manual task management system 370 functions to augment operation of the system with manual operators used in facilitating image processing or analysis. The manual task management system 370 preferably selects worker tasks, delegates the worker tasks to a worker, and then interfaces with the EOG system 200 and/or the notification system 350 in taking appropriate action. The manual task management system 370 is preferably used in scenarios where object classification and/or EOG modeling have low confidence. Workers can be used to supplement the process by inspecting the image data and providing some analysis. In one variation, a manual task request can be triggered when an object can't be confidently classified. In the manual task request, a worker may be requested to select from possible object options. In another variation, the worker may directly enter a classification of the object (e.g., an identifier of a SKU, a description of the object, etc.). In another variation, a manual task request can collect multiple instances of image data associated with events involving an object and request analysis of a chain of observations. This may be used in detecting people attempting to prevent accurate modeling.

The manual task management system can work in connection with the notification system and a rule engine such that modeling conditions that satisfy a condition can trigger a manual task request to have a person provide analysis and input.

The manual task management system 370 may redundantly delegate worker tasks and/or delegate worker tasks to appropriate workers. For example, product identification may be delegated to a junior worker and a worker task of verifying suspicious shopper behavior can be delegated to a manager.

Management System

The system may additionally include a management system 380 that functions to provide administrators an interface for inspecting and/or altering operational options within the system. The management system 380 can be used in setting operational options and configuring the system.

The system could additionally or alternatively include or be integrated with various other components relating to inventory management, commerce, worker management, consumer-facing services, and the like.

3. Method

Figure 11:
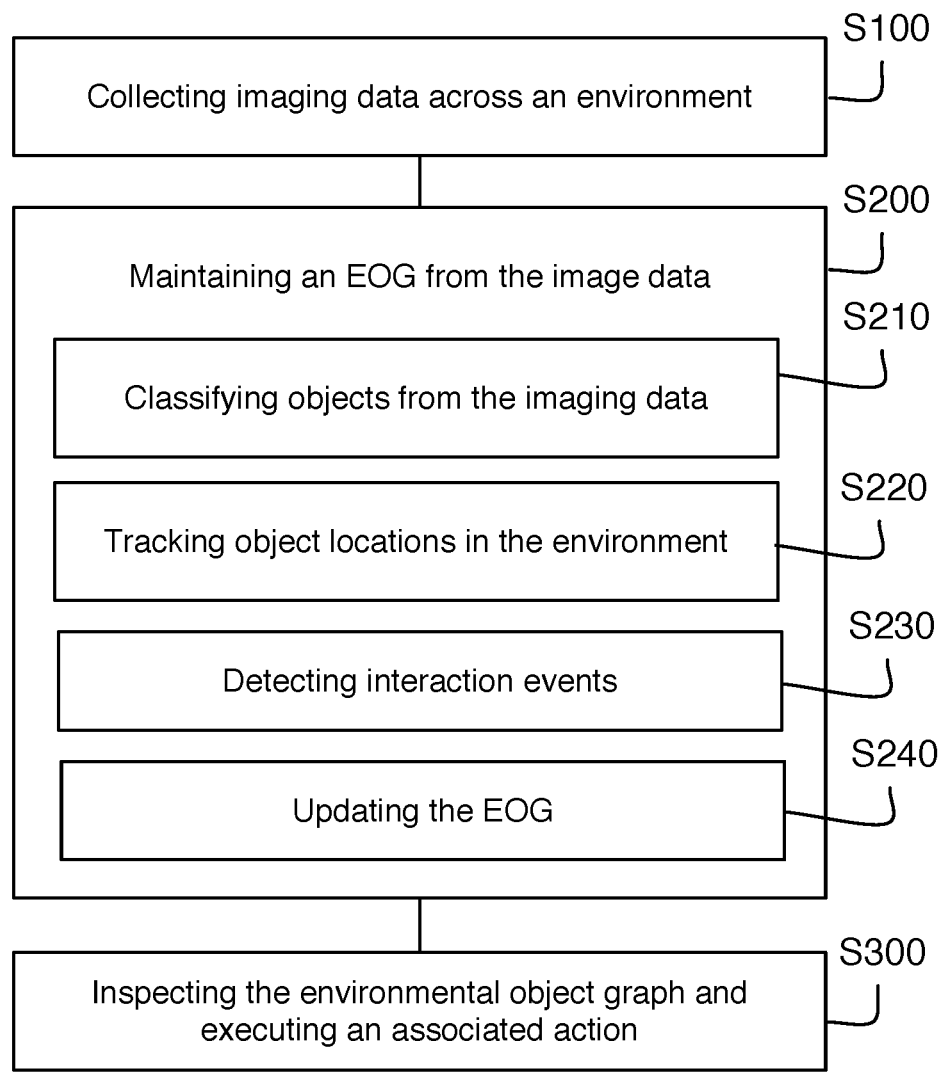
FIG. 11 is a flowchart representation of a method of a preferred embodiment.

As shown in FIG. 11, a method for environmental object modeling of a preferred embodiment can include collecting image data across an environment S100, maintaining an EOG from the image data S200, and inspecting the environmental object graph and executing an associated action S300. The EOG is preferably a data representation of classified objects in space and time across the environment, and the EOG preferably includes at least a subset of object instances having probabilistic object associations. Maintaining the EOG S200 is preferably an iterative process comprised of multiple process instances comprising: classifying objects from the image data S210, tracking object locations in the environment S220, detecting interaction events S230, and/or updating the EOG S240. The method is preferably applied across a plurality of objects within an environment, and the method is preferably iteratively performed to maintain a statistically accurate representation of the objects within the environment. The method can be implemented in combination with the system above or any suitable alternative system.

The method can apply additional approaches in a variety of ways. Implementations of maintaining the EOG can include EOG associated processes such as compound object modeling, probabilistic modeling of multiple object states, and longitudinal object tracking. Additional processes of the method can include scoped object classification and applying operational biasing.

Compound object modeling in maintaining the EOG can enable detecting objects as having a classification and a probability of containing other objects. Probabilistic modeling of multiple object states can enable the method to maintain different object states. Longitudinal object tracking can be facilitated through propagating object state across object associations in the EOG—observational data at different times and places can further refine object modeling in the EOG. Scoped object classification can enhance object classification by contextually setting and adjusting the set of candidate objects used in CV-based object detection. Operational biasing can enable other data inputs such as other sensed inputs or data sources to alter the execution of an EOG.

The method can propagate certainty through an EOG (e.g., backwards in time and forwards in time) as more information is collected. The use of the EOG modeling approaches function to make the method robust in response to a limited, intermittent, or temporarily unclear flow of input. The method can tolerate and operate on imperfect information, while seeking to improve its knowledge through subsequent observations. The burden of precision can be reduced in some areas, and delayed in many others. For example, the method can maintain operationally reliable predictions of products that were selected by a shopper and then held by the shopper, added to a bag, or added to a cart as the shopper was moving through the store. This can then be used in automatically completing a checkout process wherein predicted products are credited to a shopper account and/or by automatically populating a checkout processing system with the predicted products. As another example, inventory tracking can be maintained with usable accuracy even when objects are obscured on a shelf or in a storage container. The method is preferably implemented through a system such as the one described above, but any suitable type of system may alternatively be used.

In one implementation, the method can function to facilitate a shopping checkout process. In one variation, facilitating a shopping checkout process can include assisting an existing checkout process. For example, self-checkout kiosks could be made more efficient by using probabilistic understanding of shopper possessed items to make scanning of items faster. In another variation, the method may be used for automatically checking out a shopper. For example, the method may be used to detect the objects selected by a shopper, identify a shopping account of the shopper, and charge the shopping account for the selected items upon leaving the store.

The method may additionally function to facilitate identification of unknown objects at checkout time. When a previously unknown object is observed to have had its barcode scanned, the resulting SKU can affirmatively be associated with that object, and future objects having similar appearance and/or properties can be assigned a higher likelihood of bearing that same barcode and SKU. After many such scanning events, a much higher likelihood can be assigned to subsequent objects with similar appearance having the same SKU number. In this way, machine learning deep-learning, statistical modeling, and/or other machine intelligence strategies can be employed to continually improve on areas of weakness. In some cases, inventory items could be automatically enrolled into the system through such a process such that manual on-boarding of new products may be avoided.

The method can track inventory within an environment by building and evolving a logical representation of the environment and its contents. Generally, the tracking of inventory can involve counting or estimating inventory items. The tracking of inventory may additionally include tracking the location of inventory items. The tracking may additionally include monitoring object groupings or object-to-object associations. For example, the system may be able to track that one object was carried by a shopper before being set down on a shelf. Object relationship tracking can have particular applications for objects that have restrictions on how they are stored or managed. For example, ice cream that was removed from the freezer for a particular duration may be detected, and a worker can be notified to move the item back into the freezer.

The method may additionally function to supplement security surveillance or other visual surveillance applications. In one variation, the method can trigger an alert when a person attempts to leave the store with an unpaid item. In another variation, the method can be used in converting surveillance data to a data representation, which would be more efficient for long-term data storage. The method can additionally be used in triaging in order to trigger the long-term archiving of surveillance media associated with interactions that may benefit from media recording.

The method can additionally or alternatively be used in other applications. In one variation, the method may be used in inventory locating. Workers or shoppers may be able to search for the location of an item. In another variation, the method may be used in inventory stocking automation. The method may be used in reordering products or monitoring the shelf life of perishable items. The method could alternatively be a generalized platform with a programmatic interface such that custom applications and system/service integrations can operate in coordination with the method.

Collecting Image Data

Block S100, which includes collecting image data across an environment, functions to collect video, pictures, or other imagery of a region containing objects of interest (e.g., inventory items). Preferably, collecting image data occurs from a variety of capture points wherein collecting image data includes collecting image data from multiple image capture devices (e.g., cameras) distributed at distinct points in the environment. The set of capture points can include overlapping and/or non-overlapping views of monitored regions in an environment. The set of capture points can additionally establish a high density imaging system within the environment. Alternatively, the method may utilize a single imaging device. The image data preferably substantially covers a continuous region. However, the method can accommodate for holes, gaps, uninspected regions, and/or noncontiguous regions. In particular, the method may be robust for handling areas inappropriate for image-based surveillance such as bathrooms and changing rooms. In these cases, statistical predictions during EOG execution can account for unobservable events.

As described above, the method may not be dependent on precise, exact information, and thus the collection of image data may be from an existing video surveillance system. The image data may be directly collected, and may be communicated to an appropriate processing system. The image data may be of a single format, but the image data may alternatively include a set of different image data formats. The image data can include high resolution video, low resolution video, photographs from distinct points in time, image data from a fixed point of view, image data from an actuating camera, visual spectrum image data, infrared image data, 3D depth sensing image data, parallax, lidar, radar, sonar, passive illumination, active illumination, and/or any suitable type of image data.

While, the method may be used with a variety of imaging systems, and collecting image data may additionally include collecting image data from a set of imaging devices wherein each subset is collected imaging devices in at least one of a set of configurations. The imaging device configurations can include: an inventory storage capture configuration, an interaction capture configuration, an object identification capture configuration, a movable configuration, a blended configuration, and/or any suitable other type of configuration. While an imaging device may be primarily set for one or more configurations, an imaging device may be used for any suitable purpose.

Collecting data from an imaging device in an inventory storage capture configuration functions to collect image data directed at a nominal inventory storage location. For example, a dedicated camera in an inventory storage configuration may be directed at storage shelves. An inventory storage configuration may be particularly suited for monitoring changes in stored objects.

Collecting data from an imaging device in an interaction capture configuration functions to detect the nature of an interaction between objects such as interactions between a shopper and a shelf or container. In one variation, an imaging device can be directed along a plane of interaction. For example, a camera may capture video down an aisle so as to detect when a shopper object has a physical interaction with items on a shelf. In some cases, multiple imaging devices may be used in combination. For example, a imaging device directed down an aisle may detect when a shopper crosses a defined shelf interaction plane, while imaging device in an inventory storage capture configuration can be used to determine the location along the aisle. An interaction capture configuration may be particularly configured for detecting occurrences of one or more types of interaction events.

Collecting data from an imaging device in an object identification capture configuration functions to target object identification in particular locations. An object identification capture configuration may include a higher resolution camera directed so as to identify products when in a particular inspection region. A limited number of object identification capture configurations can resolve uncertainty in the EOG. In particular, they may be used to resolve shopper objects. In a store where shopping carts are used, an object identification capture configuration may include a camera directed down at carts that pass beneath. Objects inside the cart may be more easily identified as specific product items. Such identification configurations may be located at key locations such as high traffic areas, near store exits, ends of aisles, or other suitable locations. In one variation, an object identification imaging device may be actuated so as to track or target particular objects. Object identification capture configurations may additionally or alternatively be used in a checkout or POS configuration variation. A checkout variation functions to collect object information for identification during a checkout process. A camera in a checkout configuration may be particularly configured to capture items as they are put on a conveyor belt or set out for inspection by a worker.

Collecting data from an imaging device in a movable capture configuration functions to generate image data from a variety of locations, possibly including dynamic focus. The movable imaging device may be mounted to a robot or moved by a worker. Note that in this case, a moveable robot may be one that has the ability to translate horizontally, or vertically, within the environment, or merely has the ability to pan, tilt, or zoom from a fixed location. An imaging device with a movable configuration capable of movement through the environment often utilizes the tracking location of the imaging device. In one variation, a movable imaging device can include an active positioning system that uses communications between a the imaging device and remote elements used to determine location such as precision GPS system, RF triangulation or other suitable techniques. In another variation, the method can include tracking the movable imaging device through the environment through image data. A visible beacon may be present on the imaging device to facilitate identification and tracking of the movable imaging device.

An imaging device in a movable configuration may be used in resolving and possibly reducing uncertainty. For example, if the EOG of inventory for one particular area of a store is unknown, or has a low level of certainty, then a worker may take a movable imaging device (e.g., a calibration tool) to collect additional image data for the purpose of resolving the uncertainty. More generally, workers could be equipped with movable image devices so that as they move about the environment, image data can be collected that may improve accuracy. The EOG can preferably increase the certainty of the inventory representations with targeted image capture through use of one or more movable imaging devices.

It should be noted that any individual camera or sensor may be a part of more than one configuration at a time and each configuration may serve more than one purpose.

Collecting image data may additionally include calibrating an imaging system. In one variation, calibration can include detecting a signaling point in the image data and associating the location of the signaling point in the real world to its location in the EOG representation, as it is built up from one or more source of images. The signaling point could be a light emitted from a location device such as a bulb, led, or smart phone; or a feature or features of the natural scene.

Maintaining the EOG

Block S200, which includes maintaining the EOG from the image data, functions to generate, execute, and update a probabilistic data model for objects in an environment. As discussed, the EOG is a data representation of classified objects in space and time across the environment. Additionally, the modeled object instances in an EOG can have object classifications, location, timestamps, and/or other properties such as SKU or product associated properties. The EOG can additionally be characterized as having at least a subset of object instances that have probabilistic object associations, where those associations can be between different object instances in time and space.

Managing the EOG can include iteratively processing the image data and applying various EOG processes. The EOG can use its adaptive accounting approach to leverage various image-based detection techniques. Various computer vision and signal processing approaches can be used in generating metadata from the image data. The image data can then be processed within an EOG processing engine to update an EOG model representation of the physical world. Maintaining the EOG can be used in building a probabilistic account of inventory items and other objects in the environment. Some objects may be affirmatively identified while other objects may be accounted for with varying levels of certainty.

Figure 12:
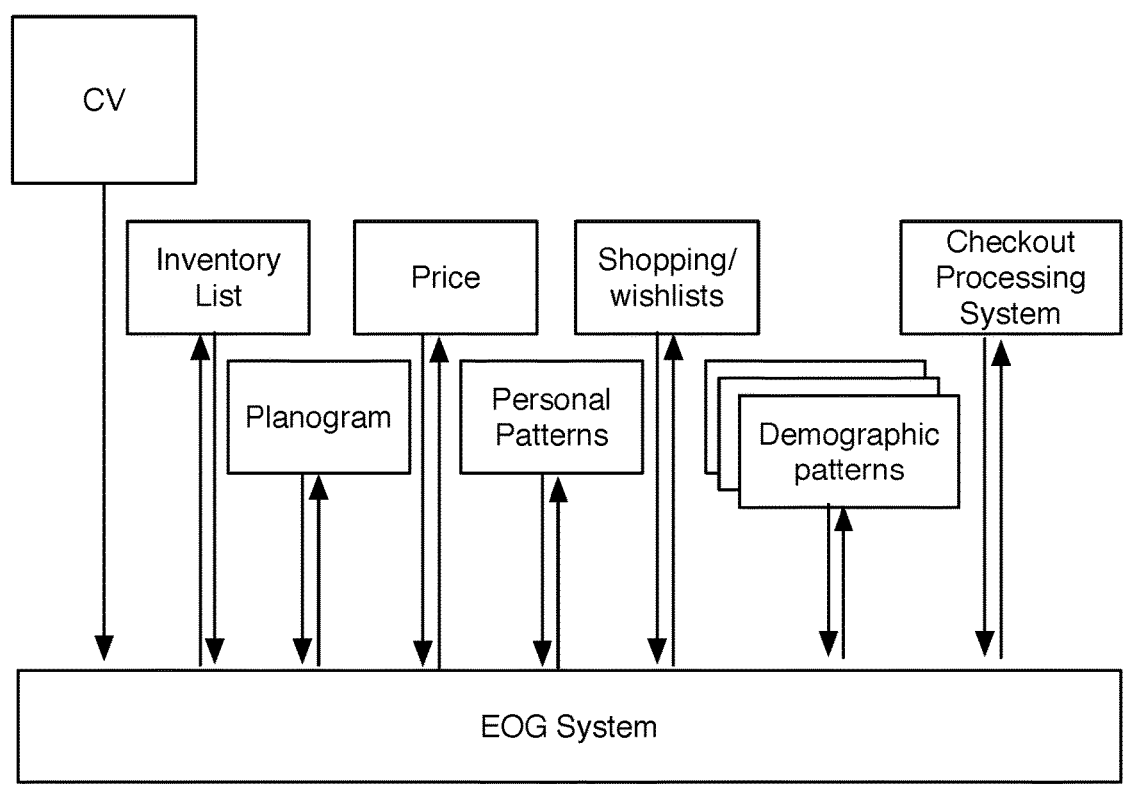
FIG. 12 is a schematic representation of exemplary integrations with supplementary data inputs.

In addition to use of image data, maintaining the EOG may utilize other object and environmental data inputs such as inbound/outbound product orders, itemized POS checkout reports, manual inventory inputs, product reference databases, environment planograms or maps, personal shopping patterns, personal shopping lists or wishlists, demographic pattern, and/or other object inputs as shown in FIG. 12.

Managing an EOG system preferably includes iteratively: classifying objects from the image data S210, tracking object locations in the environment S220, detecting interaction events S230, and/or updating the EOG S240 which preferably comprises propagating a change in an object instance across associations of the object instance.

Blocks S210, S220, and S230 can be used in combination in series or in parallel. In one variation, block S200 can execute primarily based on interaction events wherein blocks S210, S230, and S240 are employed. In another variation, blocks classification and tracking can be used wherein blocks S210, S220, and S240 are employed.

Figure 13:
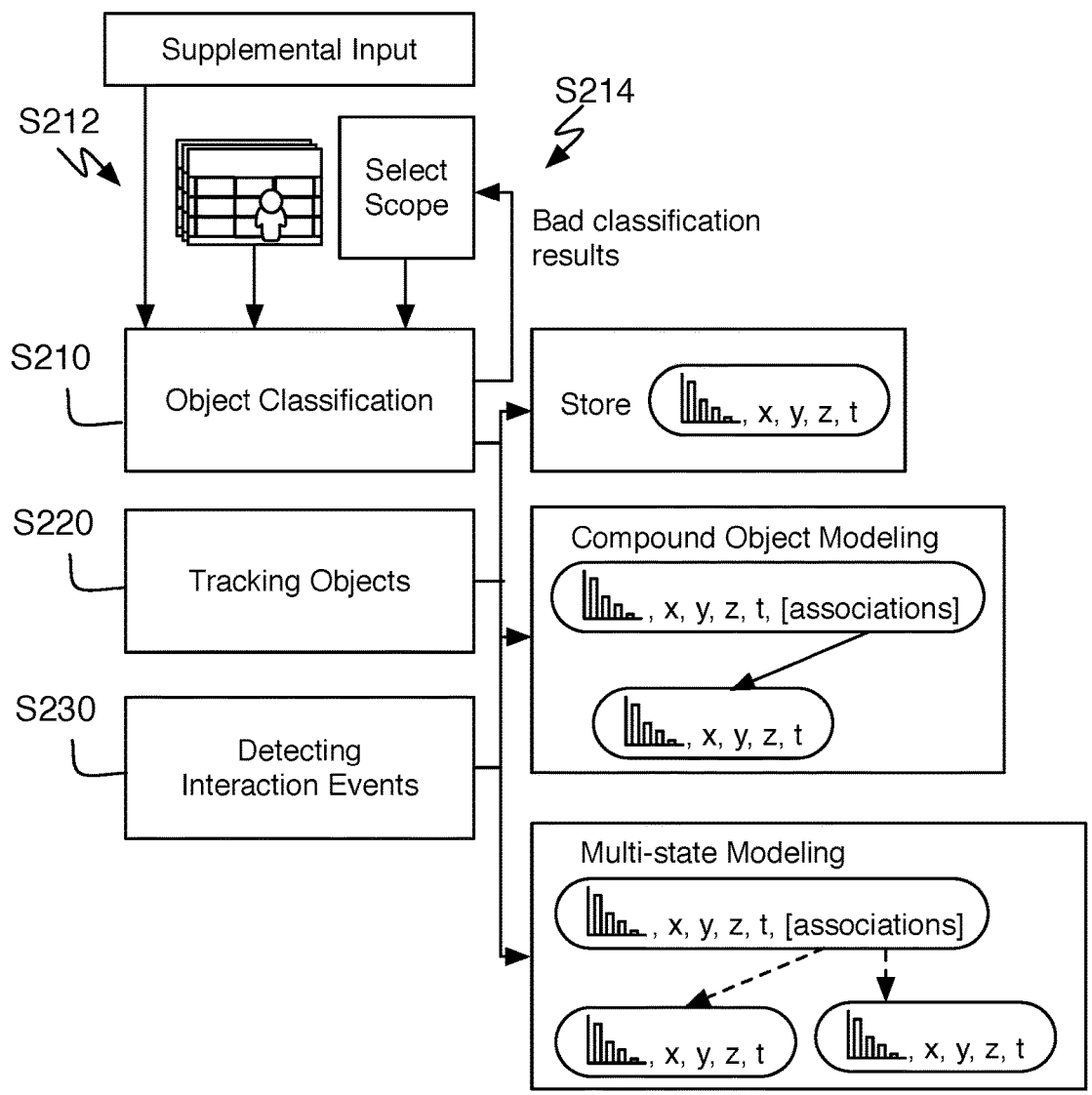
FIG. 13 is a schematic representation of iterative processes involved in maintaining the EOG.

Processing the input can establish base object modeling which may utilize compound object modeling, probabilistic multi-state modeling, along with regular object modeling as shown in FIG. 13. Block S240 can then leverage the base object modeling in refining the EOG by propagating updated object model data through the EOG. The compound object modeling can be used where object transformations can be modeled when some interaction event alters object state. In other instances or implementations, object classification of block S210 and tracking objects in S220 may be used in establishing various observed object paths that can be associated through probabilistic reasoning and propagation of information through the model in block S240.

Through block S200 an EOG can be used to report on expectations of object state for a multiple of objects in an environment. As such S200 can involve multiple parallel processes modeling multiple objects expected in the environment based on image data and/or supplemental input. The processes can be executed iteratively for each stream of image data from a camera but then additionally executed across image data from collections of image capture devices. The EOG is generally real-time and location aware, which can enable the method to drive a variety of applications such as managing automated self-checkout, assisting POS checkout, providing inventory analytics, providing theft detection, enabling product locating, and other suitable applications.

In some variations, the method can include executing multiple instances of block S200 wherein the method includes managing multiple EOGs as in the exemplary mall scenario shown in FIG. 3, wherein a first EOG is managed for a first subregion of the environment and a second EOG is managed for a second subregion of the environment. The subregions can be non-contiguous or overlapping. In one variation, the first subregion can fully contain the second subregion. Any suitable number of EOGs for distinct subregions can be established. Managing multiple EOGs can be used in multi-vendor environments such as a mall or a marketplace. The different EOGs may operate using image data from a shared imaging system, but the configuration and application of the EOGs can be individually customized. Alternatively, a single EOG can model multiple regions and subregions wherein inspection of that EOG can use spatial and temporal boundaries and simulating partitioned and distinct EOGs for different subregions.

Maintaining EOG: Classifying Objects

Figure 14:
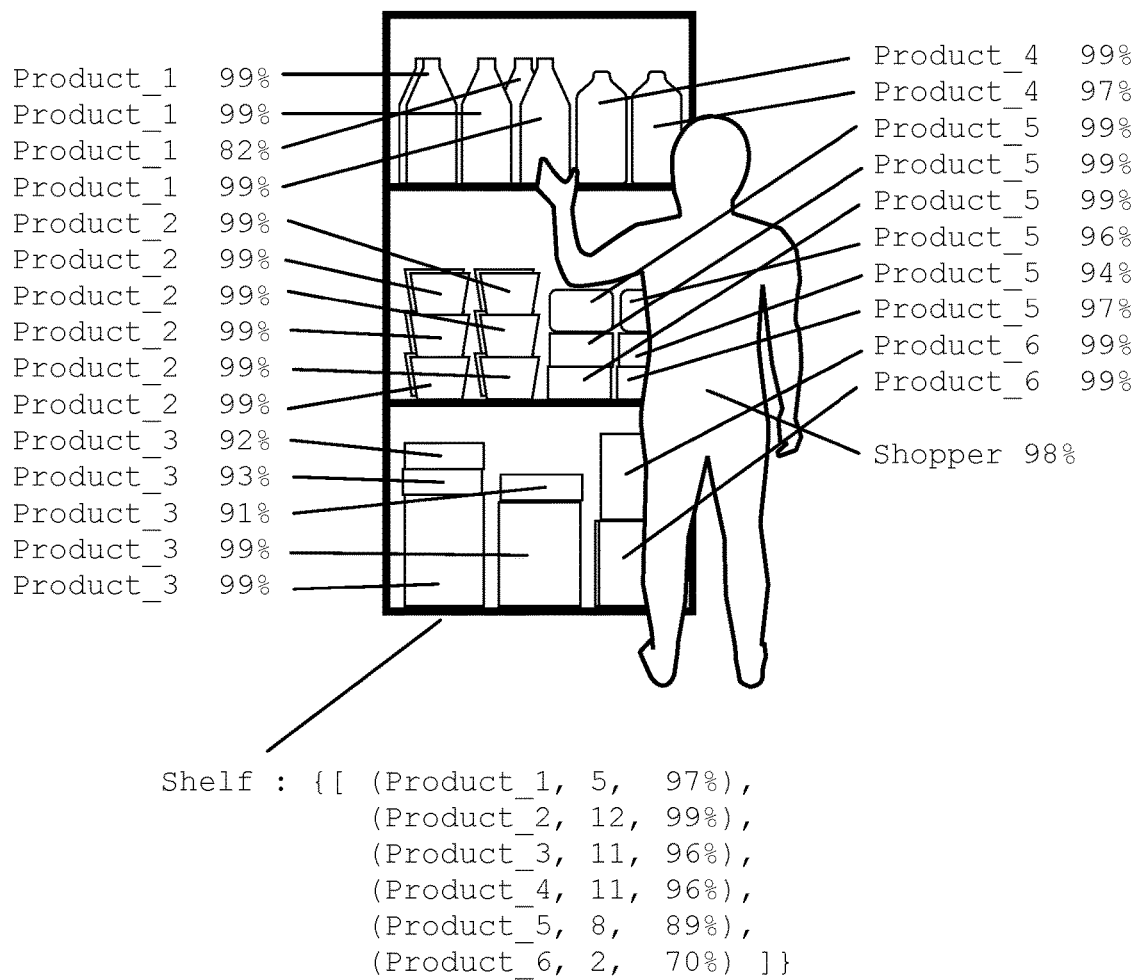
FIG. 14 is an exemplary schematic of object classifications and compound object modeling with item count estimations.

Block S210, which includes classifying objects from the image data, functions to perform object detection. Objects are detected and classified using computer vision or other forms of programmatic heuristics, artificial intelligence, machine learning, statistical modeling, and/or other suitable approaches. Object classification can include image segmentation and object identification as part of object classification. Resulting output of classifying objects of image data of a single image or video stream can be a label or probabilistic distribution of potential labels of objects, and a region/location property of that object. Classifying objects in a single image of the image data can yield multiple object classifications in various regions. For example, an image of a shelf of products with a shopper present can yield classifications for each visible product, the shelf, and the shopper as shown in FIG. 14. Also shown in FIG. 14, additional features of the method can additionally result in the EOG modeling expected number of items obscured from view.

Various techniques may be employed in object classification such as a "bag of features" approach, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes.

Image feature extraction and classification is an additional or alternative approach, which may use processes like visual words, constellation of feature classification, and bag-of-words classification processes. These and other classification techniques can include use of scale-invariant feature transform (SIFT), speeded up robust features (SURF), various feature extraction techniques, cascade classifiers, Naive-Bayes, support vector machines, and/or other suitable techniques.

Additionally, multiple variations of algorithmic approaches can be implemented in accounting for particular classes of object classification. A hierarchical classification process can be used in iteratively refining classification and/or bounding the classification challenge for enhancing classification confidence and/or speed. In one variation, classifying objects can be limited or isolated to updating based on changes in image data. In one variation, classifying objects of image can be limited to subregions of the image data satisfying a change condition. For example, an image of a shelf of products with a shopper in the lower right quadrant of the image may only have object classification executed for a region within that lower right quadrant, which can alleviate the method from reclassifying products that are static in the image data.

In some variations, object classification can be actively confirmed or informed through another data input channel. For example, a calibration tool may be used for logging an object with a confirmed classification (e.g., a SKU identifier), location, and time.

Classifying an object can include identifying an object as one of a set of possible object types, wherein possible object types comprise at least a SKU object type, a compound object type, and a person object type. An object classification can be a descriptor with various levels of specificity ranging from an unknown object classification to a general descriptor to a specific item name. Different classifications may be associated with additional classification properties such as SKU properties for SKU objects, user accounts for customer objects, and/or worker profiles for worker objects. For example, one item could be classified as a box but could also be classified as a particular cereal product with an associated product SKU. Generally, the object classification process will generate a set of object classification possibilities with varying levels of confidence levels.

In a compound object modeling approach, the EOG can model an object as having some probability of containing zero, one, or more other objects. A classification may be used to generate an object composition prediction during compound object modeling. Applying compound object modeling preferably includes instantiating a hierarchical association between at least two objects in the EOG where one object instance is set to probabilistically have an association with at least one object. If this is the first classification, compound object modeling can be an initiation process based on statistical models that can be based on the object classification, object location, time, and/or other factors or combinations of factors. Compound object modeling can facilitate object count estimations and/or associative changes in an object (e.g., tracking an unobservable child object through movement of parent object). In some variations, the object composition prediction can be generated for new occurrences of an object that has been observed to commonly contain particular objects. For example, an object classified as a box used to ship bars of soap is given a very high likelihood of containing a standard shipment of bars of soap. Alternatively, the composition prediction of an object may be dynamically created based on the context in which the object is detected. In one example, an unknown box may be detected and classified as an unknown box, but because it was detected in a particular region, the object composition can be set with objects commonly found in boxes in that region. In another example, an unknown box of goods may be detected and initially suspected of containing a set of different objects with a low probability. As more information is collected on the box though, the classification can be refined and updated through block S220, S230, and S240.

The classification of objects can additionally include assigning object attributes such as size, shape, color, location, and/or other attributes of the object. An object size may include various dimensions such as length, height, width, dimension, shape, aspect ratio, and/or volume. Shape may be an attribute describing the form of the object. Shape may include aspect ratio or other metrics. A color attribute may be a description of the surface of the item and may include an average color, color set, a pattern or texture, reflexivity, various surface transforms, and other suitable surfaced qualities. Location is preferably a three-dimensional location description within the environment, but may alternatively be a location categorization such as "aisle 3, bin 1, shelf 2". Location may be relative with respect to the frame of the environment, or absolute in the latitude-longitude-elevation frame of the earth. The various object attributes are stored within the EOG and can used by in making determinations. For example, the volume and shape may place restrictions on the quantity and type of contained objects. Similarly, location may not explicitly indicate what objects are contained within a detected object, but can provide context for expectations and tracking.

In some scenarios, an object may be affirmatively identified as a particular item. Object identification preferably results in classifying the object with a specific SKU. Identification of an object may be made through image matching of packaging, scanning a computer readable code (e.g., a barcode or QR code), OCR of labeling, and/or any suitable approach. The certainty of the identification is recorded and tracked. For example, reading a UPC barcode, with valid checksum, conveys a very high certainty of identification. Conversely, observing that an object was taken from a region of shelving that was known to mostly contain 14 oz. boxes of Snack-Os conveys a fairly low certainty. In that case, subsequent inspecting is queued, and future images will be specifically inspected in order to raise the certainty associated with that, now past, event.

In other scenarios, objects may be people, animals, or other indivisible elements. People and animals may be identified through various techniques such as facial recognition, gait recognition, clothing recognition, associated device recognition (detecting a user's phone) or general object identification. Identification of a person could additionally be used in identifying a user account associated with the person identity.

The EOG system can additionally be applied to draw conclusions about real-world items when image data of them is partially or fully obscured. In one scenario, an object in the physical world that is placed in an unviewable area can nevertheless still be tracked by its logical representation within the EOG. The EOG maintains object permanence, in the sense understood by Jean Piaget, not accomplished by most existing computer vision systems. Furthermore, the modeling of multiple object states can enable multiple possible, unobserved object states to be maintained and tracked during different events such that they may be resolved to be modeled with higher confidence with additional observational data.

In another scenario, regions of the environment are treated as objects in the EOG in that the environmental region "contains" objects like a modeled compound object. Environment entrances, environment exits, unmonitored rooms, unmonitored regions of the environment can be treated as objects. For example, a bathroom may be a configured object with an access point at the bathroom door. Objects that interact with the bathroom door (e.g., enter and exit) may result in changes in the contents of that bathroom object.

As shown in FIG. 13, classifying an object and more generally managing the EOG can include retrieving supplementary inputs used in classifying an object S212. The classification of an object can be at least partially based on the supplementary inputs. The supplementary inputs can be selected from the set of purchase patterns, customer purchase history, product pricing, inventory data (e.g., shipment orders, inventory maps/planograms, etc.), environmental data patterns, purchase transaction data, and/or other sources. Classifying can then be at least partially based on the supplementary inputs. For example, product popularity based on store shopping history may be used to prioritize particular classifications over other classifications when CV-based classification confidence levels are similar. Block S212 can be used directly in classification, but could additionally or alternatively be used in resolving conclusions from EOG such as determining a virtual cart list.

As shown in FIG. 12, classifying an objet can include classifying an object through an iteratively expanding classification scope during classification processing S214. Iteratively expanding classification scope can include setting a classification scope, generating a classification within the classification scope, and attempting classification with an updated classification scope if the generated classification does not satisfy a classification condition (e.g., if the result has confidence level below a threshold). In implementation, block S214 can involve classifying an object through an initial classification model of a first set of candidate objects and classifying the object through at least a second expanded classification model of a second set of candidate objects if classification of the object through the initial classification model does not satisfy a classification condition.

A classification scope preferably characterizes a limited set of candidate objects of a classification process. In one example, this could be a CNN trained on a limited set of objects. Multiple CNN models could be trained and updated using different classification scopes such that they can be selectively employed based on the desired classification scope. Classification scope can be determined through a variety of techniques or algorithmically determined through learning.

In one variation, the classification scope can expand based on expected spatial proximity of particular object classifications to a region. This may include expected SKU objects observable in a particular region. That spatial proximity can be iteratively expanded with the objective of eventually determining a classification with a satisfactory confidence level. In one example of spatially expanding classification scope, the classification scope progress as: objects of a shelf, objects on neighboring shelves, objects on aisle, objects in store region, objects in store.

In another variation, the classification scope can expand based on data-driven patterns. For example, customer shopping lists and/or wishlists, customer shopping patterns, various demographic shopping patterns and storewide shopping patterns can be used in defining a classification scope. The utilized classification scopes could include different combinations of spatially defined classification scopes, data-driven classification scopes, and/or other suitable classification scopes. For example, an initial classification scope can include a stored customer shopping list and expected shelved products and a subsequent fallback classification scope can include the hundred most popular products sold in the store along with products expected to be stored on that aisle.

Additionally, maintaining the EOG can include updating imaging representations of the object. New and evolving packaging, and other visual changes, can be used to improve object identification over time. Occasionally, a set of functionally identical items, with identical SKUs, might have different visual appearances. For example, some items come in different colors, while sharing a UPC code. Additionally, the packaging may change periodically. For example, a brand of cereal routinely changes the visual appearance of its packaging while maintaining a common SKU, UPC, and price. Integration with a management system, a checkout processing system, or a product reference database can facilitate in classifying evolving object representations.

In association with classifying an object, the method can include storing a corresponding object instance in the EOG. The object instance is a data model record associated with the observed or predicted object. The object instance can be stored in a database or any suitable data storage solution. An object instance can be a data record characterizing object classification, time of observation, and location of observation. The location of the object instance may be generalized to the image capture device from which the classification originated but could more specifically include coordinates within the image data and/or three dimensional coordinates within the environment.

The object instance can establish the base object modeling. Compound object modeling and probabilistic multi-state modeling can additionally be characterized properties of an object instance. Object classification can apply probabilistic reasoning in directly modeling compound object or multi-state properties. Object tracking of Block S220 and interaction event detection of Block S230 can alternatively or additionally contribute to compound or multi-state modeling.

Additional object properties and/or associations may additionally be added or established through the data modeling of the system. For example, an association with SKU properties can be established when classified as a particular SKU object. In another variation, an object instance can be associated with media references such that reprocessing of original media can be performed. In another variation, association with other object observations can be established. For example, tracking of an object in time may be used to establish an object path that is reflected as an associated sequence of object instances. Higher level EOG modeling described herein can either be used to update the observation record. Alternatively, higher level EOG can use observational records as a raw data layer on which higher level modeling can be established.

Maintaining EOG: Tracking Objects

Block S220, which includes tracking objects in the environment, functions to monitor the location of an object in establishing an object path. Tracking an object can include tracking the object within image data from a single image capture device but more preferably tracks the object across image data from multiple image capture devices. Tracking an object can additionally be used in identifying and associating objects across image capture devices.

Tracking an object can include applying CV-based object tracking techniques like optical flow, algorithmic target locking and target re-acquisition, data-driven inferences, heuristical processes, and/or other suitable object tracking approaches. CV-based object tracking and algorithmic locking preferably operate on the image data to determine translation of an object. Data-driven inferences may associate objects with matching or similar data features when in near temporal and spatial proximity "Near" temporal and spatial proximity can be characterized as being identified in a similar location around the same time such as two objects identified within one to five feet and one second. The temporal and spatial proximity condition could be depend on various factors and may be adjusted for different environments and/or items. Objects in near temporal and spatial proximity can be objects observed in image data from a neighboring instance of image data (e.g., a previous video frame or previously capture image still) or from a window of neighboring instances. In one variation, a window of neighboring instances can be characterized by sample count such as the last N media instances (e.g., last 10 video or still frames). In another variation, a window of neighboring instances can be characterized by a time window such as media instances in the last second.

Tracking objects is preferably accompanied by establishing an association of object instances in an object path. In one variation, object instances can be a data model construct that supports path properties. Alternatively, object paths can be a data model construct that can be associated with an object path. Accordingly, tracking objects preferably includes constructing an object path, where an object path establishes a continuous path of an object in time and space. An object path can include stationary paths or path segments to account for an object being stationary like a product on a shelf. At some instance, continuous observation of an object may be prevented and an object path will terminate. Terminal points of an object path preferably include a point of appearance and a point of disappearance.

Termination of an object path can invoke compound object modeling and/or probabilistic modeling of multiple object states to model possibilities of the object in association with objects at a termination point of an object path. Tracking an object can include after detecting a terminating point of an object path of an object, applying compound object modeling and/or applying multi-state modeling. In some variations, detecting interaction events can supplement or replace the role of addressing termination points of an object path.

Figure 15A:
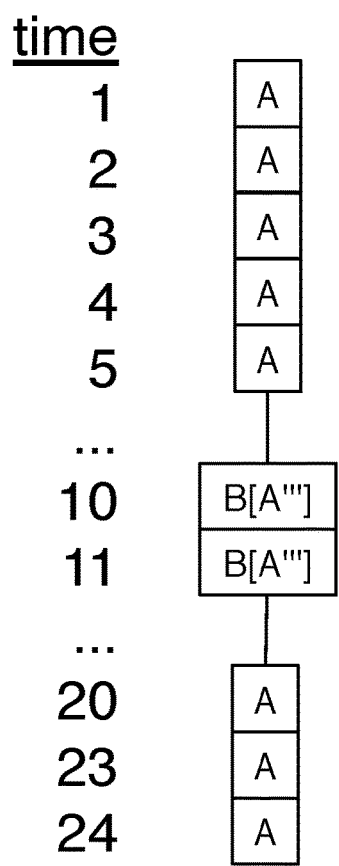
FIGS. 15A and 15B are schematic representations of object paths and associating different object path segments at termination points of the object paths.

Applying compound object modeling preferably includes instantiating a hierarchical association between at least two objects in the EOG where one object instance is set to probabilistically have an association with at least one object. One object is preferably a parent object that is probabilistically modeled to possess or contain a child object. Applying compound object modeling can associate a first object path to a second object path if, for example, the first path is concealed by the second object path. In this way the first object can be tracked indirectly by tracking the second object. As shown in the exemplary scenario of FIG. 15A, an object A may be tracked along an object path, but when that object path terminates it can be modeled as being contained by object B. If object A appears in the proximity of object B at the t=20 mark, then that object path can be associated with the same object A as at t=1.

Figure 15B:
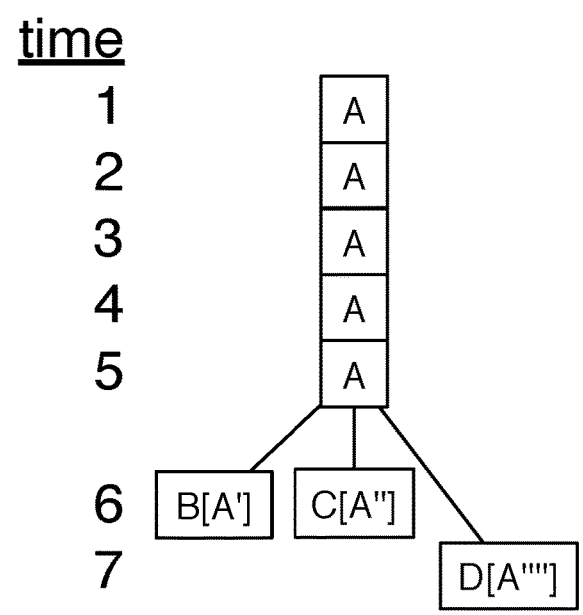

Applying multi-state modeling preferably includes instantiating at least two probabilistically possible states of an object instance in the EOG. Applying multi-state modeling can enable multiple possible object paths to be considered at a termination point. Multi-state modeling can be used in combination with compound modeling where one or more of the probabilistic states can be a hierarchical association with another object. As shown in the exemplary scenario of FIG. 15B, an object A can be modeled as probabilistically being contained in one of three objects (B, C, and D) when the object path of object A terminates. As an example, a product may have a first object state modeled of the object being pushed further into a shelf where it is unobservable or a second object state modeled of the product having been picked up and carried by a shopper. Both object states can be modeled until additional information is collected to better inform which of those states was accurate. The additional information may be used in confirming one of those possible states or to counterfactually eliminate one of the possible states.

In many scenarios, object paths do not involve uniformly consistent modeling of an object. The object classification and the associated confidence level generated for object instances in block S210 may vary for object instances associated with an object path. A variation of block S220 in combination with block S240 can include propagating object updates across an object path, which functions to longitudinally process object information for a tracked object which can be used in updating object classification to supplement or assist object classification capabilities of the EOG.

In some instances, this can include weighting classifications with greater specificity. For example, with an object path where 65% of the time the object is classified as a general box and 35% of the time the object is classified as a particular breakfast cereal product, propagation of object classification across the object path will update the object to be considered the breakfast cereal product along that path. Such classification propagation along object paths can anneal object classification issues. As shown in FIG. 16, an object path may initially modeled as the path of an object classified as a "box", at a later point an updated object classification may more specifically classify the object as ACME cereal with higher confidence. The second classification can result in propagating the updated object state information across the object path associations so that earlier object instances are modeled as the ACME cereal item.

The method can potentially address a potential challenge of classification failing when the object is in motion. However, object tracking may be maintained during object motion, which can enable propagation of a confident object classification to periods when the object is moving. In one example, a breakfast cereal product is confidently classified as such while it rests on the shelf. When a shopper selects the product and adds it to their shopping bag, the image data may capture obscured and/or blurry images of the product, which can result in low confidence classification. However, object tracking of the object can enable the high confidence classification while on the shelf to be applied to that tracked object. Then when the object is obstructed from viewing while in the bag, compound object modeling can model that bag as containing the product.

Maintaining EOG: Detecting Objects

Block S230, which includes detecting interaction events, functions to identify and characterize the nature of changes with at least one object. Interaction events can be detectable changes observed in the image data. Preferably, interaction events can be used in applying compound object modeling and multi-state modeling. An interaction event can additionally include triggering updating the EOG of block S240 that can include propagating new object state information, such that conclusions from the interaction event can be used longitudinally on the EOG.

The interaction events preferably offer a detection approach with low complexity such that the method does not depend on fallible and specialized detection algorithms. Preferably detecting interaction events can include detecting an interaction event through detection of one or more of a set of interaction event types such as object proximity event (e.g., detecting object-to-object contact or proximity change) and/or compound object transformations (e.g., detecting object appearance, object disappearance, object classification change, and the like). Different variations of such interaction events can additionally be used depending on involved objects. Processes for specialized and custom interaction event types such as person-to-object contact, object insertion into cart/bag, or other event types can additionally be used. Interaction event conditions can be adjusted depending on different operational objectives. In one variation, the sensitivity can be dynamically adjusted. For example, machine learning and/or manual adjustment can be applied in tuning configuration properties of the interaction events.

An interaction event can be the interaction of one or more objects where there is a probabilistic transformation of objects in its environment. An interaction event can be associated with a compound object transformation. An interaction event can involve a transfer in either or both directions between a set of objects, and an interaction event can involve the inward or outward accretion of one object by another. Additionally, the transformation may involve identified objects or unidentified objects. As yet another variable, the direction and/or occurrence of a transformation may be probabilistically characterized. In one example, the exchange of objects could be between two or more classified objects such as a shopper object and a shelf-of-items object. In another example, one compound-object may produce another object such as if an object falls out of a container. In another example, an interaction event may be detected but the nature of the transformation may be unknown at the time. Modeling of multiple object states can be employed to account for different possible outcomes of an interaction event.

Applying compound object modeling as in classification and tracking preferably includes instantiating a hierarchical association between at least two objects in the EOG where one object instance is set to probabilistically have an association with at least one object. Various factors of the interaction event can be used in determining how the interaction of objects results in changes to hierarchical associations. Additionally, when updating the EOG, previous object instances can be updated to reflect the compound object modeling that yielded the interaction event. For example, if an interaction event detects a child object produced from a parent object, then that parent object instance can be updated at a previous instance to have contained the child object.

Applying multi-state modeling as in classification and tracking preferably includes instantiating at least two probabilistically possible states of an object instance in the EOG. Applying multi-state modeling can enable multiple possible results of an interaction event to be considered and maintained in the EOG. Multi-state modeling can be used in combination with compound modeling where one or more of the probabilistic states can be a hierarchical association with another object. For example, when a proximity interaction event is triggered by a shopper and a product, then that product instance can be modeled with a first probability as being in an object state as having been pushed back into the shelf and modeled with a second probability as being in an object state as being possessed by the shopper. Both object states can be modeled until additional information is collected to better inform which of those states was accurate. The additional information may be used in confirming one of those possible states or to counterfactually eliminate one of the possible states.

The result of an interaction event may be known wherein the nature of the interaction is visually observed. For example, a product may be affirmatively observed to enter a cart. The EOG can be updated with a high degree of certainty that the cart contains the product. In other scenarios, the understanding of an interaction event may be probabilistic wherein the nature of the interaction was not fully observed or classified. For example, a shopper reaching into a shelf and interacting with an item may be considered as a transfer of an object from the shelf to the shopper with a first probability, the shopper transferring an object to the shelf with a second probability and the shopper removing a different object with a third probability. Sometimes the detection of an interaction event is not coincident with its understanding. In these cases, a subsequent inspection of the shelf and shopper may offer the best information about what objects were transferred and in which direction. When higher quality information is available the EOG can be updated to better represent the original interaction event.

An object proximity event results from an increase or change in the proximity of two or more objects. Specifically, detecting an object proximity event can include detecting proximity of a first object of a first classification and at least a second object of a second classification satisfying a proximity threshold. For example, a person object coming within a certain distance (e.g., less than an arms width such as two feet) of a SKU object may trigger an object proximity event because there can be the possibility that the person interacted with the object.

The number, classification, and/or state of objects involved in an object proximity event may be factors in a condition for detecting an object proximity event. For example, different proximity thresholds may be used depending on the object classifications. More specifically, different product objects may have different sensitivity to proximity events with shoppers, which can be influenced by product popularity, shopper purchase history, product price or other supplemental inputs.

Additionally, an object proximity event may have an associated proximity magnitude wherein the modeling of the interaction event can be augmented by the proximity magnitude. The proximity magnitude could be distance estimation or proximity classification. Time of proximity can additionally determine or be a factor in the proximity magnitude. An example of proximity classifications in decreasing proximity can include "contact", "near-contact", and "close proximity". Preferably, less significance or weighting is applied to modeling with lower proximity magnitude. For example, object-to-object contact will generally be modeled with more significance than objects coming within general proximity.

In alternative variations, proximity conditions can be for discrete interactions or for continuous interactions. In particular for a discrete interaction, the proximity of a person object and a storage object will trigger an interaction event. When a shopper comes in contact or nears a shelf, an interaction event occurs. For example, a shopper that is observed to reach into a shelf could result in an interaction event that more likely predicts the selection of an object. However, a shopper that is observed to merely be near a shelf may be an interaction event with a low probability of any exchange of objects. For continuous interaction probability, the likelihood of an interaction event occurring between two objects can be based on proximity and time. As shown in FIG. 9, the path of a shopper through a store can alter the likelihood of interactions with all objects within the store, wherein objects along the path having higher probability of being involved in an interaction event and objects not along the path being assigned a lower probability (or zero probability) of being involved in an interaction event.

Figure 17A:
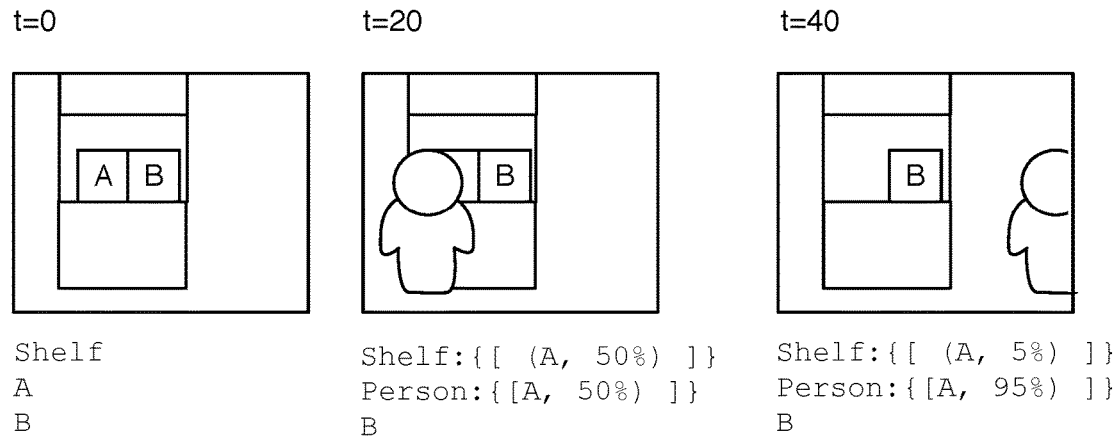
FIGS. 17A and 17B are schematic representations of exemplary scenarios involving compound object modeling and interaction events.
Figure 17B:
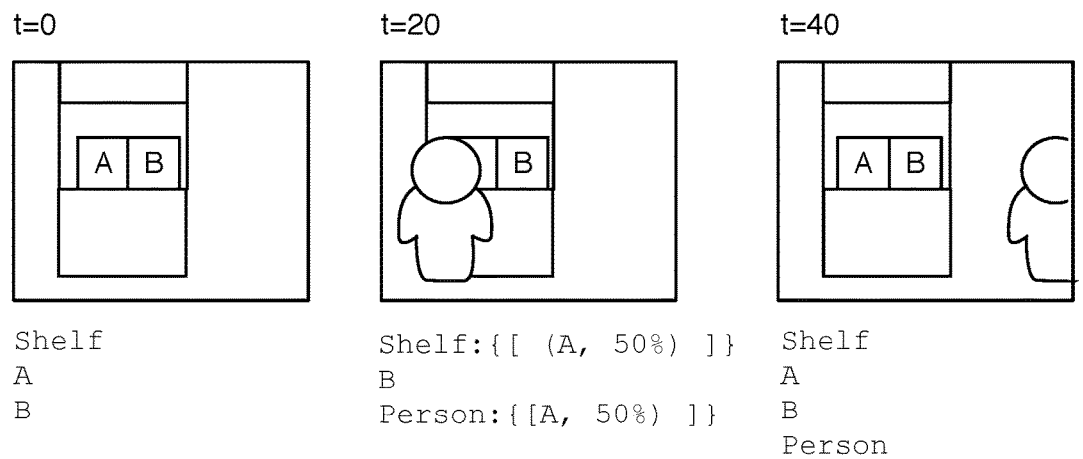
Figure 18:
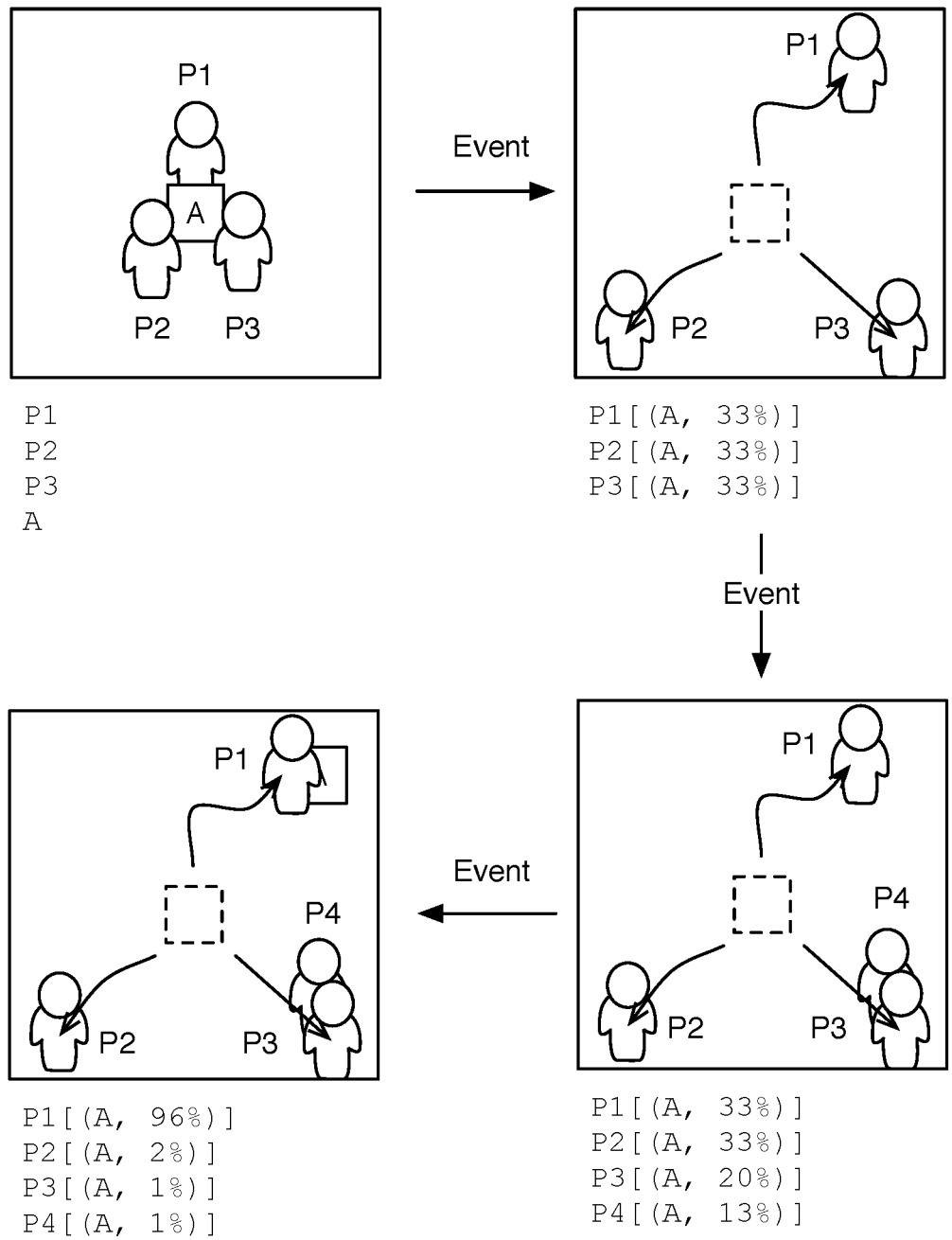
FIG. 18 is a schematic representation of an exemplary sequence involving compound object modeling and multi-state modeling with interaction events.

As shown in the exemplary scenario of FIG. 17A, a shopper may approach a shelf. Occlusion of object A may trigger an interaction event that updates an object A as possibly being in the shelf or in selected by the shopper. If the shopper walks away, that interaction event in combination with the disappearance of the earlier object A increases the probability that object A was selected by the shopper. In a contrasting scenario of FIG. 17B, when the shopper walks away the object A may be classified and the possibility of object A being selected by the shopper can be reduced or eliminated. As shown in the sequence of exemplary observations in FIG. 18, interaction events and modeling are not limited to two objects.

Detecting an interaction event may additionally be triggered through the detection in the change of an object. For example, if an inventory storage configured image capture device detects a change in the layout of objects on the shelf, then the probability of previous interaction events is elevated. If a shopper is nearby, even if the shopper wasn't affirmatively observed to contact the shelf, that shopper may be assigned a higher possibly of having selected an object from that shelf. More specifically a change of an object can involve some form of a compound object transformation wherein detecting an object transformation can include detecting an object appearance event, object disappearance event, and/or an object classification mutation event.

Variations of object appearance events and object disappearance events can include detection of a new object, obscuring or disappearance of an object, an apparent revealing of an object from a second object, apparent concealing of an object by a second object, an apparent splitting of an object into multiple objects and the apparent merging of multiple objects into a compound object. Additionally, an altered object or mutilated object can be a form of an object appearance event. Affected objects are ones that have been affected by an outside entity. For example, an apple that a customer bites into would undergo an object interaction event transforming from an apple to a damaged apple. In one variation, altered objects can be a type of object classification and can be addressed within object classification process. Interactions involving the transformation of an object to an altered object may be used in alerting workers, adding the item to a checkout list of the shopper regardless of object selection, or used in any suitable way.

A classification mutation event can involve the classification of an object changing between different time instances. This classification mutation may be detected in combination with object tracking to differentiate between the appearance/disappearance of two distinct objects and changes in object classification of a single object.

Detecting interaction events may additionally includes logging interaction events such that that the chain of interactions can be inspected in response to updated object instance information. An EOG data system is preferably updated with historical records or object relationships and interactions. In one exemplary scenario, a first interaction event is recorded as a shopper selecting product A from a shelf containing product A and B, and later a second interaction event is recorded as the shopper setting product A back onto a second shelf. If an affirmative identification of a product B is made on the second shelf, then the EOG may be updated in block S230 through the interaction event log so that the second interaction event is of a shopper setting product B on the second shelf and the first interaction event is updated to the shopper selecting product B.

Figure 19A:
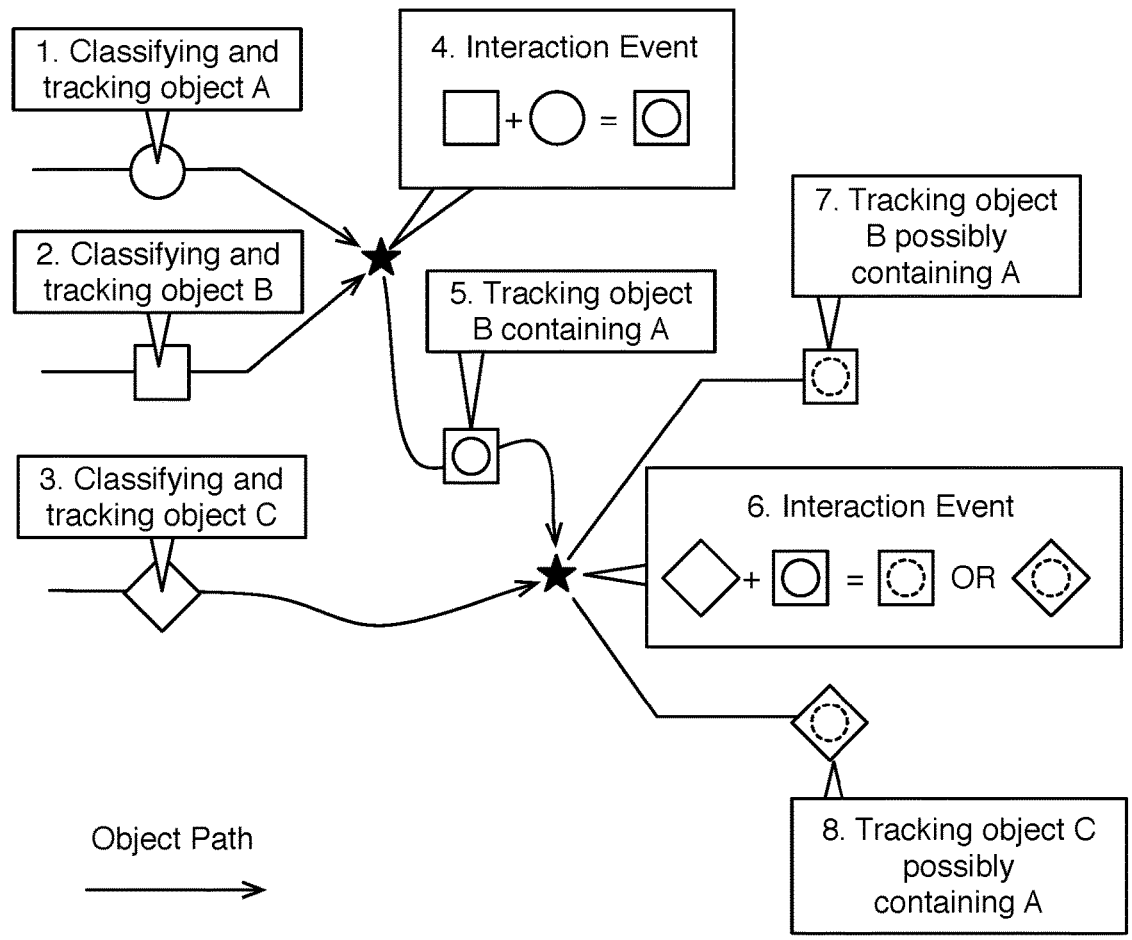
FIGS. 19A and 19B are schematic representations of interactions between different objects using compound object modeling and probabilistic multi-state modeling, and in FIG. 19B propagating an object state update and resolving the multi-state modeling of FIG. 19A.
Figure 19B:
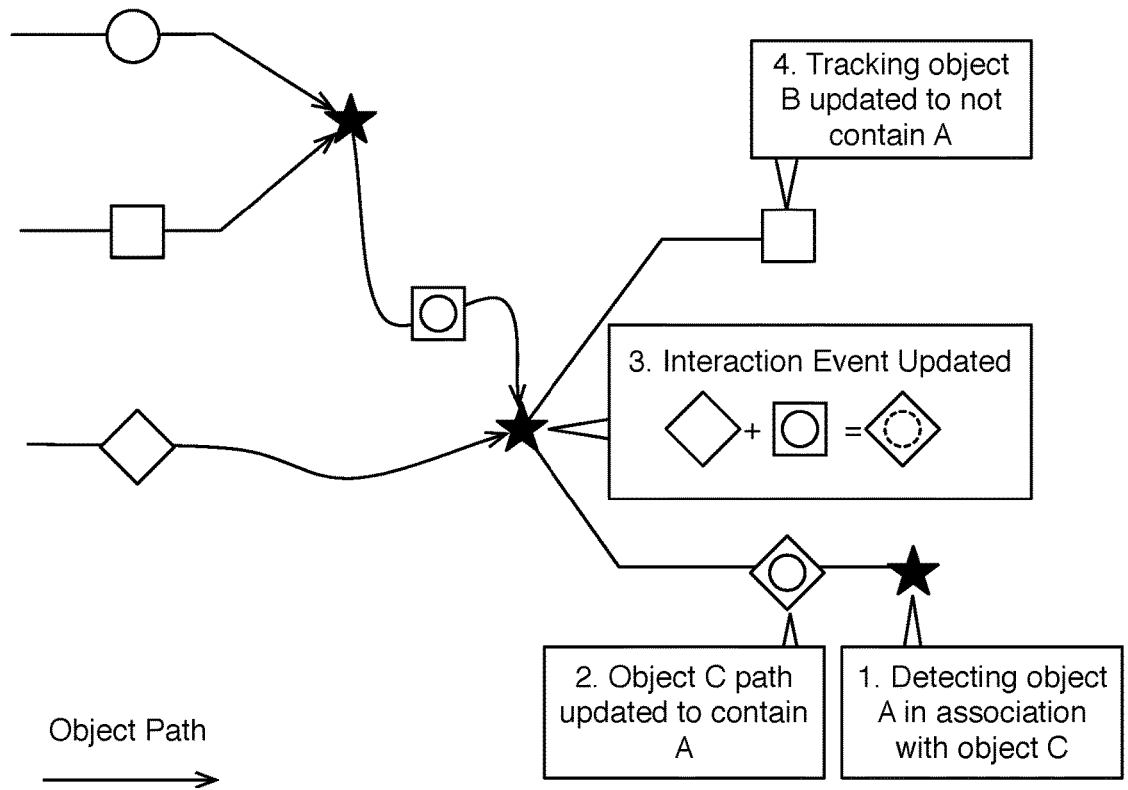

As an exemplary scenario, tracking object location (e.g., motion paths) in combination with detecting interaction events can use compound object modeling and probabilistic multi-state modeling in generating a representation of object state. In FIG. 19A, an object A can be modeled through multiple interaction events some of which do not visible include it. Multi-state modeling can be used in maintaining some representation of possible object states of object A, and when updated classification of object A eventually occurs, the updated object state can be used to resolve the two possible states into one possible state as shown in FIG. 19B

Maintaining EOG: Updating EOG

Block S240, which includes updating an EOG, functions to modify the data representation of objects and/or the processing of inputs and to better reflect the state of items in the environment. Updating the EOG can include propagating object state of at least one object through the EOG. This can result in updating associated EOG representations, wherein one or more database records are modified in an EOG data system. Updating the EOG may additionally or alternatively include updating an EOG processing engine 210, which functions to dynamically modify how data is processed and converted into an EOG model.

Generally, updating an EOG results in a chain of updates to probabilistic understanding of associated objects wherein block S240 can include propagating change in at least one object instance across object associations in the EOG updated object state through associations in the EOG S242. A change in an object instance is preferably updated object state data, which can include changes in classification, location, compound object modeling, multi-state modeling, object creation or deletion, and/or other updated object information. For example, the affirmative identification of an object at one instant may alter the probabilistic understanding of prior interaction events, which may also alter the probabilistic understanding of other associated interaction events. Similarly supplemental input data can be propagated across the EOG.

Associations of the EOG can include associations to object instances that are some way linked through object tracking, interaction events, or data-driven inferences of object classifications and other patterns. Compound object modeling, multi-state modeling, object paths are preferably EOG modeling constructs that can characterize these associations.

Propagating a change in an object instance can include longitudinally updating associated objects with updated object state information, which functions to propagate updates backwards and forwards in time. Propagating updated object state can result in updating classification of an associated object, updating multi-state modeling, and bridging object paths. In one variation, the associations are object instance associations with object paths such that object instances associated with that path may be updated with new information relating objects of that path. In another variation, the associations can be hierarchical associations as in compound object modeling. In another variation, associations can be based on spatial and temporal proximity associations.

Figure 33:
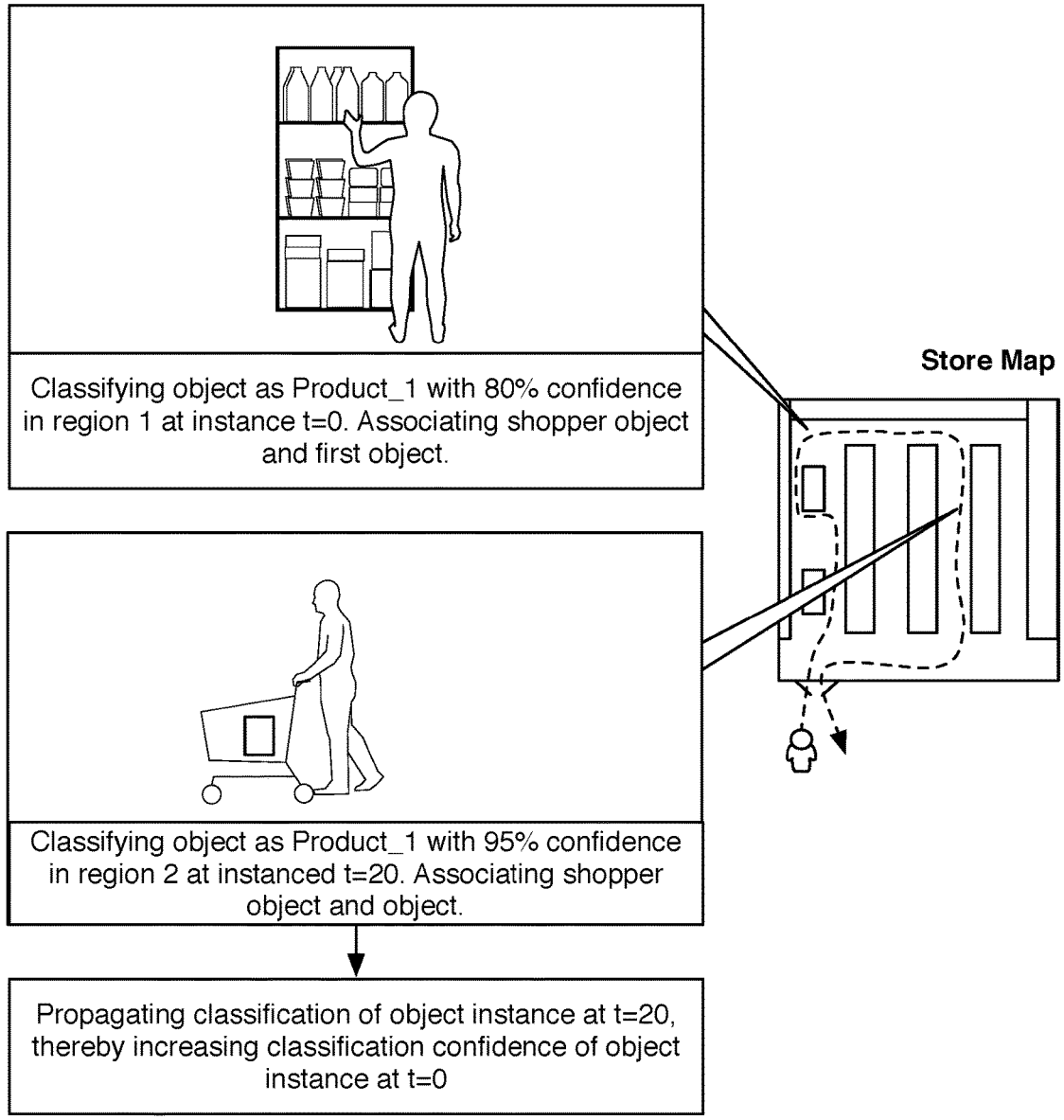
Figure 34:
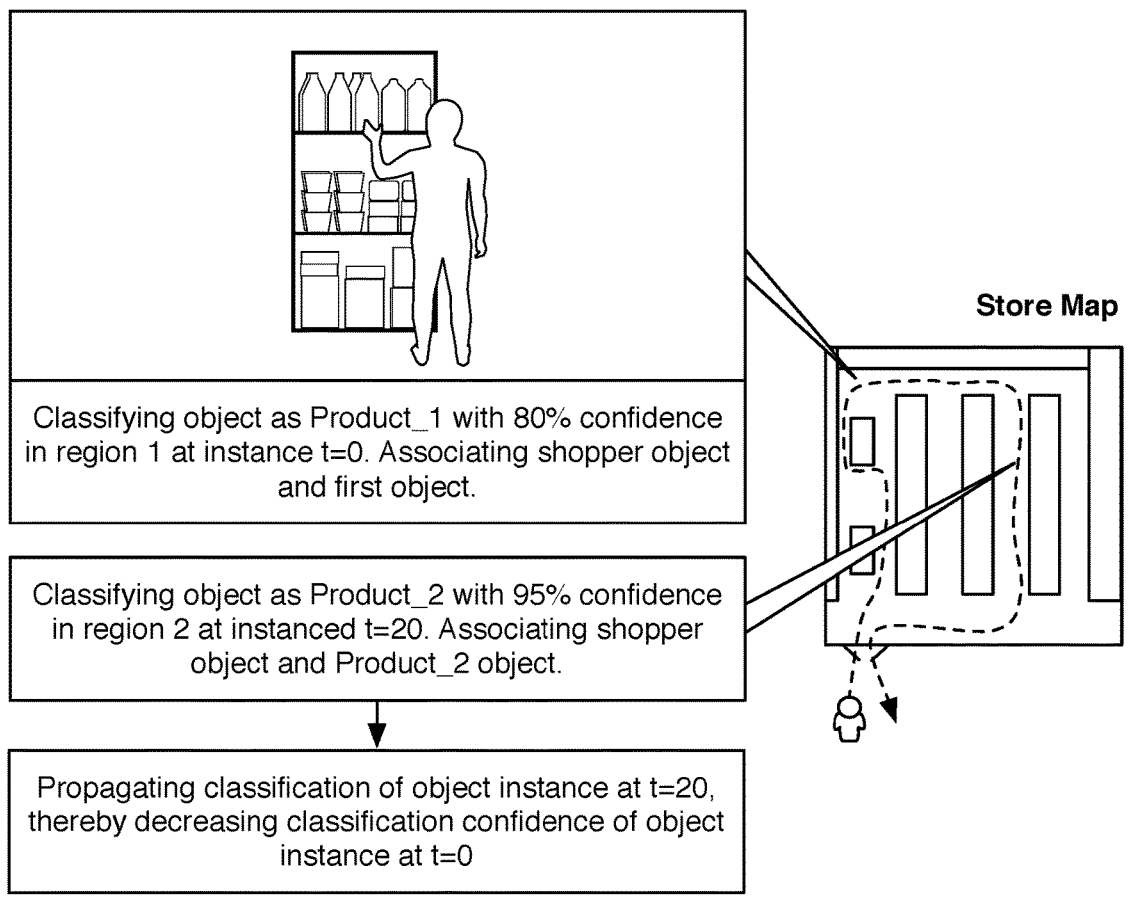

In one variation, the updated object state is an updated object classification, which can result in updating classification of objects at other spatial and temporal instances. The classification can be one made with a different confidence level. More confident classifications can be used to update object modeling to enhance confidence of other object instances (e.g., increasing classification and/or confidence of an object instance) as shown in FIG. 33. Similarly, multiple instances of classification can reinforce classification so that confidence can be increased beyond the confidence levels of a single classification instance. Alternative classifications can augment how an object is classified by either providing a more specific classification or by calling into question previous classifications. The impact of updated object state can additionally be weighted by an image capture device priority. For example, an image capture device in a POS capture configuration or from a calibration tool may be granted higher priority. A classification could similarly result in decreasing classification confidence of another object instance as shown in FIG. 34 and in some cases change the object classification In one variation, the updated object state can include altering a compound object association, which can alter a hierarchical association that can result in changing a parent-child object association. In some cases this can remove the hierarchical association for that instance.

Updating multi-state modeling functions to alter multi-state modeling to better reflect expectations. Preferably, updated object state data of an object instance can eventually be propagated to an associated branch of multiple potential states, and the updated object state data can be used to reduce modeling to a single state and/or refine the probabilistic modeling of the multiple potential states. Refining the probabilistic modeling of multiple potential states can include changing probability and/or changing the set of potential states (reducing, increasing, or otherwise changing the potential object states). For example, a particular object may be modeled as either possibly being obscured on a shelf or possibly in the cart of a shopper. If the product is observed and classified in the cart at a later time, then the motion path of the cart can be traced back to the point on the shelf and the potential state of the object being obscured on the shelf can be eliminated.

Bridging object paths functions to establish associations between different object paths. There will commonly be gaps or holes in the tracking of an object. Bridging object paths preferably includes identifying object paths with substantially similar object properties. Bridging object paths can initially query for object paths within a near temporal and spatial proximity, and then expand that search. Bridging object paths can identify object paths from earlier or later instances. Bridging object paths can additionally bridge object paths that have overlapping time instances when the object is tracked by multiple image capture devices.

Propagation of updated object state can result in cascading model updates. As an example, a classification of an object with high confidence may alter the classification of an object along its entire path. This change can alter association of that object path with another object path that is predicted to be the same object. This could then alter the compound object and/or multi-state modeling at a point in association with that newly associated object path.

Updating the EOG can be initiated in response to one of the base object modeling informed by object classification in block S210, interaction event detection in block S220, and/or object tracking changes in block S230. Interaction events will generally include events related to new or updated classification information of an object, and modeled object paths can be processed to bridge or anneal distinct object paths.

In another variation, updating the EOG system is initiated in response to a change in an object, which may include a change in object classification (e.g., object type, object identification, object properties, etc.) and/or object relationships (e.g., parent/child object relationships. For example, a change in represented size might result from additional visual information. Changes in size may change the available volume in which child objects can occupy. In another variation, the change in an object is a detect object transformation that includes revealing contents of an object, concealing an object by another object, splitting an object into more than one object, merging a set of objects together, appearance of an object, and disappearance of an object. In this variation, propagating updated object state can include: updating a previous object instance to have possessed that object, updating a current object instance to have concealed an object, updating a previous object instance to have been a set of merged objects, updating a current object instance as a merged object, and the like.

In another variation, updating the EOG system can additionally include incorporating supplemental input as a form of a resolution event. A resolution event generally adds contextual information around the objects within the environment. Such resolution events can relate to other object inputs with access to inventory metrics or other object information. For example, an external inventory management system that coordinates ordering and stocking of inventory may provide context as to the expected input of additional inventory items in the environment. In one case, a worker may scan in received shipments before storing in a backroom or in the storefront. In another example, a point of sale system may provide data on the inventory items expected to be leaving a store. In another example, periodic inventory events may occur where workers manually take inventory. Such resolution events can be used in updating objects in the EOG.

In one variation, the method can additionally include prioritizing observation of an object, which functions to alter image data collection and/or EOG processing for a particular object. Objects satisfying a particular condition may be monitored with particular care. Preferably objects are tracked more carefully when there the certainty of its identity and/or contents is below a threshold value. In one instance, the collection of image data may be updated to increase the certainty of the object's classification. In one instance an imaging device in a movable capture configuration could provide data to identify the product. In another instance, a worker could be dispatched to collect data used in increasing certainty.

The method is preferably performed iteratively such that the EOG is repeatedly updated and refined. In initiating use of the EOG system within an environment, the method may include managing the EOG system during a training mode. When managing the EOG system in a training mode, the method may be performed alongside one or more outside inventory input systems such as a checkout processing system or an item ordering system. The EOG system can run and calibrate its operation based on training input from the outside inventory input systems. When the performance of the EOG system is satisfactory, the method can transition to use EOG system in a substantially independent mode, through the use of the outside inventory input may still be used in part for the EOG system.

In another variation, maintaining the EOG can additionally include at least partially resetting the EOG, which can function to reduce EOG modeling complexity. Resetting the EOG can include discarding low probability aspects of the EOG. For example, object state modeling with low probability multiple-states and/or compound object modeling can be eliminated, reduced, or otherwise simplified. Resetting the EOG can happen continuously when maintaining the EOG. Alternatively, it could happen periodically. For example, the EOG may reset daily between business hours.

Figure 20:
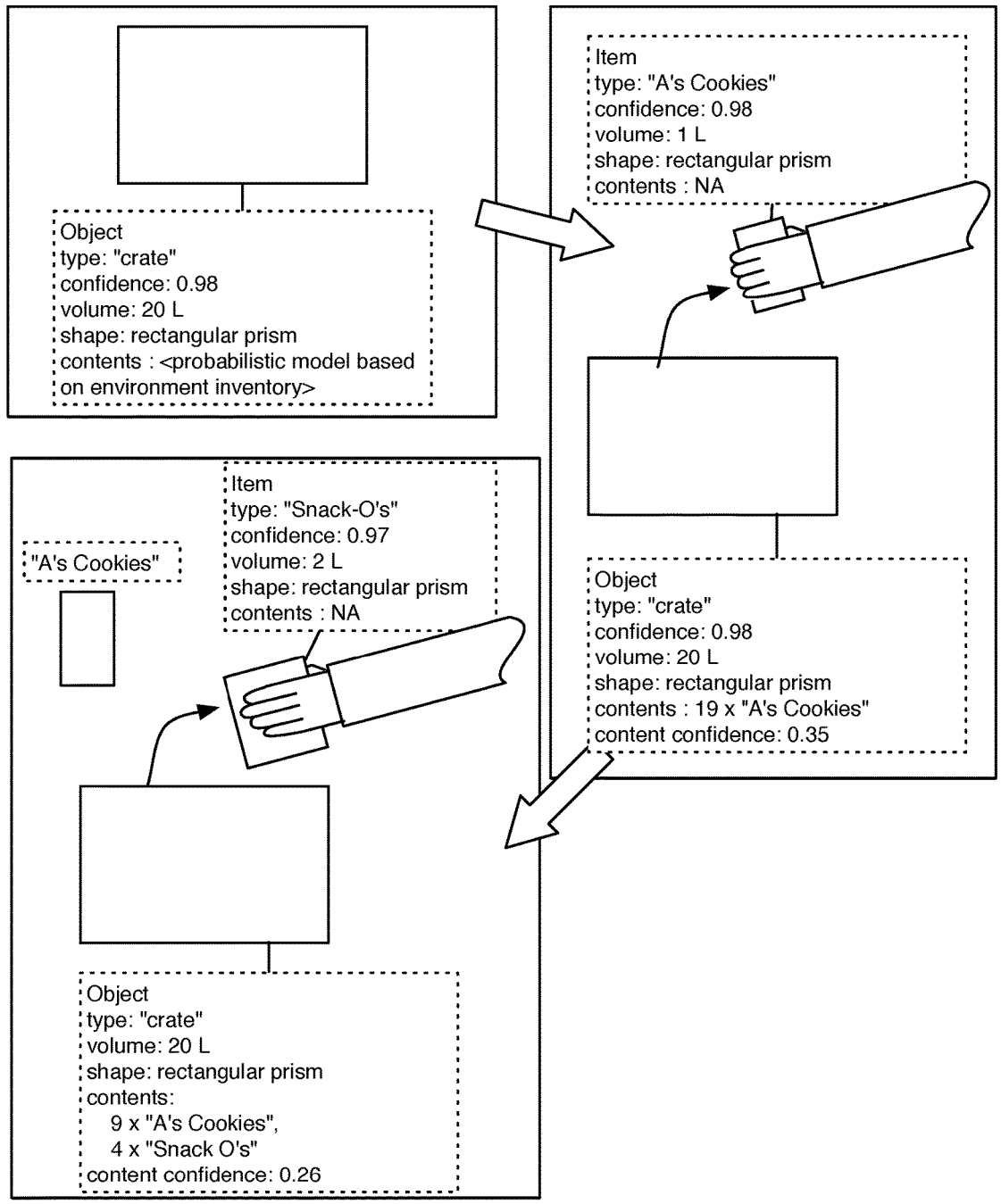
FIGS. 20 and 21 are schematic representations of updates to an EOG.

In one exemplary scenario shown in FIG. 20, a shipping crate may be a detected object with an unknown composition. After an interaction event of a removed object and affirmative classification of that object as a single box of cookies, the EOG can be updated with knowledge that the shipping crate had previously been filled with a number of cookie boxes. In the current state, the crate object in the EOG would be updated as having been previously filled with cookie boxes and now having one less cookie box. Estimating a filled state of the shipping crate can use the volume and dimensions of the shipping crate and cookie box in order to guess at the number of cookie boxes that would fit within the shipping crate. At that point, the cookie box possessed by a person is classified with a high confidence because of the affirmative classification, and the shipping crate can be modeled as containing a number of cookie boxes with a moderate confidence level. The moderate confidence level is preferably moderate (e.g., not zero and not high level like 10%-60%) because the modeling is a result of soft inferences used in drawing conclusions. If at a later point, a second object is removed and classified as a different snack box, the EOG would be updated again. This time the shipping crate may be determined to have been originally filled with half the box volume for the snack boxes and the other half devoted to the cookie boxes, but the confidence level in the contents of the shipping crate may be even less. Conversely, if the second object removed from the shipping crate was another cookie box identical to the first, and the volume calculations matched up, then the probability that the reminder of the shipping crate contained the estimated number of cookie boxes, now less two, would be elevated. When the shipping crate is finally emptied, and the carton discarded, the numbers are checked again. If all went as predicted, the EOG system will use that knowledge to up-weight subsequent predictive probabilities the next time the EOG system encounters an object with similar context (e.g., classified as a similar shipping crate and/or a crate located in a similar location).

Figure 21:
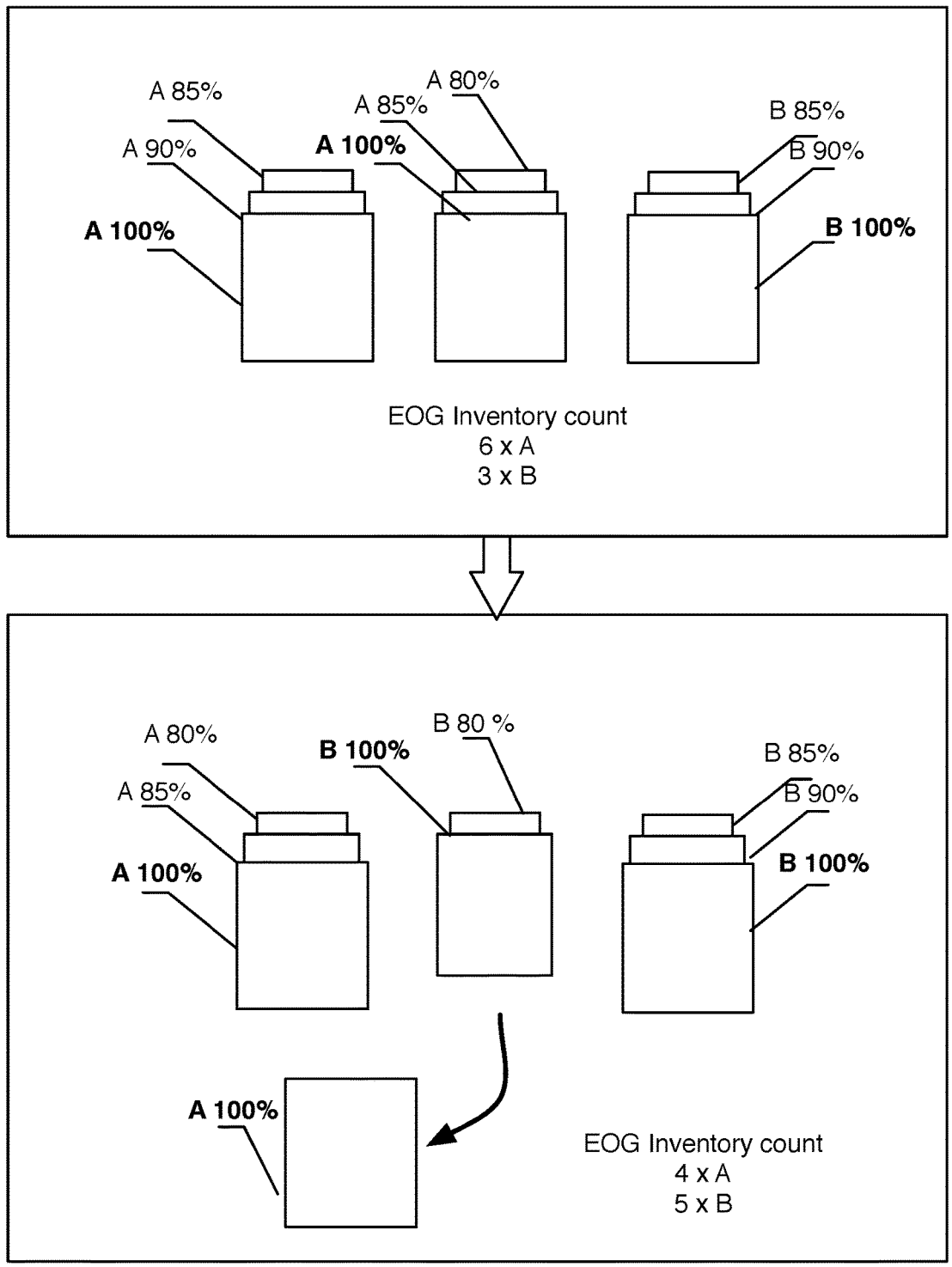

In another exemplary scenario shown in FIG. 21, a shelf may include three objects, where only the front one can be affirmatively classified. In the best of cases, the shelf object would have a history that indicates the number and type of objects contained. If not, obscured objects may be probabilistically presumed to be child objects of the shelf and being the same as the front object. However, if a front object is removed and a previously obscured object is classified differently from the original prediction, this may result in reassessing the assumptions about the other obscured objects. This can impact inventory accounting as shown in FIG. 21.

Inspecting EOG and Execution

Block S300, which includes inspecting the environmental object graph and executing an associated action, functions to utilize and/or interact with the EOG to affect change. The EOG is preferably inspected to execute some action. The action can vary depending on the use-case. Inspecting can include querying, accessing, or otherwise processing state of one or more object instances and associated properties.

Inspection can additionally be automatic inspection triggered by various rules, conditions, or other algorithms. Object state information relating to one or more objects can be identified during inspection. In some cases, the processing of the object state can be used to resolve the EOG model into a more workable format. For example, inspection of the EOG in a shopping application can result in resolving object state relating to a collection of objects possessed by a shopper object to a list of products and their prices.

In some variations, the executed action can be used in some application such as for facilitating a checkout process of a shopper or in directing or managing inventory and operations of a facility. In other variations, the executed action can be related to actions related to maintaining and refining the EOG such triggering calibration tasks, worker requests, and/or media storage which can have benefits for enhancing the computational capabilities when modeling objects in an environment.

EOG Facilitated Checkout

In one particular embodiment, the method may be applied to at least partially automated checkout. A checkout embodiment preferably includes establishing a virtual cart list (i.e., a checkout list) through associating classified SKU objects with a shopper object. The shopper object can be a customer/person object, a cart object, a basket classified object, a bag classified object and/or some collection of shopper associated objects (e.g., a shopper object, various bag objects, a basket object and/or a cart object).

Figure 35:
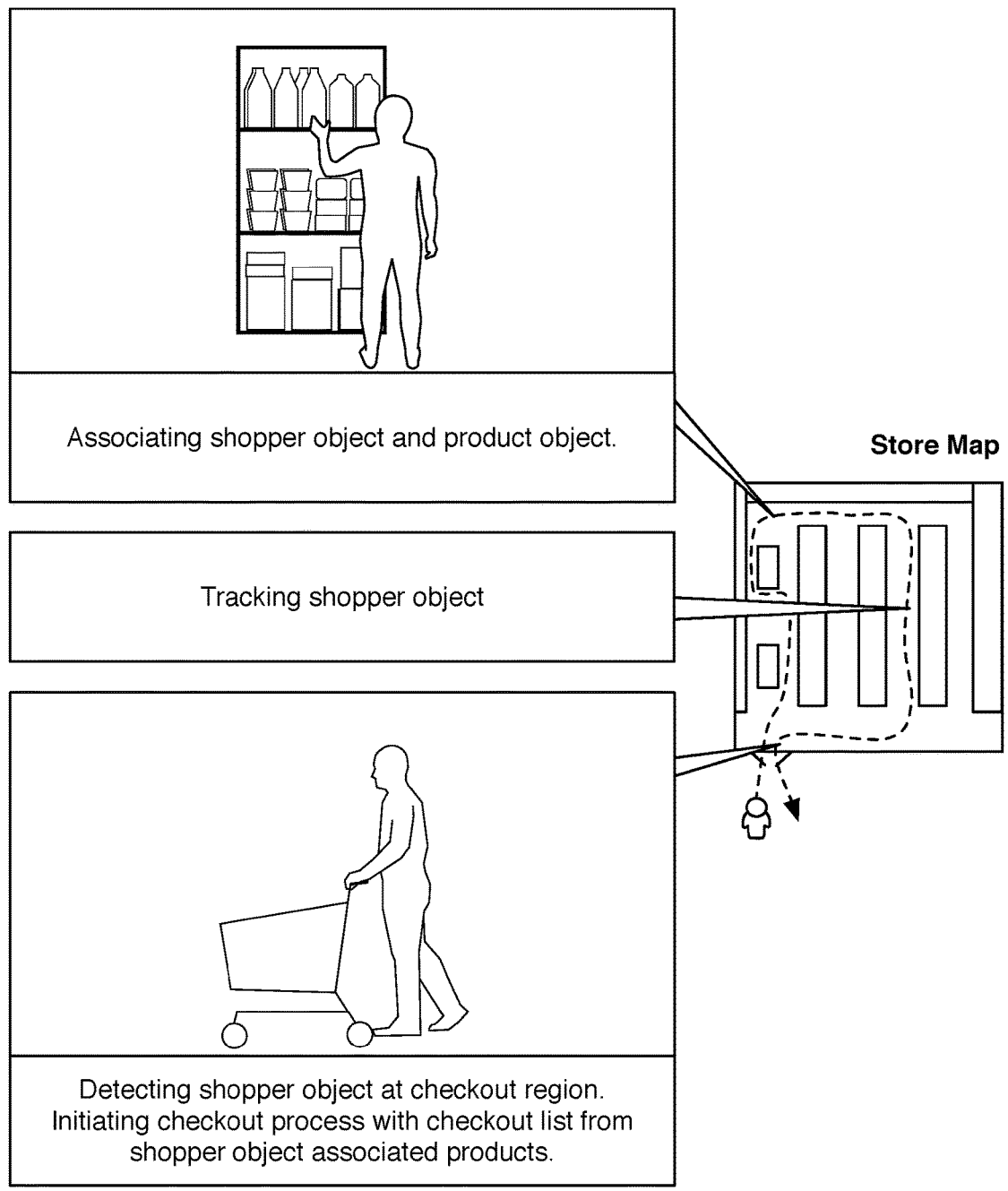

Products will generally be added by a shopper to a cart at various points in time and space while moving through a store. Those products may not be visible when approaching a checkout area. However, the method as described can leverage compound object modeling to generate a virtual cart list for checkout when a tracked shopper approaches by identifying products modeled to be contained by that shopper/cart. As one particularly unique characteristic, the generation of a virtual cart can be accomplished by image data spatially and temporally removed from the checkout process. Actions based on the virtual cart list can be applied at a time and space distinct from observations leading to the virtual cart list construction as shown in FIG. 35. Alternatively, the method may support micro-transactions wherein each item is individually charged and/or refunded depending on changes in object associations with a shopper object and the generation of a virtual cart list.

Figure 22:
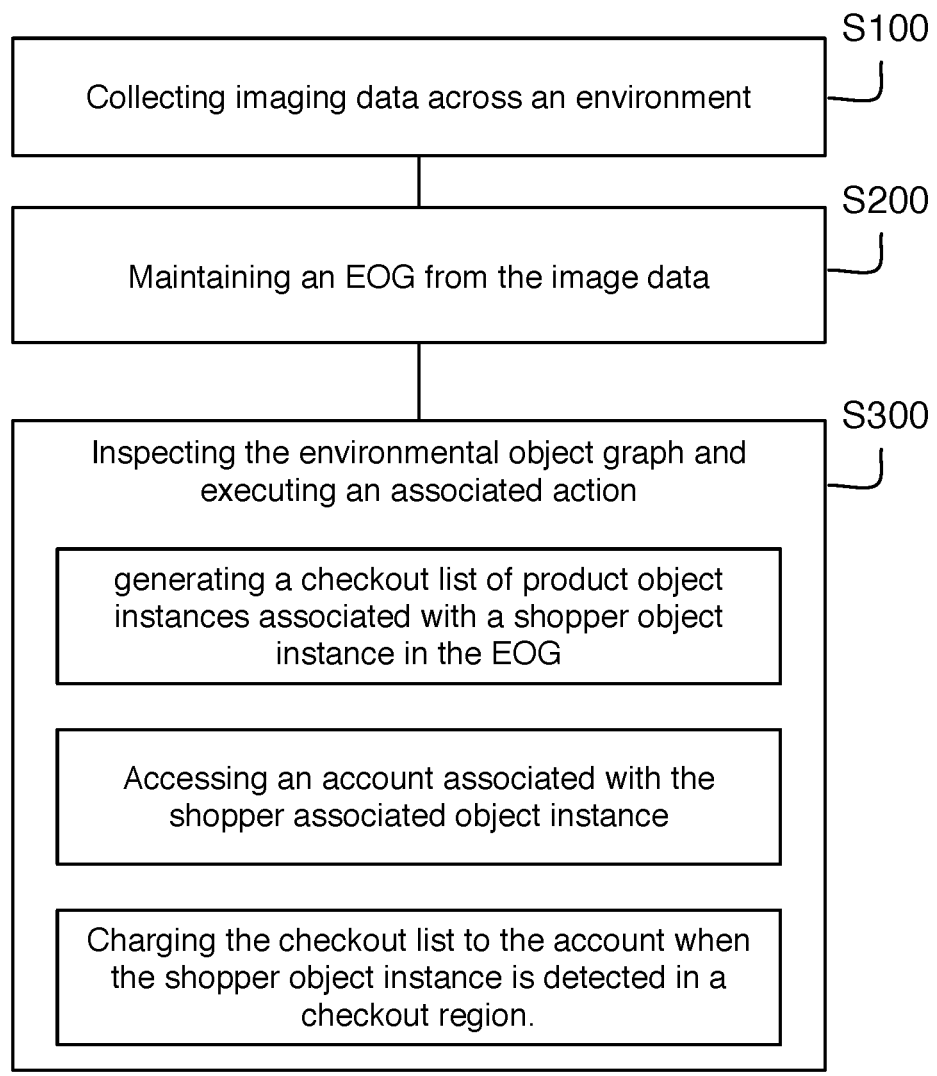
FIG. 22 is a is a flowchart representation of a method applied to automatic checkout.
Figure 23:
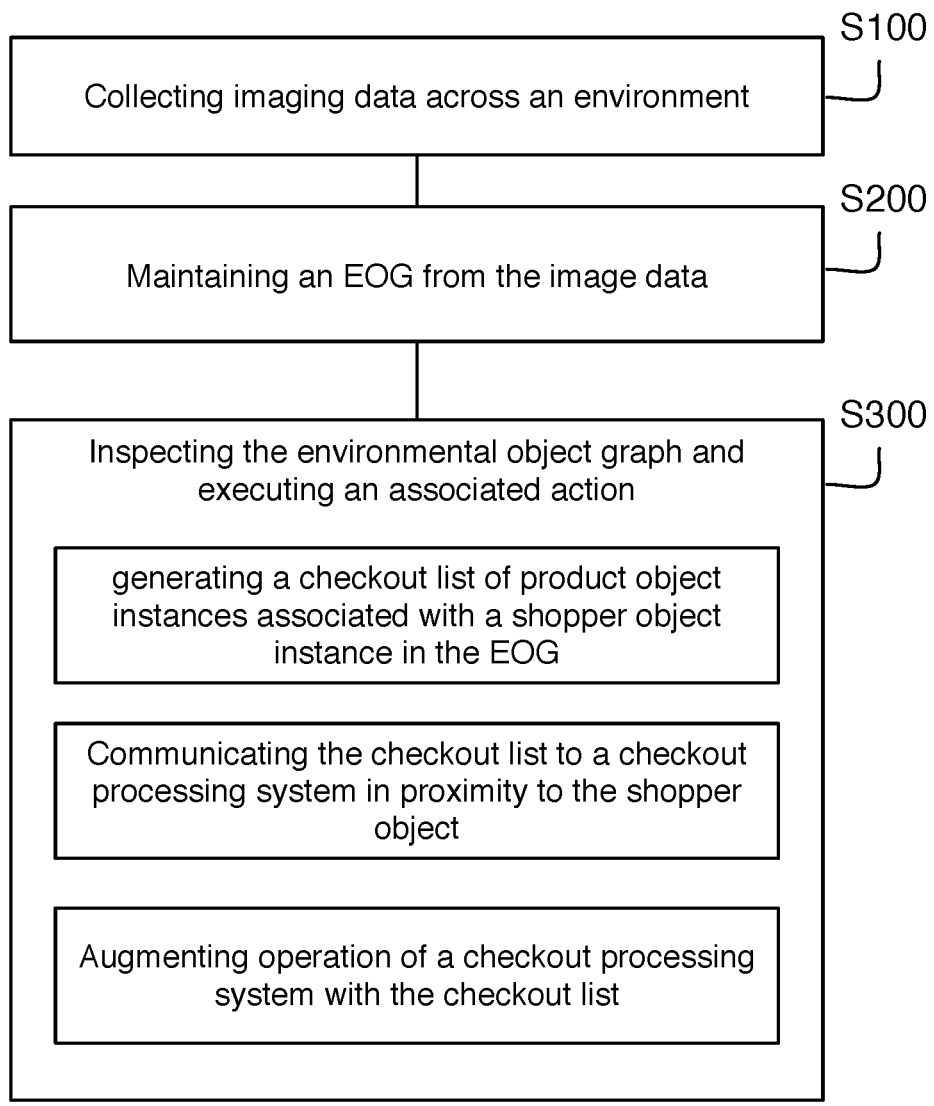
FIG. 23 is a is a flowchart representation of a method applied to integrating with a checkout processing system.

In taking action with the virtual cart list, the method can include detecting the shopper associated object in a checkout region and either charging an account of the shopper as shown in FIG. 22 or augmenting a checkout processing system with the virtual cart list as shown in FIG. 23. The checkout process can be a product purchase event, but could similarly be accounting for possession of the items in a user account. For example, the automatic checkout embodiment could similarly be applied in a library or item renting/borrowing applications.

When used in assisting the checkout process, the expected SKU objects in the virtual cart of the shopper can be communicated to a checkout processing system (e.g., a checkout kiosk).

In a preferred implementation this can include during inspection of object state generating a checkout list of SKU/product object instances associated with a shopper associated object instance, and when executing an action: communicating the checkout list to a checkout processing system in proximity to the shopper associated object instance. The method can additionally include: at the checkout processing system populating an itemized list of products for a pending transaction of the checkout processing system and/or biasing selection of product input by the checkout processing system.

Preferably, the itemized list of products to be purchased is automatically entered into the checkout processing system based on the list of SKU objects. In one variation, objects predicted with a high confidence threshold may be automatically added, and objects within a moderate threshold of confidence can be quickly confirmed through automated additional inspection or some user interface action (as opposed to manually scanning in the item). In some variations, objects with low confidence may be handled in various approaches such as alerting a worker to check for the physical items or requiring the worker to manually scan unadded items. The method may be used to facilitate checkout with a checkout processing system such as a self-checkout POS system, a consumer-focused application for a mobile computing device (e.g., smart phone or wearable computer), and/or a staffed POS system.

The method can alternatively be applied to a fully automated self-checkout process, wherein a shopper is enabled to select a product and leave the store, alleviating the shopper from using a traditional checkout process or kiosk. When applied to automatic checkout, the method similarly associates SKU objects with a shopper but additionally includes associating the shopper with an account and charging the account for possessed SKU objects when leaving the store. Associating the shopper with an account may use biometric detection techniques such as identifying the shopper through facial recognition.

In a preferred implementation this can include during inspection of object state generating a checkout list of SKU/product object instances associated with a shopper associated object instance, and when executing an action: accessing an account associated with the shopper associated object instance and charging the checkout list to the user account when the shopper associated object instance is detected in a checkout region.

Associating the shopper with an account may alternatively include detecting a device of the account such as the presence of a connected device (e.g., smart phone or RFID fob). Associating the shopper with an account may alternatively include using a credit, debit, gift, or payment card at a kiosk or checkout station. If no problems are detected in the shopper object, the shopper may leave the store without any further interaction and a receipt may be conveyed to them electronically, or printed on the spot. In yet another variation, associating the shopper with an account can involve active registration. For example, a shopper may be requested to "check-in", "check-out", or perform some action that enables an account to be mapped to their presence and activities within the environment. Bump technology, NFC, QR, and many other channels may be used to accomplish this association. From the shopper's perspective they can walk into the store pick up one or more products and walk out, and they may receive a notification through an application or messaging medium that they've been charged for a set of items.

Figure 24:
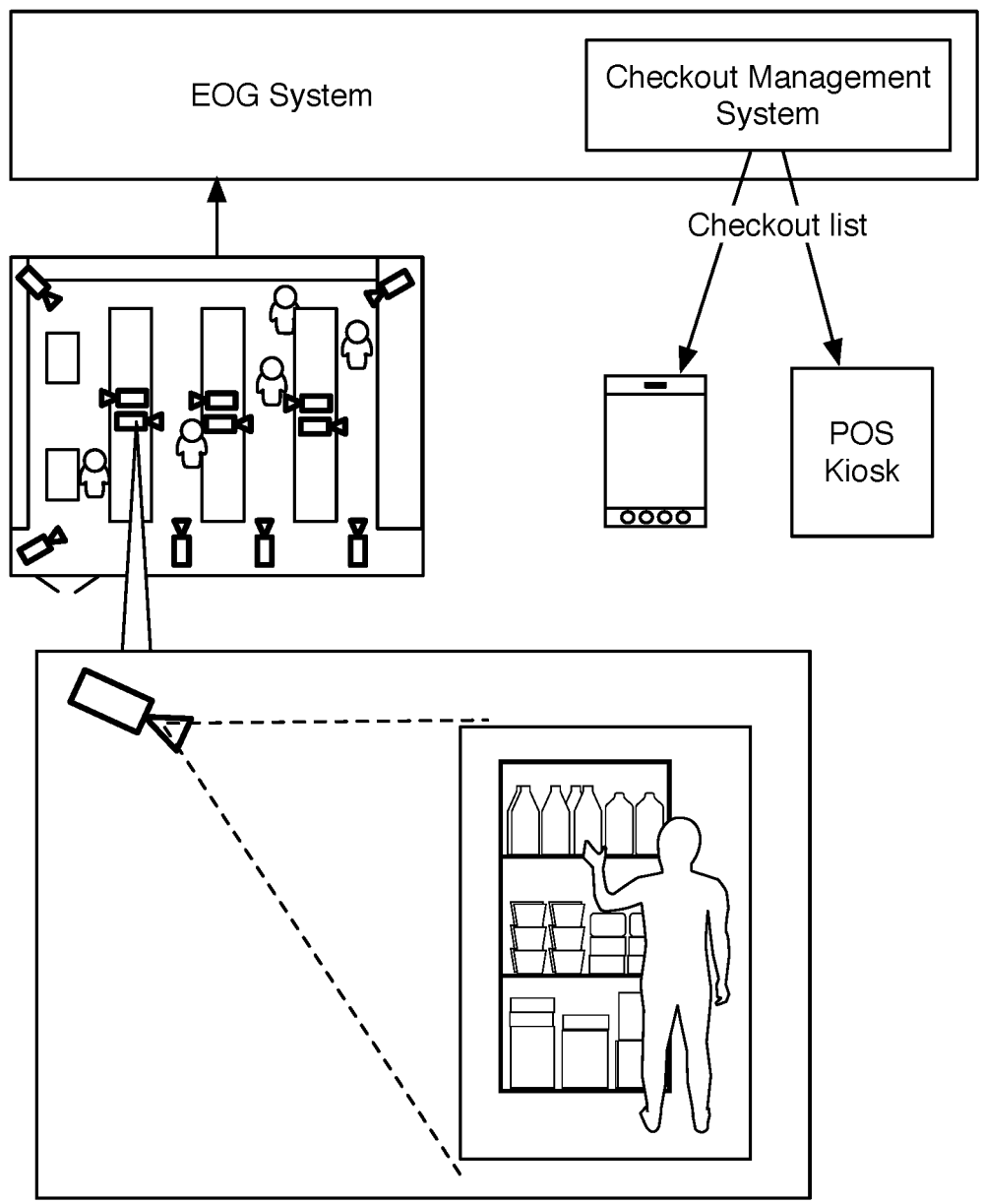
FIG. 24 is a schematic representation of communicating the checkout list.

An automatic checkout embodiment can additionally include providing a current virtual cart list prior to a checkout processing system as shown in FIG. 24, which functions to present a preview of products currently modeled as being possessed by a customer. The current virtual cart list can be provided through a user application communicating with the EOG system. A shopper could additionally manually edit the virtual cart list if there are errors. Additionally a user interface can be presented through which user input can be received thereby used in editing the virtual cart list and then updating the EOG through S240.

In one variation, a virtual cart is not generated during shopping, and instead a virtual cart is generated within a checkout region by collecting SKU objects within the checkout region. This variation could support multiple customers picking up items entering a checkout region and the combined collection of items is used in generating a virtual cart that can be used in a single purchase transaction. Similarly, this approach could flexibly handle the scenario of a shopper that is using a combination of bags, carts, and/or personally holding items on their person. From a customer perspective, products that are brought into a checkout region will be automatically added to the virtual cart during a checkout process.

In one variation, prior to acting on a virtual cart, the method can include resolving objects associated with a shopper object into a virtual cart list as shown in the exemplary FIG. 25, which functions to transform object modeling to a reduced set of products eligible for purchase. Primarily only objects eligible for purchase are added to a virtual cart list. This can include selecting SKU objects associated with the shopper object. It may additionally include selecting SKU objects acquired by a shopper object within a shopping region of the environment. This can function to account for objects introduced into the environment by the customer. For example, if a customer brings in a can of soda that is also sold in the store, that can of soda is associated with the customer during entry into the environment (or alternative by being produced from a purse, bag, etc.) and so would not be added to a virtual cart list.

Resolving objects associated with the shopper object can additionally include accounting for object classification confidence levels, product pricing, product margins, and/or other operational properties. In many business operations, user experience has its own value, and adjusting the virtual cart to but also consider customer satisfaction if an error is made or if they are prevented from using automatic self-checkout if the EOG has a slightly less than satisfactory confidence level in the products selected for checkout by the shopper.

Checkout System Integration

As described above, the method can leverage integration with a checkout processing system to augment POS operation by supplying a generated virtual cart list. This variation as described above generally involves communicating a virtual cart list to a checkout processing system. The virtual cart list received at the checkout processing system may then be used in prepopulating an item list in the checkout processing system. The checkout processing system can be a worker stationed POS kiosk, a customer self-checkout kiosk, a customer facing application (operable on a computing device of the customer), and/or any suitable device used to facilitate the checkout process.

The virtual cart list may alternatively be used in biasing product detection by the checkout processing system. The checkout processing system may use an image capture device and object detection wherein a prepopulated or biased item list can reduce object detection challenges. The checkout processing system may alternatively use a user interface, barcode scanner, and/or any suitable input for adding items for checkout. These inputs can be biased to more readily detect predicted items. For example, a user interface may present possible items, and a worker can quickly select them to add them to the cart.

POS integration may additionally be applied in updating EOG modeling and/or training. In one variation, object classification can be trained by collecting image data at a checkout processing system and applying a product label generated by a POS input (e.g., a barcode scanner) as supplemental input in updating the EOG. The collected image data can be used in generating object instances and associations within the EOG that relate objects at checkout processing system to other object instances in the store. The product labels can serve as high confidence object classification inputs that can then be propagated across the EOG to other associated object instances. In another variation, a generated virtual cart for a shopper using a traditional POS checkout process can be used in training the EOG system and/or in correcting the object modeling related to the shopper and propagating updated object state information through the EOG. For example, a virtual cart list generated for a shopper can be compared against an itemized list of products billed in a transaction at a checkout processing system. The accuracy of the EOG modeling can be trained and errors or updated data can be used to back propagate through the EOG. This can be done transparently to the shopper.

EOG Facilitated Inventory Management

In an embodiment that is directed to inventory management, the method can additionally include providing an inventory management system at least partially driven through the EOG. The inventory management system can include integration with other operational logistics systems such as shipment/order tracking systems and checkout processing systems. However, with integration with the EOG, a provided inventory management system can present granular insights into object tracking through the environment.

In one variation providing an inventory management system can include reporting inventory state such as inventory count and/or inventory location. An EOG model can be analyzed to generate inventory count estimates. In some cases, the reported inventory count can additionally report a range of inventory count variability based on unknowns. Individual inventory item location can additionally be reported and may be used in generating an inventory location map. That inventory location map can be a real-time representation of inventory items within the environment. Additionally, object associations modeled in the EOG can similarly be exposed in an inventory report. The contents of different objects or containers and/or optionally the capacity for additional objects can be reported. These objects could be containers or storage elements. This could be used so that an environment could understand inventory capacity capabilities. For example, providing inventory management system can include analyzing contained objects of storage objects in the EOG and reporting expected storage capacity.

In one implementation, the provided inventory management system can expose an inventory query service that can be used in locating objects or determining if the object is in stock. Workers and/or shoppers could query a service for a particular item, which uses the EOG system to determine an approximation of the quantity of the item and expected locations of the item. A map may be displayed showing where the item is located. Alternatively, an augmented reality interface may be used in indicating the location of the item.

Since individual objects can be tracked through the EOG with some granularity, individual metrics can be monitored across all inventory items. For example, providing the inventory management system can include tracking activity of objects within the environment. The history of an object can include different locations where it has been stored, different objects it's been in contact with, the workers or machines that have handled it, and/or other activities relating the object history in the environment. In one particular application, tracking activity of objects within the environment can be applied to reporting storage/shelf time of inventory items. For perishable goods, the method may include associating an object with an expiration data and tracking an expiration profile of inventory. Alerts or notifications can be triggered when particular inventory items near expiration or when particular inventory items pass the expiration data and need to be discarded.

In another variation providing an inventory management system can be used in triggering inventory orders. At a basic level this can include triggering an order when inventory in the environment drops below some threshold. In some cases, triggering an inventory order can be automated based on internal environmental activity. For example, purchase history combined with tracking individual item expiration can provide an enhanced understanding of projected inventory state.

In another variation, the inventory management system can be applied to identify items that are out of their range of normal locations and might be lost or misplaced. As an exemplary scenario, the method can find an unbought box of cookies in the soap aisle and prevent reordering more soap when a large shipping box full of soap is hidden behind a larger shipping box of something else.

A provided inventory management system can additionally be used for other alternative applications such as in directing workers, identifying misplaced items, accessing a timeline of media streams for a particular object (which may have applications when item contamination is detected in a processing environment).

EOG Calibration

Figure 26:
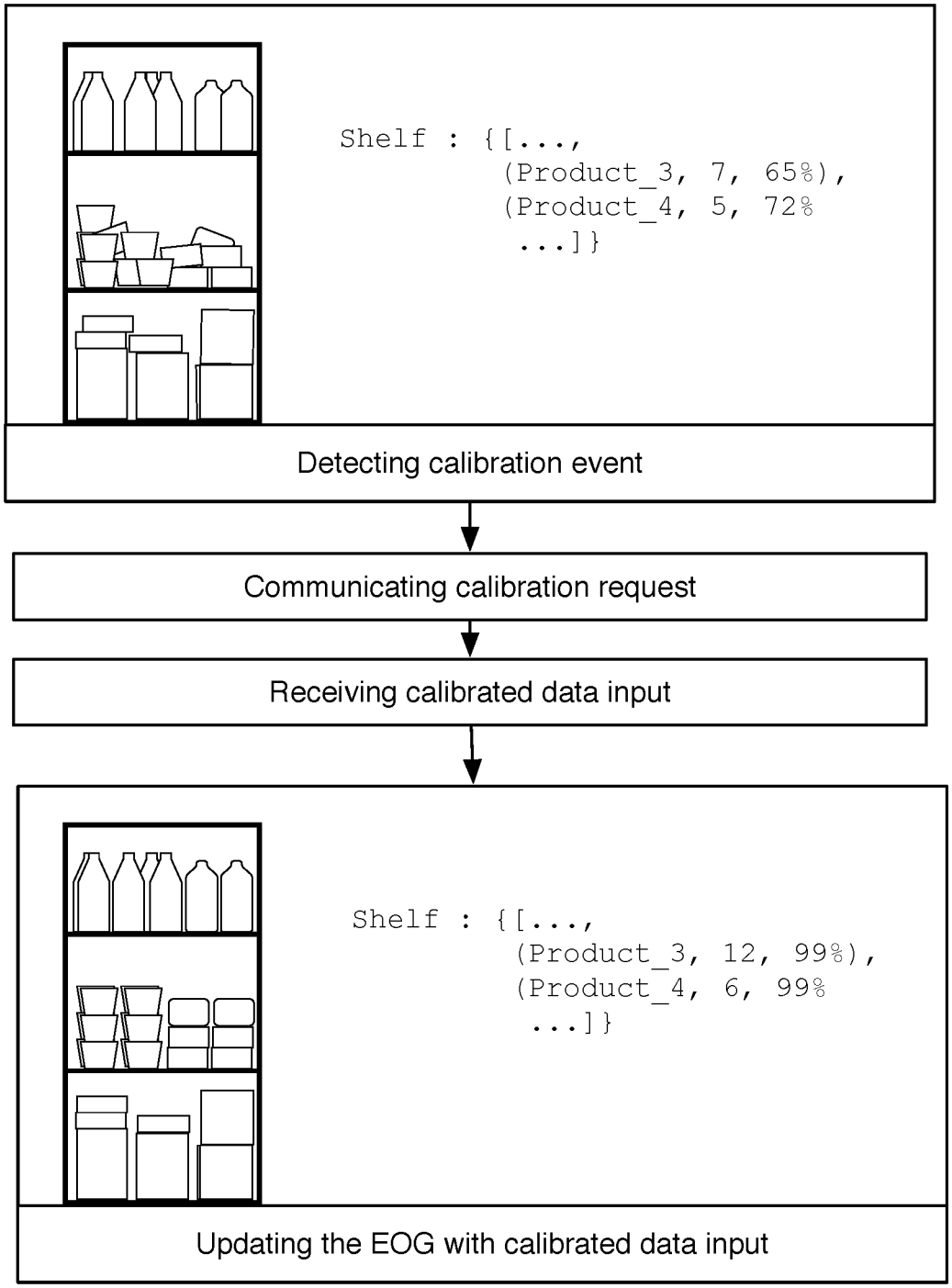
FIG. 26 is a schematic representation of a calibration event.

The method can additionally include triggering an EOG calibration request, which functions to generate and communicate an alert used in addressing an issue noticed through the EOG system as shown in FIG. 26. The EOG calibration event can preferably prompt an action to resolve issues with low confidence object modeling. In one implementation, a calibration process of the EOG can include: detecting a low confidence scenario in the EOG; communicating an EOG calibration request specifying at least one region in the environment; receiving calibration data input from the region, and updating the environmental object graph with the calibration data input.

In one example, a calibration request is generated and transmitted to a worker or robotic device. The request preferably specifies a location and possibly the issue to be calibrated. The worker or robotic device can then move to the specified location and collect information that can be used in enhancing the confidence of the modeling.

In one variation, a resolution event is triggered during low confidence in the accuracy of the EOG's inventory. A low confidence event can be detected when one or more object instances in the EOG have a data representation indicating low confidence. In one instance, the EOG may have low confidence in the state of one particular area of stored inventory.

The resolution event in this instance may involve requesting a worker to inspect the appropriate area of the environment resulting in collecting image data and/or inventory state data from a region in the environment identified in a calibration request. The image data and/or inventory state data is preferably updated and propagated in the EOG with prioritized confidence levels. In one variation, the worker may manually enter inventory state information, which functions to calibrate the EOG system. In another variation, a worker or robot may provide image data on that area through a movable imaging device. In another variation, the resolution event is triggered during low confidence in the items possessed by a shopper. Shopper inspection may be applicable in facilitating the checkout process. In the automated checkout embodiment described above, a resolution event may be triggered for a shopper as they leave the store if a worker needs to verify the possessed items to avoid an incorrect bill. Shopper inspection may alternatively or additionally be applicable to preventing shoplifting and theft.

Independently or in connection with an EOG calibration request, the method can include receiving a calibration input at a location. The calibration input can be data concerning state of objects in a particular region. The calibration input can be used in reporting a confirmed classification or identity of an object, confirming the count of an object, and/or confirming the absence of an object. The updated object state information is preferably propagated through the EOG. The calibration input can be collected from detailed image data from an image capture device in a mobile capture configuration, from a barcode or SKU input device, user inputted information. A calibration tool can be used to collect the calibration input.

In addition to employing workers or movable cameras to provide updated input within the environment, a calibration request can additionally be used in obtaining human analysis of the image data. Human workers can be selectively used in facilitating image processing by retrieving human analysis of media content in managing the EOG. Retrieving human analysis can include identifying an image processing case for human analysis, transmitting an analysis request and receiving an analysis response. That analysis can then be used in a similar manner as an algorithmic result. For example, human facilitated object classification can be used in replacement of CV-driven classification, and a human facilitated classification and description of an interaction event can be used in place of algorithmic and data-driven modeling for those instances. Redundant human analysis requests may be generated and delegated to different workers. Additionally, different image processing cases may be delegated to different workers depending on different factors. For example, image analysis related to verifying potential suspicious behavior may be delegated to a manager while object classification of a hard to detect object can be delegated to a junior worker. In one variation, human analysis may be selectively invoked when confidence levels of objects possessed by a shopper are below a threshold and the shopper is detected approaching a checkout region or when a potential checkout event is expected. A worker can preferably receive a batch of images and/or video. A particular query or challenge may also be presented such as "how many cereal boxes does the customer have?" or "What brand of soup was selected". The worker can then visually review the content and submit human facilitated analysis.

EOG Object Rules and Notifications

The method can additionally support notifications and customized actions. In one variation, the method can include configuring an object rule with at least one condition and an action; inspecting the EOG and detecting occurrence of the object rule; and triggering the action of the object rule. This preferably functions to enable the EOG system to facilitate customized actions. Conditions of object rules can use the properties of objects to craft a variety of custom rules. Some examples of conditions can include location fences on particular objects, proximity limits between particular object types, object orientation rules, and object content rules (e.g., what is allowed inside and not).

In one variation, the actions can facilitate programmatic actions wherein object rules can be used in triggering and controlling internal or external service or systems. In one variation, the action can be a configured webhook, callback URI, a script, and/or some predefined action. At least partial object state information related to the rule can be communicated with triggering the webhook, callback URI, or script such that the recipient service or device can use the object state information.

In another variation, object rules can be used in reporting data or transmitting information at particular times. This can include usage of a notification system for transmitting communications to a destination. Accordingly, the method can include transmitting notification upon satisfying an object condition. Notifications can be based on customized object rules but could additionally be preconfigured within the system.

EOG Data Storage

The method can additionally include storing bulk media or meta-data according to the EOG to enable meta-media storage. Video and uncompressed data storage can be expensive and resource intensive. The EOG characterizes object interactions and object relationships within an environment, and as such may provide a data efficient representation of events and object state in that environment. The EOG can be used to supplement media and in some cases enabling lower resolution media storage or absence of media storage because the individual objects captured have object information stored in the EOG. Media records can additionally be useful in particular events. At any given time and at a given location within an environment, the EOG will have a varying level of confidence in its internal representation of the objects in the environment. The characteristics of media storage for an imaging device may be dynamically adjusted based on the local confidence levels associated with the media.

Specifically, the method can include, for a set of media content segments, determining a modeling confidence of the EOG, selecting a content representation based on the modeling confidence; and storing the content representation according to the selected media representation as shown in FIG. 27. The content representation is preferably selected from a set of options including at least a modeled data representation associated with the media representation and a media representation. Preferably, the modeled data representing making up the EOG is stored in both situations. The content representation may be further adjusted by setting different characteristics of the media storage. The characteristics of media storage can include the length of storage, the resolution, the frame rate, cropping of the media segment, and/or other aspects. The length of storage determines how long the media representation is stored.

When the EOG has higher confidence in an object located within the surveyed region in a particular media segment then the corresponding media may be kept for shorter amounts of time and in reduced media formats. When the EOG has lower confidence in an object located within the surveyed region in a particular media segment then media storage may be kept for longer periods of time and/or at enhanced media formats. For example, a video camera viewing an unvisited aisle of inventory items may have media stored as simple meta data representation, and a video camera viewing an aisle where a shopper had an interaction event where there is a high level of uncertainty as to what happened may be stored longer. This allows for subsequent inspection.

In addition to the confidence level of the EOG, media storage may be based on the objects involved, and in particular the value of the objects. For example, media capturing a shopper having a suspect interaction with expensive merchandise may be stored for a longer period of time than media of a shopper interacting with potatoes. Similarly, a shopper modeled to possess objects that have a high value (monetary or otherwise) may automatically have media stored with higher fidelity and longevity for media content segments that capture the shopper as they walk through the environment.

In a similar fashion, media storage may be dynamically managed according to person object associations. A shopper can be tracked through an environment. When the shopper checks out the method can reconcile the degree of differences between the associated shopper object in the EOG and the POS itemized receipt. If the contained SKU objects of the shopper object agree with the receipt then storage of the media may be deprioritized. If the contained SKU objects of the shopper object conflict with the receipt then storage of the media may be prioritized based on degree of the conflict (e.g., number of products, value of products). When used across all shoppers, media associated with no shoppers or shoppers of little concern may be kept for shorter amounts of time or stored in a lower quality format. Media associated with shoppers for which there is some concern may be kept for longer amounts of time and/or in higher quality formats.

4. Method for Checkout

Figure 28:
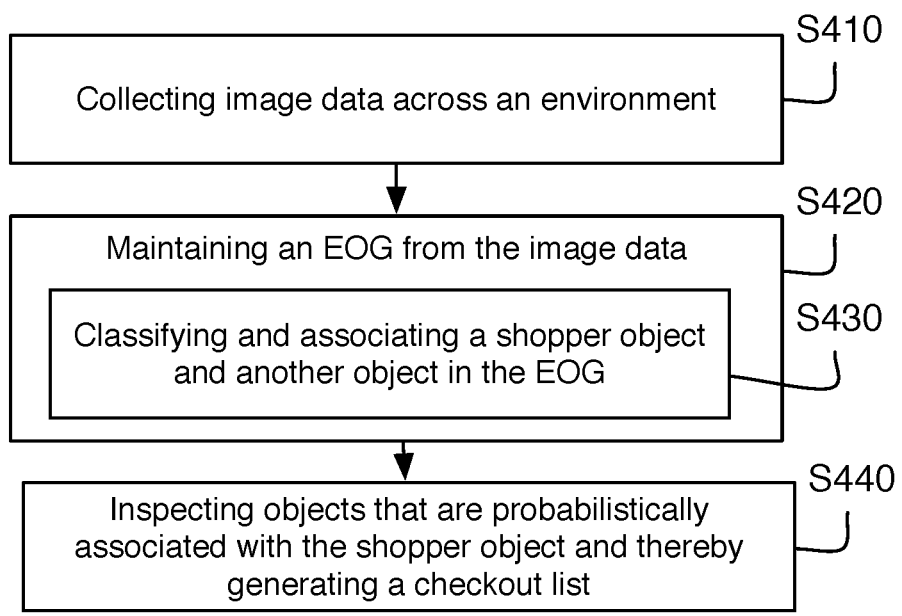
FIG. 28 is a flowchart representation of the method applied to generating a checkout list.

The method for environmental object modeling can be applied to a variety of scenarios as discussed above. Application of the method to facilitate the generation of a checkout list for a shopper and optionally facilitating execution of a transaction is one exemplary application. As shown in FIG. 28, the method when applied to checkout list generation of a preferred embodiment can include collecting image data across an environment S410; maintaining an EOG from the image data S420 where the EOG is a data representation of classified objects in space and time across the environment, the EOG comprising at least a subset of objects having probabilistic object associations; where, in at least one instance, maintaining the EOG includes classifying and associating a shopper object and another object in the EOG S430; and inspecting objects that are probabilistically associated with the shopper object and thereby generating a checkout list S440. Any of the variations described herein can similarly be used in combination with the method applied to checkout list generation. In particular the method can be used to utilize image data and EOG-based modeling to determine product selection made in one location (e.g., on the shopping floor) that can be acted on in another area. In some variations, actions may be triggered based on shopper presence in one region absent of image data confirming presence of the object in that region.

Maintaining the environmental object graph will preferably include the iterative execution of the processes described above in maintaining an updated EOG. In the context of maintaining the EOG as it relates to facilitating a checkout process, maintaining the environmental object graph includes at least one instance of classifying and associating a shopper object and another object. The shopper object can be a customer/person object, a cart object, a basket classified object, a bag classified object and/or some collection of shopper associated objects (e.g., a shopper object, various bag objects, a basket object and/or a cart object). The other object can be a SKU object (e.g., a product eligible for purchase, renting, or involvement in a transaction). Multiple instances of object-to-shopper associations can be established so that a checkout list can be generated that includes multiple products.

There are preferably multiple possible EOG modeling scenarios that can be encountered when maintaining the EOG and thereby impacting the generation of a checkout list. Scenarios can involve: various numbers of objects and shopper objects; the adding and removal of object associations with a shopper object; the changing in confidence levels of object classifications and associations; and/or other suitable scenarios.

As shown in FIG. 29, one exemplary instance of maintaining the EOG can include: in a first region captured in the image data, classifying a first object and at least a shopper object; in the first region, detecting an interaction event between the first object and the shopper object, and updating the environmental object graph whereby the first object is probabilistically associated with the shopper object. This can function to model a shopper object selecting a product so as to possess or contain that product. These processes are preferably executed when a shopper adds a product to a cart, cart, or their pocket. The first object can be probabilistically associated with the shopper object with an initial confidence level; and wherein generating the checkout list comprises adding objects to the checkout list with confidence level satisfying a confidence threshold. Generating the checkout list after inspecting the EOG can additionally factor in product pricing, customer purchase history, and/or other factors. For example, the system can have dynamic confidence threshold requirements depending on if the customer is a frequent customer that can be trusted compared to an untrusted customer.

Another exemplary instance, maintaining the EOG can be applied so that the association of an object to the shopper object can be altered by a subsequent observation. In this scenario, the first object discussed above is probabilistically associated with the shopper object as a possessed object with a confidence level, and as shown in FIG. 30, the maintaining of the EOG further includes: in a third region captured in the image data, classifying a second object and the shopper object; associating the second object as a possessed object with the shopper object with a second confidence level; and updating the EOG wherein the first confidence level is altered at least partially in response to the second confidence level. This change in confidence level can increase or decrease confidence of the object. In some cases, the confidence level can change such that the dominant classification of the first object can change. For example, a first object may initially be classified as a generic box of cereal without association to a particular cereal SKU item. However, classification of a third object as a particular cereal SKU item in association with the shopper object may result in propagation of that information such that the first object is modeled as being that particular SKU item.

In another exemplary instance, maintaining the EOG can be applied such that an object association can be removed or disassociated as a result of other input to the EOG. As shown in FIG. 31, during a second instance after the first instance discussed above, maintaining the EOG can include: in the first region, classifying the first object; and updating the environmental object graph comprises removing the association of the first object with the shopper object in the first instance.

In another exemplary instance, compound object modeling can be used when maintaining the EOG such that an object modeled with compound object associations to one or more objects can be used to associate contained objects with a shopper. As shown in FIG. 32, during another instance, maintaining the EOG can include: in a third region captured in the image data, classifying an object and the shopper object, wherein the object is a compound object with probabilistically contained objects; in the third region, detecting an interaction event between the first object and the shopper object; and updating the EOG whereby the object and the probabilistically contained objects of the object are probabilistically associated with the shopper object. For example, a shopper picking up a box of items can have those individual items associated with them and individually added to a checkout list.

As discussed above there can be various forms of interactions events that may result in association of two or more objects. In one variation, the interaction event can include detecting proximity between an object and the shopper object satisfying a proximity threshold. The proximity threshold can vary based on different conditions such as object classification, location, shopper history or profile data, and/or other suitable factors. Interaction events could additionally or alternatively include algorithmically detected gestures or events within the image data. Interaction events could similarly be simple object classification or object tracking changes. For example, if a previously tracked object disappears from view without reacquisition, an interaction event can be modeled that can result in association of that previously tracked object with a nearby shopper (without triggering the interaction event based on proximity).

The method of generating a checkout list can be applied in a variety of applications such as facilitating a checkout process and/or augmenting operation of a checkout processing device. In one variation it can be simply used in In a variation also shown in FIG. 29, the method can additionally include: in a second region captured in the image data, detecting the shopper object and initiating a checkout process with the checkout list. More preferably, the checkout process and the charged transaction can be automatically executed by the method further including: accessing an account associated with the shopper object; and when initiating the checkout process, charging the checkout list to the user account after entering the second region. The account preferably includes a payment option such as credit card information, but can alternatively include credits or have a running tally of billed items. The checkout process may be initiated independent of explicit observation of products possessed by the shopper object in that second region. The second region can be a particular region of a store. In one variation it can be a region at the store exits or preceding the store exits.

As with the method above, the method for generating a checkout list can be used in a system with multiple image capture devices and/or with a system with a single image capture device. In the automatic checkout variation with multiple cameras the first region can be captured in image data from a first camera and the second region can be captured in image data from a second camera. Alternatively, the first region and the second region can be captured in image data from one camera, which may enable execution of the method with a single camera. For example, a small wall of products can be monitored by a camera, and a customer could purchase items from this wall by selecting one and walking away.

In another variation, the method can be used in altering operation of a checkout processing system such as a worker-stationed POS kiosk, a self-checkout POS kiosk, or a customer-facing smart phone application used for self-checkout. In a variation used for altering operation of a checkout processing system, initiating the checkout process can include communicating the checkout list to a checkout processing system in the second region. This can be triggered based on the location of the shopper object as tracked through the EOG relative to the second region. For example, as the shopper approaches a self-checkout kiosk, the checkout list of that shopper can be communicated to that particular self-checkout kiosk.

The communicated checkout list can be used in a variety of ways. In one variation, the method can include, at the checkout processing system, populating the checkout processing system with items from the checkout list. For example, the self-checkout kiosk in the example above could automatically update and present the checkout list on a screen. The shopper could then confirm and/or supply payment to complete the transaction. The method could additionally support editing the checkout list at the checkout processing system. In some variations, subsets of the checkout list can be prepopulated in different modes such as a high confidence mode and a confirmation mode. Items prepopulated in a confirmation mode may request user input to confirm or refine identification of the item. Items added in a high confidence mode may be initially added without explicit confirmation.

In another variation, the communicated checkout list can be used in biasing product input of the checkout processing system for items in the checkout list. This may be used in a variety of ways by the checkout processing system. In one variation, it can alter the navigation of menu options for product selection.

The generated checkout list can additionally be used in other scenarios. In one variation it can be used in synchronizing the selected items of a shopper to an application instance of the shopper. A method of this variation can include accessing an account associated with the shopper object; and in an application instance of the account, presenting the checkout list. Once a checkout list is synchronized and communicated to an application instance, it can be used in various applications. In one example, it can enable customers to have a real-time tally of the total bill prior to checking out an item. In a more specific example, a customer could simply pick up an item and see the price of that item reflected on an application on their phone or wearable computer. The synchronized checkout list could additionally be used in applications related to shopping lists, couponing, specialized discounts, and/or other applications.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, eyeglasses, wearable device, camera, imaging device, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for expediting a checkout process comprising:
    collecting image data across an environment;
    maintaining an environmental object graph from the image data wherein the environmental object graph is a data representation of computer vision classified objects in space and time across the environment, the environmental object graph comprising at least a subset of objects having object associations;
    wherein maintaining the environmental object graph comprises at least one instance of:
        in a first region captured in the image data, classifying a first object and at least a shopper object,
        in the first region, detecting an interaction event between the first object and the shopper object, and
        updating the environmental object graph whereby the first object is associated with the shopper object;
    inspecting objects that are associated with the shopper object and thereby generating a checkout list.

2. The method of claim 1, further comprising, in a second region captured in the image data, detecting the shopper object and initiating a checkout process with the checkout list.

3. The method of claim 2, further comprising accessing an account associated with the shopper object; and wherein initiating the checkout process comprises charging the checkout list to the account after entering the second region.

4. The method of claim 3, wherein initiating the checkout process comprises communicating the checkout list to a checkout processing system in the second region.

5. The method of claim 4, further comprising, at the checkout processing system, populating the checkout processing system with items from the checkout list.

6. The method of claim 5, further comprising biasing product input of the checkout processing system for items in the checkout list.

7. The method of claim 2, wherein the first object is associated with the shopper object with an initial confidence level; and wherein generating the checkout list comprises adding objects to the checkout list with confidence levels satisfying a confidence threshold.

8. The method of claim 2, wherein the first region is captured in image data from a first camera and the second region is captured in image data from a second camera.

9. The method of claim 2, wherein the first region and the second region are captured in image data from one camera.

10. The method of claim 2, wherein the first object is associated with the shopper object as a possessed object with a first confidence level; and wherein maintaining the environmental object graph in a second instance comprises:
    in a third region captured in the image data, classifying a second object and the shopper object,
    associating the second object as a possessed object with the shopper object with a second confidence level, and
    updating the environmental object graph wherein the first confidence level is altered at least partially in response to the second confidence level.

11. The method of claim 1, further comprising accessing an account associated with the shopper object; and in an application instance of the account, presenting the checkout list.

12. The method of claim 1, wherein maintaining the environmental object graph in a second instance after the first instance comprises: in the first region, classifying the first object, and updating the environmental object graph and thereby removing the association of the first object with the shopper object in the first instance.

13. The method of claim 1, wherein maintaining the environmental object graph in a second instance comprises:
    in a second region captured in the image data, classifying a second object and the shopper object, wherein the second object is a compound object with contained objects,
    in the second region, detecting an interaction event between the first object and the shopper object, and
    updating the environmental object graph whereby the second object and the contained objects of the second object are associated with the shopper object.

14. The method of claim 1, wherein detecting the interaction event between the first object and the shopper object comprises detecting proximity between the first object and the shopper object satisfying a proximity threshold.

15. The method of claim 1, wherein classifying the first object and the shopper object comprises applying computer-vision driven processes during classification, the computer-vision driven processes including at least image feature extraction and classification and an application of neural networks.

16. A method comprising:
    collecting image data across an environment;
    maintaining an environmental object graph from the image data whereby maintaining the environmental object graph is an iterative process comprising:
        classifying objects and storing corresponding object instances in the environmental object graph,
        tracking object locations and establishing an association of object instances in an object path,
        detecting interaction events and, for event instances of a subset of detected interaction events, generating an object association of at least two object instances involved in the interaction event, and
        updating the environmental object graph comprising propagating change in at least one object instance across object associations; and
    inspecting object state for at least one object instance in the environmental object graph and executing an action associated with the object state.

17. The method of claim 16, wherein collecting imaging data comprises collecting imaging data from multiple image capture devices distributed across an environment.

18. The method of claim 17, wherein collecting image data from multiple image capture devices distributed across an environment comprises collecting imaging data from a set of image capture devices that include at least two image capture configurations selected from: an inventory storage capture configuration, an interaction capture configuration, an object identification capture configuration, and a movable capture configuration.

19. The method of claim 16, wherein detecting the interaction events comprises detecting proximity between a first object of a first classification and at least a second object of a second classification satisfying a proximity threshold.

20. The method of claim 16, wherein detecting the interaction events comprises: for at least one interaction event, detecting an object proximity event, and, for at least a second interaction event, detecting an object transformation event.

21. The method of claim 20, wherein detecting the object transformation event can comprise detecting an object transformation selected from the set of: an object appearance event, object disappearance event, and object classification mutation event.

22. The method of claim 16, wherein classifying an object can include identifying an object as one of a set of possible object types, wherein possible object types comprise at least a product object, a compound object, and a person object.

23. The method of claim 16, wherein maintaining the environmental object graph further comprises instantiating an object instance in the environmental object graph as probabilistically having a hierarchical association with at least one object.

24. The method of claim 16, wherein maintaining the environmental object graph further comprises instantiating at least two probabilistically possible states of an object instance.

25. The method of claim 16, wherein classifying objects comprises classifying an object through an initial classification model of a first set of candidate objects and classifying the object through at least a second expanded classification model of a second set of candidate objects if classification of the object through the initial classification model does not satisfy a classification condition.

26. The method of claim 16, wherein classifying objects comprises retrieving supplementary inputs selected from the set of: purchase patterns, customer purchase history, and product pricing; and classifying an object at least partially based on one of the supplementary inputs.

27. The method of claim 16, wherein collecting image data includes collecting image data at a checkout processing system; and applying a product identifier generated by a point of sale input as supplemental input in updating the environmental object graph.

28. The method of claim 16, wherein inspecting object state and executing an action can comprise: detecting a low confidence scenario in the environmental object graph; communicating an environmental object graph calibration request specifying at least one region of the environment; receiving calibration data input from the region, and updating the environmental object graph with the calibration data input.

29. The method of claim 16, wherein inspecting object state comprises generating a checkout list of product object instances associated with a shopper associated object instance.

30. The method of claim 29, wherein executing an action comprises: accessing an account associated with the shopper associated object instance and charging the checkout list to the account when the shopper associated object instance is detected in a checkout region.

31. The method of claim 29, wherein executing an action comprises: communicating the checkout list to a checkout processing system in proximity to the shopper associated object instance.

32. The method of claim 16, wherein executing an action comprises providing an inventory management system at least partially driven through the environmental object graph, wherein providing the inventory management system comprises: reporting shelf time of products, reporting product counts, reporting product locations, and reporting container contents.

33. The method of claim 16, further comprising for a set of media content segments, determining a modeling confidence in the environmental object graph; selecting a content representation based on the modeling confidence, the content representation selected from the set of options including at least a modeled data representation and a media representation; and storing the content representation.

34. The method of claim 16, further comprising configuring an object rule with at least one condition and an action; wherein inspecting object state and executing an action comprises detecting occurrence of the object rule and triggering the action of the object rule.

35. The method of claim 16, wherein classifying objects comprises applying computer-vision driven processes, the computer-vision driven processes including at least image feature extraction and classification and convolution neural networks.

36. A system comprising
an imaging system configured to collect image data within an environment;
a processing engine configured to maintain an environmental object graph from the image data wherein the environmental object graph is a data representation of classified objects in space and time across the environment, the environmental object graph comprising at least a subset of objects having probabilistic object associations; and
the processing engine further configured to:
classify objects in the image data and store corresponding object instances in the environmental object graph,
track object locations and establish an association of object instances in an object path,
detect interaction events and, for event instances of a subset of detected interaction events, generate an object association of at least two object instances involved in the interaction event, and
update the environmental object graph and propagate change in at least one object instance across object associations.

37. The system of claim 36, wherein the imaging system comprises an image capture device in an inventory storage capture configuration, image capture device in an interaction capture configuration, an image capture device in an object identification capture configuration, and image capture device in a movable capture configuration.

38. The system of claim 36, wherein the processing engine is further configured to: instantiate a first set of object instances in the environmental object graph with compound object modeling, and instantiate a second set of object instances in the environmental object graph with probabilistic multi-state modeling.

39. The system of claim 36, further comprising a virtual cart management system configured to inspect object instances associated with a shopper object instance in the environmental object graph and generate a checkout list of products.

40. The system of claim 39, the virtual cart management system further configured to access an account associated with the shopper object instance and charge the checkout list to the account when the shopper associated object instance is detected in a checkout region.

41. The system of claim 39, further comprising a checkout processing system wherein the checkout list is communicated to the checkout processing system.

42. The system of claim 36, further comprising an inventory management system that comprises an inspection interface to the environmental object graph.

43. The system of claim 36, further comprising a meta-media storage system that is configured to store a dynamic media content representation in coordination with the environmental object graph.

44. The system of claim 36, further comprising a calibration tool that is configured to provide calibration data input to the processing engine.

* * * * *